United States Patent
Joshi et al.

(10) Patent No.: US 11,367,295 B1
(45) Date of Patent: Jun. 21, 2022

(54) GRAPHICAL USER INTERFACE FOR PRESENTATION OF EVENTS

(75) Inventors: Ashutosh Joshi, Sunnyvale, CA (US); Aparna Gupta, Gurgaon (IN); Binay Mohanty, New Delhi (IN); Jalvin Upadhyay, Gurgaon (IN); Rajiv Arora, Gurgaon (IN); Martin Betz, San Francisco, CA (US); Michael Prospero, Foster City, CA (US); David Cooke, Los Altos, CA (US); Prashant Rao, San Mateo, CA (US)

(73) Assignee: Aurea Software, Inc., Austin, TX (US)

( * ) Notice: Subject to any disclaimer, the term of this patent is extended or adjusted under 35 U.S.C. 154(b) by 1486 days.

(21) Appl. No.: 12/870,694

(22) Filed: Aug. 27, 2010

Related U.S. Application Data

(60) Provisional application No. 61/330,875, filed on May 3, 2010, provisional application No. 61/316,824, filed on Mar. 23, 2010.

(51) Int. Cl.
| | |
|---|---|
| *G06F 16/951* | (2019.01) |
| *G06F 3/0482* | (2013.01) |
| *G06V 30/40* | (2022.01) |
| *G06K 9/00* | (2022.01) |

(52) U.S. Cl.
CPC ............ *G06V 30/40* (2022.01); *G06F 3/0482* (2013.01); *G06F 16/951* (2019.01); *G06K 9/00536* (2013.01)

(58) Field of Classification Search
CPC ..... G06V 30/40; G06F 16/951; G06F 3/0482; G06K 9/00536
USPC .......................................................... 705/35
See application file for complete search history.

(56) References Cited

U.S. PATENT DOCUMENTS

| | | | |
|---|---|---|---|
| 5,483,650 A | * | 1/1996 | Pedersen ............... G06F 16/355 |
| 5,640,553 A | | 6/1997 | Schultz |
| 5,717,914 A | * | 2/1998 | Husick et al. |
| 5,918,236 A | * | 6/1999 | Wical ............................ 715/209 |
| 5,933,822 A | | 8/1999 | Braden-Harder et al. |
| 6,038,561 A | | 3/2000 | Snyder et al. |
| 6,041,331 A | | 3/2000 | Weiner et al. |
| 6,081,744 A | | 6/2000 | Loos |
| 6,112,201 A | | 8/2000 | Wical |
| 6,119,124 A | | 9/2000 | Broder et al. |
| 6,125,361 A | | 9/2000 | Chakrabarti et al. |

(Continued)

OTHER PUBLICATIONS

Blei et al.; "Latent Dirichlet Allocation"; Jan. 2003, Journal of Machine Learning Research, p. 994 (Year: 2003).*

(Continued)

*Primary Examiner* — Jay A Morrison

(57) ABSTRACT

Some embodiments provide a method for generating a graphical user interface (GUI) for a research system. The method receives a request from a user of the research system for information about a particular category. The method generates a chart that displays a set of events associated with the particular category over a particular period of time. The method incorporates the chart into a GUI for the particular category for transmission to the user. Some embodiments generate a list of events associated with the particular category and generate a GUI that displays the list of the events. Each event is represented in the list by a title of a document identified by the research system as representative of the event.

17 Claims, 33 Drawing Sheets

(56) References Cited

U.S. PATENT DOCUMENTS

| | | | |
|---|---|---|---|
| 6,154,213 A | | 11/2000 | Rennison et al. |
| 6,285,999 B1 * | | 9/2001 | Page |
| 6,349,307 B1 | | 2/2002 | Chen |
| 6,363,377 B1 | | 3/2002 | Kravets et al. |
| 6,377,945 B1 | | 4/2002 | Risvik |
| 6,411,924 B1 | | 6/2002 | de Hita et al. |
| 6,463,430 B1 | | 10/2002 | Brady et al. |
| 6,493,702 B1 | | 12/2002 | Adar et al. |
| 6,510,406 B1 | | 1/2003 | Marchisio |
| 6,536,041 B1 * | | 3/2003 | Knudson et al. ............... 725/39 |
| 6,601,075 B1 | | 7/2003 | Huang et al. |
| 6,658,423 B1 | | 12/2003 | Pugh et al. |
| 6,665,662 B1 * | | 12/2003 | Kirkwood et al. |
| 6,701,318 B2 | | 3/2004 | Fox et al. |
| 6,877,137 B1 | | 4/2005 | Rivette et al. |
| 6,915,294 B1 * | | 7/2005 | Singh et al. |
| 7,072,858 B1 | | 7/2006 | Litzow et al. |
| 7,103,838 B1 | | 9/2006 | Krishnamurthy et al. |
| 7,171,384 B1 * | | 1/2007 | Fitzpatrick et al. ........ 705/36 R |
| 7,181,438 B1 | | 2/2007 | Szabo |
| 7,185,065 B1 * | | 2/2007 | Holtzman .............. G06Q 40/06 709/217 |
| 7,194,691 B1 * | | 3/2007 | Zilka et al. .................... 715/739 |
| 7,280,973 B1 | | 10/2007 | Hack et al. |
| 7,409,402 B1 | | 8/2008 | Chan et al. |
| 7,421,441 B1 | | 9/2008 | Chan et al. |
| 7,433,874 B1 | | 10/2008 | Wolfe |
| 7,496,567 B1 | | 2/2009 | Steichen |
| 7,673,253 B1 | | 3/2010 | Agarwal et al. |
| 7,680,773 B1 | | 3/2010 | Acharya et al. |
| 7,685,091 B2 * | | 3/2010 | Boone ............... G06F 17/30716 705/7.29 |
| 7,716,199 B2 | | 5/2010 | Guha |
| 7,716,228 B2 | | 5/2010 | Sahasrabudhe et al. |
| 7,752,112 B2 * | | 7/2010 | Gatto et al. ................. 705/36 R |
| 7,818,232 B1 * | | 10/2010 | Mead et al. ................ 705/36 R |
| 8,051,000 B2 * | | 11/2011 | Kurczek et al. ................ 705/37 |
| 8,136,025 B1 * | | 3/2012 | Zhu et al. ...................... 715/200 |
| 8,321,398 B2 | | 11/2012 | Aumann et al. |
| 8,583,592 B2 | | 11/2013 | Stading |
| 8,631,006 B1 | | 1/2014 | Haveliwala et al. |
| 2001/0037405 A1 | | 11/2001 | Sideek |
| 2001/0042083 A1 | | 11/2001 | Saito et al. |
| 2001/0056396 A1 | | 12/2001 | Goino |
| 2002/0045154 A1 | | 4/2002 | Wood et al. |
| 2002/0123994 A1 | | 9/2002 | Schabes et al. |
| 2003/0018659 A1 | | 1/2003 | Fuks et al. |
| 2003/0033274 A1 | | 2/2003 | Chow et al. |
| 2003/0046307 A1 | | 3/2003 | Rivette et al. |
| 2003/0074516 A1 | | 4/2003 | Cho et al. |
| 2003/0130998 A1 | | 7/2003 | Fox et al. |
| 2003/0191754 A1 | | 10/2003 | Dey et al. |
| 2004/0003349 A1 | | 1/2004 | Ostertag et al. |
| 2004/0158569 A1 | | 8/2004 | Evans et al. |
| 2005/0060288 A1 | | 3/2005 | von Groll |
| 2005/0102267 A1 * | | 5/2005 | O'Reilly ............... G06F 16/951 |
| 2005/0108200 A1 | | 5/2005 | Meik et al. |
| 2005/0108630 A1 | | 5/2005 | Wasson et al. |
| 2005/0120006 A1 | | 6/2005 | Nye |
| 2005/0125429 A1 | | 6/2005 | Corston-Oliver et al. |
| 2005/0144162 A1 | | 6/2005 | Liang |
| 2005/0160357 A1 | | 7/2005 | Rivette et al. |
| 2005/0246221 A1 | | 11/2005 | Geritz, III et al. |
| 2006/0004716 A1 | | 1/2006 | Hurst-Hiller et al. |
| 2006/0005017 A1 | | 1/2006 | Black et al. |
| 2006/0074726 A1 | | 4/2006 | Forbes et al. |
| 2006/0106793 A1 | | 5/2006 | Liang |
| 2006/0106847 A1 | | 5/2006 | Eckardt, III et al. |
| 2006/0112079 A1 | | 5/2006 | Holt et al. |
| 2006/0129550 A1 | | 6/2006 | Zha et al. |
| 2006/0143159 A1 | | 6/2006 | Chowdhury et al. |
| 2006/0161543 A1 | | 7/2006 | Feng et al. |
| 2006/0167842 A1 | | 7/2006 | Watson |
| 2006/0195461 A1 | | 8/2006 | Lo et al. |
| 2006/0218111 A1 | | 9/2006 | Cohen |
| 2006/0224582 A1 | | 10/2006 | Hogue |
| 2006/0230071 A1 * | | 10/2006 | Kass .................. G06F 16/2465 |
| 2006/0242180 A1 | | 10/2006 | Graf et al. |
| 2006/0294101 A1 | | 12/2006 | Wnek |
| 2007/0027859 A1 | | 2/2007 | Harney et al. |
| 2007/0094251 A1 * | | 4/2007 | Lu et al. .......................... 707/5 |
| 2007/0118506 A1 | | 5/2007 | Kao et al. |
| 2007/0156677 A1 | | 7/2007 | Szabo |
| 2007/0179776 A1 | | 8/2007 | Segond et al. |
| 2007/0198459 A1 * | | 8/2007 | Boone ................. G06F 16/9535 |
| 2007/0203720 A1 | | 8/2007 | Singh et al. |
| 2007/0203816 A1 * | | 8/2007 | Costache ............... G06Q 40/00 705/35 |
| 2007/0288436 A1 | | 12/2007 | Cao |
| 2008/0005107 A1 | | 1/2008 | Funaki |
| 2008/0033871 A1 * | | 2/2008 | Birbara et al. .................. 705/39 |
| 2008/0082578 A1 * | | 4/2008 | Hogue ............... G06F 3/04845 |
| 2008/0140616 A1 | | 6/2008 | Encina et al. |
| 2008/0195567 A1 | | 8/2008 | Chen et al. |
| 2008/0243907 A1 | | 10/2008 | Stergiou et al. |
| 2008/0244429 A1 | | 10/2008 | Stading |
| 2008/0290161 A1 | | 11/2008 | Blake |
| 2008/0294624 A1 | | 11/2008 | Kanigsberg et al. |
| 2009/0007195 A1 | | 1/2009 | Beyabani |
| 2009/0055242 A1 | | 2/2009 | Rewari et al. |
| 2009/0055368 A1 | | 2/2009 | Rewari et al. |
| 2009/0063437 A1 * | | 3/2009 | Hendrey ............. H04L 63/0807 |
| 2009/0083251 A1 | | 3/2009 | Sahasrabudhe et al. |
| 2009/0228777 A1 | | 9/2009 | Henry et al. |
| 2009/0292660 A1 * | | 11/2009 | Behal et al. .................... 706/12 |
| 2009/0313236 A1 | | 12/2009 | Hernacki et al. |
| 2010/0042623 A1 | | 2/2010 | Feng et al. |
| 2010/0076954 A1 | | 3/2010 | Dulitz et al. |
| 2010/0124378 A1 | | 5/2010 | Das et al. |
| 2010/0138271 A1 | | 6/2010 | Henkin et al. |
| 2010/0185651 A1 | | 7/2010 | Crow et al. |
| 2011/0010324 A1 | | 1/2011 | Bolivar et al. |
| 2011/0010372 A1 | | 1/2011 | Sahasrabudhe et al. |
| 2011/0225174 A1 | | 9/2011 | Artzt et al. |
| 2011/0264664 A1 | | 10/2011 | Xiao et al. |
| 2012/0278336 A1 | | 11/2012 | Malik et al. |

OTHER PUBLICATIONS

The Free Dictionary, "List", Sep. 2, 2008, The Free Dictionaryby Farlex, http://web.archive.org/web/20080907205317/http://www.thefreedictionary.com/List (Year: 2008).*

U.S. Appl. No. 12/772,166, filed Apr. 30, 2010, Joshi, Ashutosh, et al..

U.S. Appl. No. 12/772,168, filed Apr. 30, 2010, Joshi, Ashutosh, et al..

U.S. Appl. No. 12/870,689, filed Aug. 27, 2010, Joshi, Ashutosh, et al..

U.S. Appl. No. 12/870,691, filed Aug. 27, 2010, Joshi, Ashutosh, et al.

Chakrabarti, Soumen, et al., "Focused Crawling: A New Approach to Topic-Specific Web Resource Discovery," Month Unknown, 1999, pp. 545-562, Elsevier Science B.V.

Kleinberg, Jon M., "Authoritative Sources In a Hyperlinked Environment," www.cs.cornell.edu/home/kleinber/, Preliminary version of this paper appeared in the Proceedings of the 9th Annual ACM-SIAM Symposium on Discrete Algorithms, Month Unknown, 1998, 34 pages.

Schatz, Bruce, et al., "Federating Diverse Collections of Scientific Literature," May 1996, pp. 28-36, IEEE.

Portions of Prosecution History of U.S. Appl. No. 12/870,689, Sep. 20, 2012, Joshi, Ashutosh, et al.

Portions of Prosecution History of U.S. Appl. No. 12/870,691, Oct. 12, 2012, Joshi, Ashutosh, et al.

Updated portions of Prosecution History of U.S. Appl. No. 12/870,689, Jan. 29, 2013, Joshi, Ashutosh, et al.

Updated portions of Prosecution History of U.S. Appl. No. 12/870,6891, Jan. 29, 2013, Joshi, Ashutosh, et al.

Author Unknown, "Histogram definition-Google Search", Retrieved from the Internet: URL: https://www.google.com/#hl=en&sugexp=

(56) References Cited

OTHER PUBLICATIONS les%3B&gs_rn=5&gs_ri=psy-ab&cp=11&gs_id=7n&xhr=t&q=Histogram+Definition&es_nrs=true&pf=p&sclient=psy-ab&oq=Histogram+D&gs_l=&pbx=1&bav=on.2,or.r_gc.r_pw.r_qf.&bvm=bv.43148975,d.aWM&fp=c1860044171a634f&biw=1540&bih=903 [Retrieved on Nov. 9, 2012].
Deerwester, Scott, et al., "Indexing by Latent Semantic Analysis" Journal of the American Society for Information Science, Sep. 1990, pp. 391-407, John Wiley & Sons, Inc.
Wagner, Susan F., "Harpercoilins College Outline Introduction to Statistics", Feb. 28, 1992, pp. 1-369, HarperCollines Publishers, Inc.
Amendment after Notice of Allowance (Rule 312) submitted on Jul. 18, 2017 in U.S. Appl. No. 12/772,168, pp. 1-8.
Patent Board Decision—Examiner Reversed dated Dec. 27, 2016 in U.S. Appl. No. 12/831,242, pp. 1-6.
Examiner's Answer to Appeal Brief dated Sep. 11, 2015 in U.S. Appl. No. 12/831,242, pp. 1-16.
Appeal Brief submitted Mar. 26, 2015 in U.S. Appl. No. 12/831,242, pp. 1-24.
Pre-Brief Appeal Conference Decision dated Jan. 26, 2015 in U.S. Appl. No. 12/831,242, pp. 1-2.
Notice of Appeal submitted Dec. 11, 2014 in U.S. Appl. No. 12/831,242, pp. 1-8.
Final Rejection dated Sep. 11, 2014 in U.S. Appl. No. 12/831,242, pp. 1-33.
Amendment and Response to Office Action submitted on Feb. 24, 2014 in U.S. Appl. No. 12/831,242, pp. 1-12.
Applicant Initiated Interview Summary (PTOL-413) dated Feb. 12, 2014 in U.S. Appl. No. 12/831,242, pp. 1-3.
Non-Final Rejection dated Oct. 25, 2103 in U.S. Appl. No. 12/831,242, pp. 1-32.
Request for Continued Examination (RCE) dated Aug. 12, 2013 in U.S. Appl. No. 12/831,242, pp. 1-12.
Final Rejection dated Feb. 11, 2013 in U.S. Appl. No. 12/831,242, pp. 1-31.
Applicant Initiated Interview Summary (PTOL-413) dated Oct. 16, 2012 in U.S. Appl. No. 12/831,242, pp. 1-4.
Amendment and Response to Office Action submitted on Oct. 9, 2012 in U.S. Appl. No. 12/831,242, pp. 1-14.
Non-Final Rejection dated Jun. 6, 2012 in U.S. Appl. No. 12/831,242, pp. 1-26.
Petition Decision dated Oct. 11, 2011 in U.S. Appl. No. 12/831,242, p. 1.
U.S. Appl. No. 12/772,166, filed Apr. 30, 2010, Ashutosh Joshi, et al.
U.S. Appl. No. 12/772,168, filed Apr. 30, 2010, Ashutosh Joshi, et al.
U.S. Appl. No. 12/870,689, filed Aug. 27, 2010, Ashutosh Joshi, et al.
U.S. Appl. No. 12/870,691, filed Aug. 27, 2010, Ashutosh Joshi, et al.
U.S. Appl. No. 12/870,694, filed Aug. 27, 2010, Ashutosh Joshi, et al.
U.S. Appl. No. 12/831,237, filed Jul. 6, 2010, Amit Gupta, et al.
U.S. Appl. No. 12/831,242, filed Jul. 6, 2010, Amit Gupta, et al.
U.S. Appl. No. 13/754,856, filed Jan. 30, 2013, Ashutosh Joshi, et al.
Babowal, D., et al., "From Information to Knowledge: Introducing WebStract's Knowledge Enineering Approach," Proceedings of the 1999 IEEE Canadian Conference on Electrical and Computer Engineering, May 9-12, 1999, pp. 1525-1530, IEEE.
Request for Continued Examination (RCE) dated Jun. 10, 2019 in U.S. Appl. No. 12/831,237, pp. 1-16.
Patent Board Decision—Examiner Affirmed dated Apr. 9, 2019 in U.S. Appl. No. 12/831,237, pp. 1-17.
Appeal Docketing Notice dated Jan. 9, 2018 in U.S. Appl. No. 12/831,237, pp. 1-2.
Certification and Transmittal of Appeal Forwarding Fee dated Dec. 22, 2017 in U.S. Appl. No. 12/831,237, pp. 1-2.
Examiner's Answer to Appeal Brief dated Oct. 26, 2017 in U.S. Appl. No. 12/831,237, pp. 1-11.
Appeal Brief filed on Jun. 23, 2017 in U.S. Appl. No. 12/831,237, pp. 1-33.
Notice of Appeal filed on Nov. 23, 2016 in U.S. Appl. No. 12/831,237, pp. 1-2.
Final Rejection dated Aug. 25, 2016 in U.S. Appl. No. 12/831,237, pp. 1-25.
Amendment and Response to Office Action dated Aug. 11, 2016 in U.S. Appl. No. 12/831,237, pp. 1-18.
Applicant Initiated Interview Summary (PTOL-413) dated Aug. 10, 2016 in U.S. Appl. No. 12/831,237, pp. 1-3.
Non-Final Rejection dated Feb. 11, 2016 in U.S. Appl. No. 12/831,237, pp. 1-20.
Request for Continued Examination (RCE) dated Aug. 5, 2015 in U.S. Appl. No. 12/831,237, pp. 1-19.
Notice of Appeal Filed dated May 5, 2015 in U.S. Appl. No. 12/831,237, pp. 1-3.
Final Rejection dated Jan. 5, 2015 in U.S. Appl. No. 12/831,237, pp. 1-17.
Amendment and Response to Office Action submitted dated Dec. 10, 2014 in U.S. Appl. No. 12/831,237, pp. 1-17.
Non-Final Rejection dated Sep. 11, 2014 in U.S. Appl. No. 12/831,237, pp. 1-15.
Request for Continued Examination (RCE) dated Apr. 28, 2014 in U.S. Appl. No. 12/831,237, pp. 1-17.
Non-Final Rejection dated Feb. 25, 2019 filed in U.S. Appl. No. 12/831,242, pp. 1-10.
Decision on Petition mailed on Jan. 28, 2019 in U.S. Appl. No. 12/831,242, pp. 1-2.
Request for Continued Examination submitted dated May 8, 2018 in U.S. Appl. No. 12/831,242, pp. 1-29.
Final Rejection dated Nov. 9, 2016 in U.S. Appl. No. 12/831,242, pp. 1-27.
Amendment and Response to Office Action submitted dated Aug. 11, 2016 in U.S. Appl. No. 12/831,242, pp. 1-22.
Non-Final Rejection dated Feb. 11, 2016 in U.S. Appl. No. 12/831,242, pp. 1-36.
Request for Continued Examination submitted dated Jul. 20, 2015 in U.S. Appl. No. 12/831,242, pp. 1-20.
Final Rejection dated Apr. 20, 2015 in U.S. Appl. No. 12/831,242, pp. 1-33.
Amendment and Response to Office Action submitted dated Dec. 30, 2014 in U.S. Appl. No. 12/831,242, pp. 1-15.
Non-Final Rejection dated Sep. 30, 2014 in U.S. Appl. No. 12/831,242, pp. 1-23.
Amendment and Response to Office Action submitted dated Sep. 19, 2014 in U.S. Appl. No. 12/831,242, pp. 1-8.
Notice of Appeal submitted on Dec. 30, 2013 in U.S. Appl. No. 12/831,242, pp. 1-2.
Final Rejection dated Aug. 30, 2013 in U.S. Appl. No. 12/831,242, pp. 1-32.
Amendment and Response to Office Action submitted dated Aug. 15, 2013 in U.S. Appl. No. 12/831,242, pp. 1-13.
Non-Final Rejection dated Feb. 15, 2013 in U.S. Appl. No. 12/831,242, pp. 1-16.
Response to Amendment Under Rule 312 dated May 9, 2013 in U.S. Appl. No. 12/870,689, pp. 1-3.
Amendment after Notice of Allowance (Rule 312) submitted Apr. 29, 2013 in U.S. Appl. No. 12/870,689, pp. 1-9.
Amendment and Response to Office Action submitted Sep. 20, 2012 in U.S. Appl. No. 12/870,689, pp. 1-13.
Non-Final Rejection dated Jun. 20, 2012 in U.S. Appl. No. 12/870,689, pp. 1-16.
Final Rejection dated Jan. 28, 2014 filed in U.S. Appl. No. 12/831,237, pp. 1-13.
Amendment and Response to Office Action submitted dated Oct. 8, 2018 filed in U.S. Appl. No. 12/831,237, pp. 1-11.
Non-Final Rejection dated May 8, 2013 filed in U.S. Appl. No. 12/831,237, pp. 1-14.
Amendment and Response to Election/Restriction Requirement submitted dated Jan. 4, 2013 filed in U.S. Appl. No. 12/831,237, pp. 1-6.

(56) References Cited

OTHER PUBLICATIONS

Requirement for Restriction/Election dated Dec. 5, 2012 in U.S. Appl. No. 12/831,237, pp. 1-7.
Petition Decision mailed Oct. 17, 2011 in U.S. Appl. No. 12/831,237, p. 1.
Response to Amendment Under Rule 312 dated May 9, 2013 in U.S. Appl. No. 12/870,691, pp. 1-3.
Amendment after Notice of Allowance submitted dated Apr. 29, 2013 in U.S. Appl. No. 12/870,691, pp. 1-8.
Applicant Summary of Interview with Examiner submitted dated Nov. 12, 2012 in U.S. Appl. No. 12/870,691, pp. 1-2.
Applicant Initiated Interview Summary dated Oct. 12, 2012 in U.S. Appl. No. 12/870,691, pp. 1-3.
Amendment and Response to Office Action submitted dated Sep. 14, 2012 in U.S. Appl. No. 12/870,691, pp. 1-13.
Non-Final Rejection dated Jun. 14, 2012 in U.S. Appl. No. 12/870,691, pp. 1-15.
Notice of Allowance dated Sep. 10, 2019, filed in U.S. Appl. No. 12/831,242, pp. 1-9.
Response to Non-Final Office Action dated Aug. 26, 2019, filed in U.S. Appl. No. 12/831,242, pp. 1-14.
Notice of Allowance dated Dec. 27, 2019, filed in U.S. Appl. No. 12/772,166, pp. 1-10.
Response to Non-Final Office Action dated Dec. 11, 2019, filed in U.S. Appl. No. 12/772,166, pp. 1-13.
Non-Final Rejection dated Jul. 11, 2019, filed in U.S. Appl. No. 12/772,166, pp. 1-9.
Notice of Allowance dated Aug. 4, 2017, filed in U.S. Appl. No. 12/772,168, pp. 1-4.
Notice of Allowance dated Jul. 15, 2019, filed in U.S. Appl. No. 15/662,271, pp. 1-15.
Examiner-Initiated Interview Summary dated Jul. 15, 2019, filed in U. S. U.S. Appl. No. 15/662,271, p. 1.
Response to Amendment under Rule 312 dated Jul. 10, 2014 in U.S. Appl. No. 12/772,166, pp. 1-2.
Amendment after Notice of Allowance (Rule 312) dated Jun. 26, 2014 in U.S. Appl. No. 12/772,166, pp. 1-8.
Examiner-Initiated Interview Summary dated in Apr. 9, 2014 in U.S. Appl. No. 12/772,166, p. 1.
Amendment and Response to Office Action dated Feb. 24, 2014 in U.S. Appl. No. 12/772,166, pp. 1-12.
Applicant Initiated Interview Summary (PTOL-413) dated Feb. 13, 2014 in U.S. Appl. No. 12/772,166, pp. 1-3.
Non-Final Rejection dated Oct. 25, 2013 in U.S. Appl. No. 12/772,166, pp. 1-33.
Final Rejection dated Nov. 20, 2012 in U.S. Appl. No. 12/772,166, pp. 1-29.
Amendment and Response to Office Action dated Aug. 23, 2012 in U.S. Appl. No. 12/772,166, pp. 1-10.
Non-Final Rejection dated May 23, 2012 in U.S. Appl. No. 12/772,166, pp. 1-26.
Request for Continued Examination (RCE) submitted May 23, 2019 in U.S. Appl. No. 15/662,271, pp. 1-19.
Response to Final Office Action dated Apr. 23, 2019 in U.S. Appl. No. 15/662,271, pp. 1-15.
Final Rejection dated Nov. 23, 2018 in U.S. Appl. No. 15/662,271, pp. 1-21.
Response to Non-Final Office Action dated Aug. 22, 2018 in U.S. Appl. No. 15/662,271, pp. 1-23.
Non-Final Rejection dated Mar. 22, 2018 in U.S. Appl. No. 15/662,271, pp. 1-10.
Preliminary Amendment submitted Jul. 28, 2017 in U.S. Appl. No. 15/662,271, pp. 1-3.

\* cited by examiner

*Figure 11*
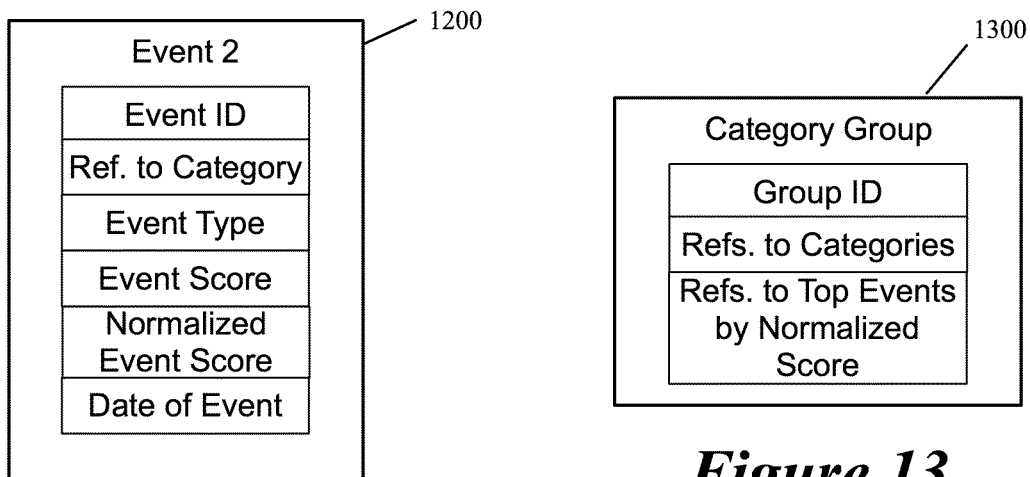
*Figure 12*
*Figure 13*

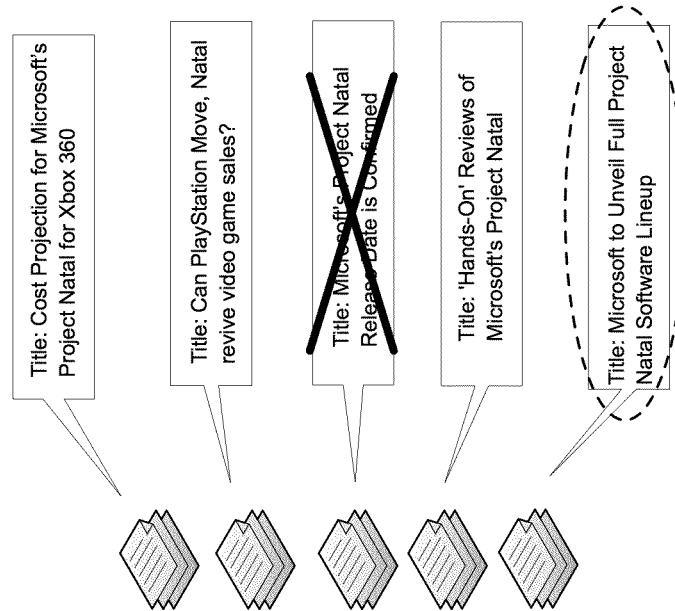
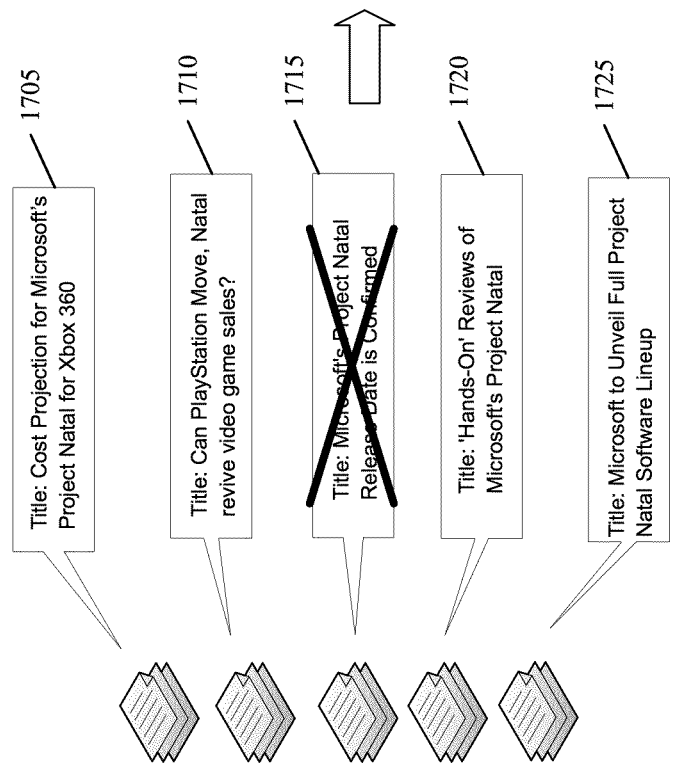
Figure 20

*Figure 25*

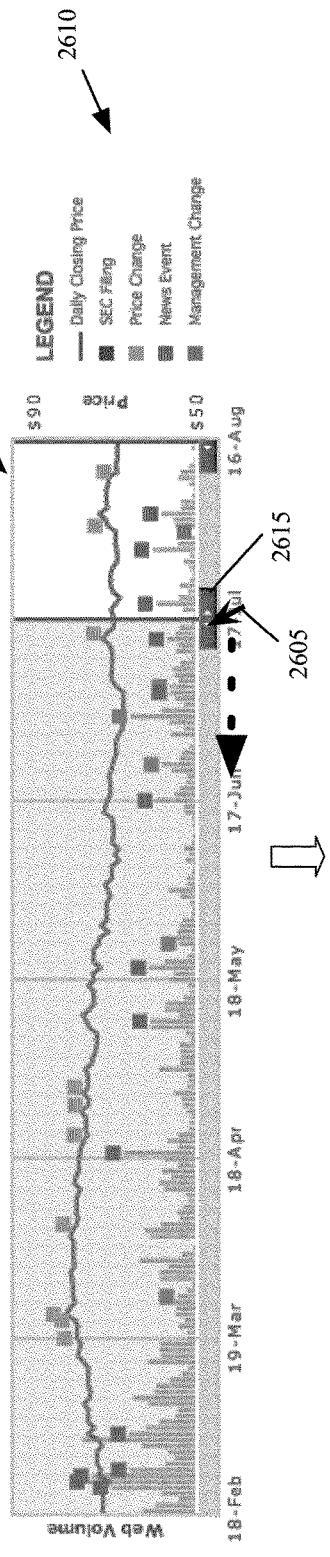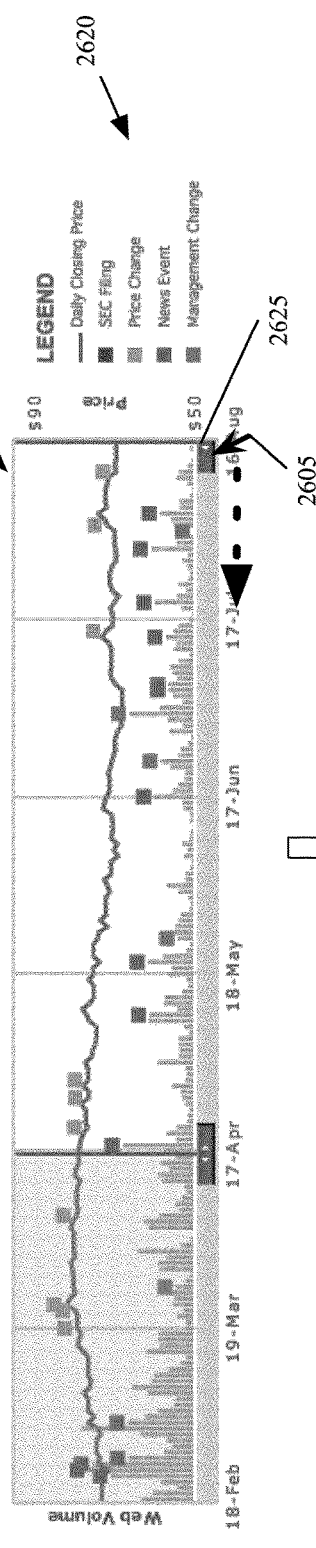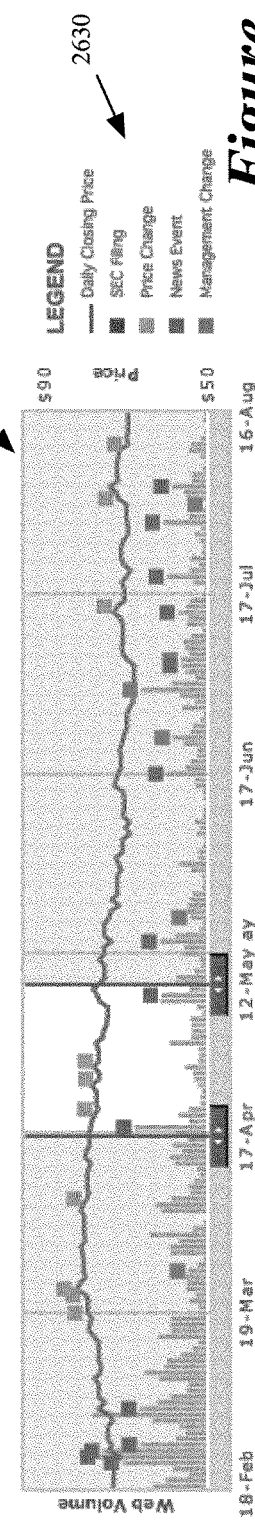
Figure 26

*Figure 32*

GRAPHICAL USER INTERFACE FOR PRESENTATION OF EVENTS

CLAIM OF BENEFIT TO PRIOR APPLICATIONS

This application claims the benefit of U.S. Provisional Application 61/316,824, entitled "Method and System for Document Differentiation", filed Mar. 23, 2010, and U.S. Provisional Application 61/330,875, entitled "System and Method for Event Detection", filed May 3, 2010. Applications 61/316,824 and 61/330,875 are incorporated herein by reference.

BACKGROUND

Most information today is stored electronically and is available on the World Wide Web. This information includes blog posts, articles (e.g., news articles, opinion pieces, etc.), research papers, web pages, and many other types of documents. While having this much information available is useful, it may be very difficult to find information relevant to a particular topic.

Search engines exist today to attempt to find documents on the web that relate to a search string input by the user. However, most search engines base their search on just the words and operators (e.g., "and", "or", etc.) entered by a user. When a user searches for a particular topic, the search engine will only find documents that use the entered word or words, which will lead to many relevant documents being completely overlooked. Such search engines cannot provide a good overview of the documents that surround a particular topic.

Furthermore, search engines do not easily identify current and past occurrences in a systematic manner. Users can hope that an article pops up indicating what has happened with a particular company, but there is no guarantee (or even likelihood) of such an article. Furthermore, the search engines do not present a user with any notion of the importance of an occurrence for a company or other entity.

BRIEF SUMMARY

Some embodiments provide a novel event detection system for identifying an increase in the number of documents pertaining to a particular category (e.g., a company, product, industry, person, or other topic) over a particular period of time (e.g., a day). In some embodiments, the system retrieves numerous documents and identifies the relevancy of the documents to the particular category. The system compares the volume of documents relevant to the category over the particular period of time to a historical volume of documents relevant to the category. Based on this comparison, the system determines whether an event has occurred for the category for the particular period of time.

In order to identify such events, the system of some embodiments retrieves documents on a periodic or continual basis (e.g., using a web crawler). The documents may be text files, HTML files, PDF files, word-processor files, etc. Each of the documents contains a set of document elements, including content elements (e.g., glyphs, letters, words, punctuation, numerical characters, symbols, etc.) and structural elements (e.g., markup tags, headers, sections, columns, dividers, lines, etc.). The system analyzes the documents using category models that score the documents for relevancy to a particular category. Each model includes data that is used to identify documents related to the business line or company that the model represents. In some embodiments, the models include patterns of document elements associated with scores. The patterns of document elements and associated scores are used to determine the document's relevance to a category.

Based on the classification of the documents, the system identifies events for the categories. For a particular category, the system identifies the number of documents relevant to the category over a current time period (e.g., the current day) and an average number of documents relevant to the category for a background time period (e.g., the month prior to the current day). The system assigns an event score to the documents that quantifies the extent to which the current document volume is anomalously high. Some embodiments subtract the average background document volume from the current document volume and divide this difference by the standard deviation of the background document volume. When the event score for a particular category and time period is above a particular threshold, the system determines that an event has occurred for the category in the particular time period.

Some embodiments compare event scores across categories. However, due to the different average document volumes of different categories (e.g., in general, many more documents will appear on the world wide web pertaining to a major corporation such as Microsoft than a very small software company with one product), a meaningful comparison of the importance or scope of events in different categories may not be available using the event scores. Accordingly, some embodiments normalize the scores across a set of categories. The scores may be normalized across all categories, or across a particular subset of categories (e.g., all companies in a particular industry, a set of related industries, etc.).

To normalize the scores, some embodiments use a multiplier for each category's event score. For a particular category, the system identifies a multiplier based on the average volume of documents relating to that category in some embodiments. In general, the larger the number of documents regularly related to the category, the higher the multiplier for the category's events. In addition, some embodiments recalculate the event score using a minimum standard deviation (e.g., one) when the standard deviation used to calculate the event score is below the minimum.

Some embodiments identify a name and/or representative document for each event. In some embodiments, the system uses the title of the representative document of an event as the name for the event. To identify the representative document, some embodiments identify a set of event keywords. These keywords may be a set of terms, phrases, etc. that are more prevalent in the documents classified as relevant to the event's category for the current time period than in the documents classified as relevant to the event's category over the background time period. The system identifies these event keywords, and then searches the current time period documents relevant to the category for those in which the event keywords are most prevalent. Some embodiments score each of the documents based on the presence of the event keywords. The document with the highest such score is stored as the representative document for the event, and some embodiments use the title of this document as the name for the event. Some embodiments also store other documents with high scores as backup documents.

Like any other document on the web, the representative documents may be moved to a different location (i.e., accessed with a different Uniform Resource Locator (URL)), removed entirely, or password protected after being stored as a representative document. Accordingly, some embodiments regularly test the links to representative documents and substitute a replacement document as a representative document when the current representative document has been moved, removed, etc.

The system of some embodiments presents the data described above to users of the system via a user interface. In some embodiments, users search for information about a particular category, and the system retrieves information about the category to present to the user. The information may include documents classified as relevant to the category for a desired time period, events for the category, etc. In some embodiments, each event is presented with its name (e.g., the title of the representative document). When the user selects the event, some embodiments direct the user's application (e.g., web browser) to the URL for the representative document for the event.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 11 illustrates an example of a volume profile of some embodiments for a set of categories.

FIG. 12 conceptually illustrates an event data structure that includes a normalized event score for the event.

FIG. 13 conceptually illustrates a data structure for a related set of categories across which events are normalized and compared.

FIGS. 20 and 21 illustrate the identification of representative documents for an event.

FIG. 25 illustrates a GUI of some embodiments that is presented to a user (e.g., via a user's web browser operating on the user's computing device).

FIG. 26 illustrates the document volume graph of FIG. 25 in three stages as a user modifies the date window.

FIG. 32 illustrates another view of the GUI of FIG. 31 that includes additional sections in the display area.

DETAILED DESCRIPTION OF THE INVENTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel event detection system for identifying an increase in the number of documents pertaining to a particular category over a particular period of time (e.g., a day). In some embodiments, the system retrieves numerous documents and identifies the relevancy of the documents to the particular category. The system compares the volume of documents relevant to the category over the particular period of time to a historical volume of documents relevant to the category. Based on this comparison, the system determines whether an event has occurred for the category for the particular period of time.

In some embodiments, the events are detected for categories within a system that stores information for numerous (i.e., thousands) of categories, including companies (e.g., Microsoft, Intel, General Motors, etc.), industries (e.g., software, microprocessors, automobiles, etc.), products (e.g., Bing, Xbox, Windows 7, etc.), people (e.g., Bill Gates, Steve Ballmer, etc.), or any other category about which users of the system may want to research. The stored information in some embodiments includes the number of documents relevant to each of these categories each day and events identified for the categories. This information is accessed by and displayed to users of the system.

Figure 1:
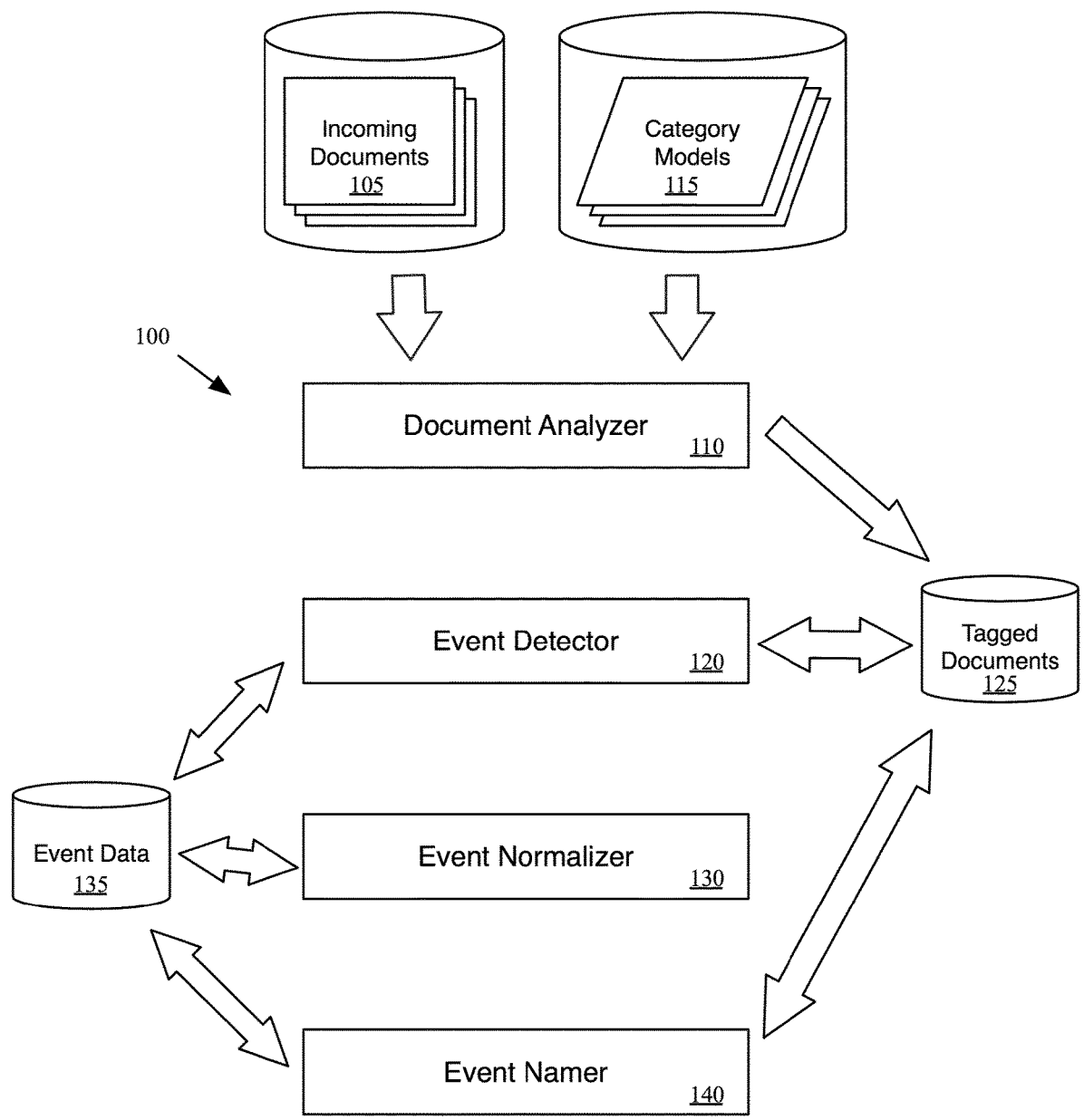
FIG. 1 conceptually illustrates a system of some embodiments for detecting document volume events for one or more categories.

FIG. 1 conceptually illustrates such a system 100 of some embodiments for detecting document volume events for one or more categories. The system 100 of some embodiments includes a document analyzer 110, an event detector 120, an event normalizer 130, and an event namer 140. The system 100 also includes tagged document storage 125 and event data storage 135.

The document analyzer 110 receives as input documents 105 and category models 115. Document analyzer 110 analyzes incoming documents 105 using the category models 115 to identify the relevance of the documents to the categories (e.g., companies, products, people, topics, industries, etc.) represented by the models. When a document is relevant to a particular category, the document analyzer 110 tags the document with the category. Some embodiments store a data structure (e.g., database entry) for the document with these tags separate from document content.

In order to identify such events, the system 100 of some embodiments retrieves documents on a periodic or continual basis (e.g., using a web crawler). The documents may be text files, HTML files, PDF files, word-processor files, etc. Each of the documents contains a set of document elements, including content elements (e.g., glyphs, letters, words, punctuation, numerical characters, symbols, etc.) and structural elements (e.g., markup tags, headers, sections, columns, dividers, lines, etc.).

As described above, the models 115 are used for a particular business line or company to identify documents relevant to the particular business line or company. Each model includes data that is used to identify documents related to the business line or company that the model represents. In some embodiments, the models include patterns of document elements associated with scores, as well as parameters used in the analysis of documents by the model.

The patterns of document elements stored in the models may be any pattern (e.g., an uninterrupted sequence of words, groups of words within a certain proximity of each other, pairs of words within a certain proximity of each other, etc.). For example, the patterns of document elements of some models is a pair of word sets, with an anchor word set and other word sets within the context of the anchor word forming a pair of word sets. Different word set pairs of the model may have different associated scores that are used in calculating a score for a document that contains the word set pairs.

In some embodiments, the document analyzer 110 applies the models 115 to each of the documents 105 by identifying the patterns of document elements in the document. The document analyzer 110 calculates a relevance score for each document's relation to each of the categories represented by the models. The relevance score for each document is calculated based on the patterns identified in the document and their associated scores. When word pairs are utilized as the patterns of document elements, some embodiments calculate the relevance score for each document as the arithmetic mean of the scores for the word pairs identified in the document. Other embodiments calculate the relevance score as a sum, median, or other function of the scores for the identified word pairs.

The relevance of a particular document to a category varies based on the calculated score. When the document's relevance score for a particular category is above a threshold, the document is tagged, or otherwise related, to the particular category. The document analyzer 110 stores the document and the tags indicating its relevancy to various categories in the storage 125.

Using the documents 125 tagged as relevant to various categories, the event detector 120 identifies events for the categories. For a particular category, the event detector 120 identifies the number of documents relevant to the category over a current time period (e.g., the current day) and an average number of documents relevant to the category for a background time period (e.g., the month prior to the current day). The event detector 120 assigns an event score to the documents that quantifies the extent to which the current document volume is anomalously high. Some embodiments subtract the average background document volume from the current document volume and divide this difference by the standard deviation of the background document volume. When the event score for a particular category and time period is above a particular threshold, the event detector 120 determines that an event has occurred for the category in the particular time period. The occurrence of the event, the category to which the event relates, and the event score are all stored in the event data storage 135 in some embodiments.

The event normalizer 130 of some embodiments compares event scores across categories. However, due to the different average document volume of different categories (e.g., in general, many more documents will appear on the world wide web pertaining to a major corporation such as Microsoft than a very small software company with one product), a meaningful comparison of the importance or scope of events in different categories may not be available using the event scores. Accordingly, the event normalizer 130 normalizes the scores across a set of categories. The scores may be normalized across all categories, or across a particular subset of categories (e.g., all companies in a particular industry, a set of related industries, etc.).

To normalize the scores, some embodiments use a multiplier for each category's event score. For a particular category, the event normalizer 130 determines a multiplier based on the average volume of documents relating to that category in some embodiments. In general, the larger the number of documents regularly related to the category, the higher the multiplier for the category's events. In addition, some embodiments recalculate the event score using a minimum standard deviation (e.g., one) when the standard deviation used to calculate the event score is below the minimum. The event normalizer 130 stores the normalized event scores in the event data storage 135.

The event namer 140 of some embodiments identifies a name and/or representative document for each event. In some embodiments, the event namer 140 uses the title of the representative document of an event as the name for the event. To identify the representative document, some embodiments identify a set of event keywords. These keywords may be a set of terms, phrases, etc. that are more prevalent in the documents classified as relevant to the event's category for the current time period than in the documents classified as relevant to the event's category over the background time period. The event namer 140 identifies these event keywords, and then searches the current time period documents relevant to the category for those in which the event keywords are most prevalent. Some embodiments score each of the documents based on the presence of the event keywords. The document with the highest such score is stored in event data storage 135 as the representative document for the event, and some embodiments also store the title of this document as the name for the event. Some embodiments additionally store other documents with high scores as backup documents in event data 135.

Like any other document on the web, the representative documents may be moved to a different location (i.e., accessed with a different Uniform Resource Locator (URL)), removed entirely, or password protected after being stored as a representative document. Accordingly, the event namer 140 regularly tests the links to representative documents and substitutes a replacement document as a representative document when the current representative document has been moved, removed, etc., in some embodiments.

The system of some embodiments presents the data described above to users of the system via a user interface. In some embodiments, users search for information about a particular category, and the system retrieves information about the category to present to the user. The information may include documents classified as relevant to the category for a desired time period, events for the category, etc. In some embodiments, each event is presented with its name (e.g., the title of the representative document). When the user selects the event, some embodiments direct the user's application (e.g., web browser) to the URL for the representative document for the event.

Several more detailed embodiments are described in the sections below. Section I describes the classification of documents as relevant to one or more categories. Section II describes the calculation of event scores and detection of document volume events. Section III then discusses the normalization of the event scores across a set of categories. Section IV describes the naming of events and identification of representative documents, while Section V describes the maintenance of links to such representative documents. Section VI describes the use of detected events about a category to predict upcoming occurrences for the category. Section VII then discusses the graphical user interface of some embodiments. Section VIII describes the software architecture of a system that generates the event data and provides the data to third party users through the graphical user interface. Finally, Section IX describes a computing device which implements some embodiments of the invention.

I. Document Classification

In order to detect events for a particular category, some embodiments identify a set of documents relevant to the particular category for a given time period. For instance, some embodiments search the World Wide Web on a daily or continuing basis for new content and classify the content as relevant to a wide variety of categories (e.g., thousands of categories, including companies, people, products, industries, topics, etc.).

Figure 2:
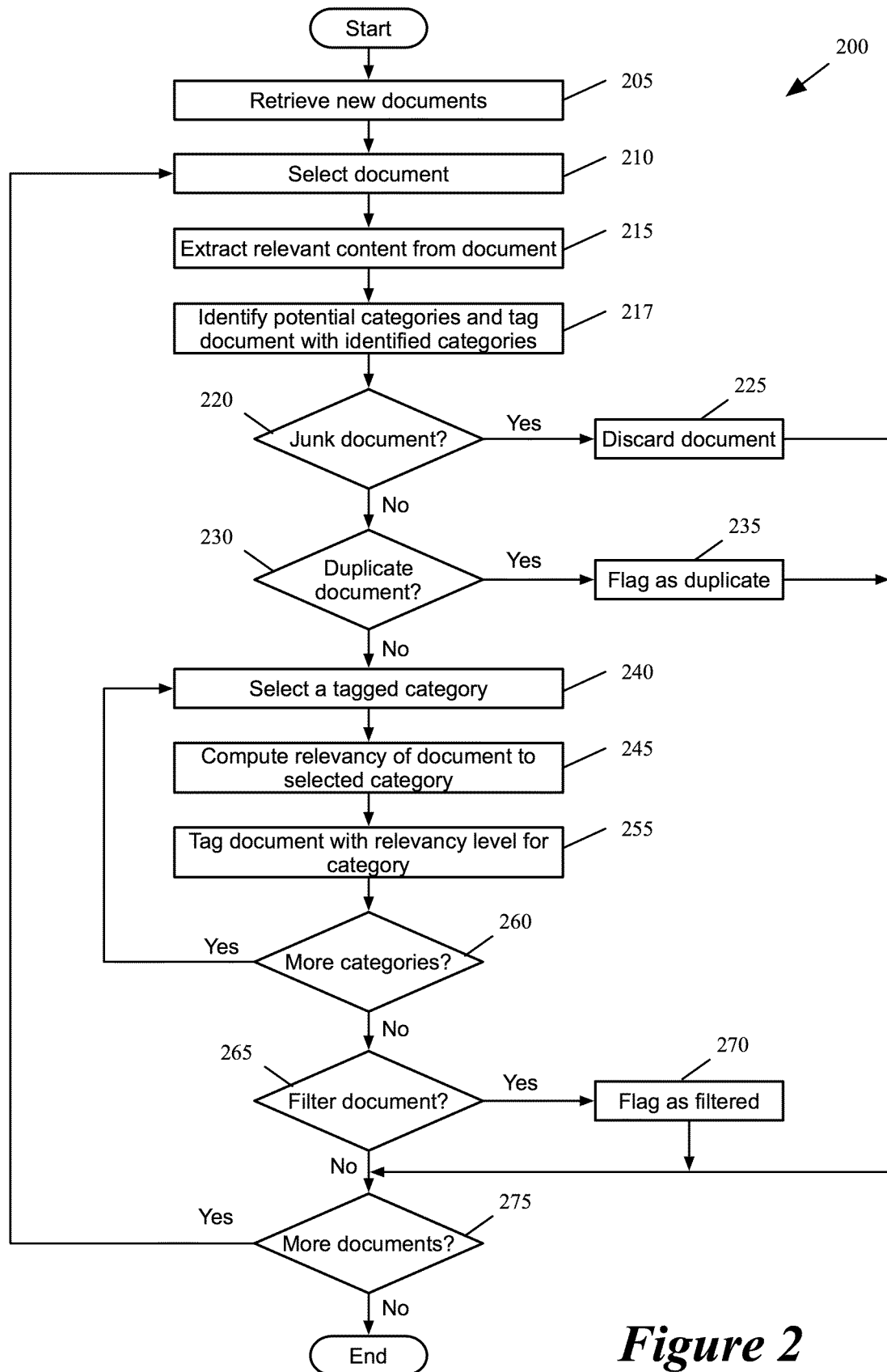
FIG. 2 conceptually illustrates a process of some embodiments for determining whether documents are relevant to a set of categories and whether the documents are counted for event determination.

FIG. 2 conceptually illustrates a process 200 of some embodiments for determining whether documents are relevant to a set of categories and whether the documents are counted for event determination. In some embodiments, the process 200 is performed by a research system on a regular (e.g., hourly, daily, etc.) basis or continuously as new documents are identified.

As shown, the process 200 begins by retrieving (at 205) one or more new documents. As mentioned, these documents may be retrieved from the World Wide Web in some embodiments. Some embodiments store copies of the retrieved documents in a database so that new documents can be processed as a group, or store links to the documents in a database. When the documents (or links to the documents) are stored in a database, some embodiments wait until a specified time (e.g., every hour) to retrieve all new documents and evaluate and categorize the new documents as a group.

The process then selects (at 210) a document for evaluation. Some embodiments select the documents randomly, while other embodiments select the documents in a particular order (e.g., the order in which the documents are detected by a webcrawler and stored in the database). In some embodiments, the documents are evaluated on the fly (i.e., as they are detected as new by the webcrawler), so the documents are evaluated in the order of detection.

The process then extracts (at 215) relevant content from the selected document. A web document (e.g., an html document) will often have various embedded information that is not relevant to the content of the article, such as advertisements, links to other articles or other portions of a website, etc. In some cases, the markup language of an html document is removed as well. Some embodiments use the markup language to identify relevant content (e.g., title and body paragraph tags). The relevant content of a document in some embodiments is the document's title and main body. Some embodiments perform the extraction upon retrieval from the web and store only the extracted content rather than the entire document.

Next, the process identifies (at 217) potential categories to which the document may be relevant. Some embodiments examine, for the selected document, each category in the system and determine whether the document may be relevant to the category. Some embodiments make a binary decision based on the presence or non-presence of certain keywords whether the document is likely to be relevant to each of the categories. This enables the system to perform the more computation-intensive process of computing a relevancy score, described below at operation 245, only for those categories for which the document may be relevant. For instance, a document about a new software product would most likely be classified as not potentially relevant to the auto industry, thereby saving the time of computing a score for the document's relevancy to the auto industry.

The process 200 then determines (at 220) whether the document is a junk document. Some embodiments eliminate specific types of documents as junk due to the likelihood that the document is not of interest to a user searching for a category and will not be indicative of a spike in web volume for a category. Examples of types of documents that are classified as junk by various embodiments include non- English documents, documents with excessive use of profanity or abuse words (e.g., when the percentage of such words is above a particular threshold), pornographic documents, documents older than a particular threshold date (i.e., documents that show up as new but can be identified as old based on an extracted date), documents with an offensive or inappropriate title, local incidents (e.g., shop fires, traffic accidents, etc.), sporting event results (i.e., soccer match or auto racing results may mention a team or driver's sponsors, but the document is not relevant to the sponsor companies), or general documents that may be identified based on titles (e.g., general business briefs, news roundups, etc.).

When a document is classified as junk, the process discards (at 225) the document. This may involve removing the document from a database of documents, or flagging the document as junk. When a junk document is removed from the database, some embodiments enter the location of the junk document into a list or separate database, so that the junk document will not be retrieved again when crawling the web. After discarding the document, the process proceeds to 275, described below.

When the document is not junk, the process determines (at 230) whether the document is a duplicate of another document already evaluated. To identify duplicate documents, some embodiments compare titles, abstracts, authors, dates, keyword locations, and/or the entire text of documents. Some embodiments perform an initial check for duplicate titles (or another quickly checked indicator), then check more detailed content when the titles match. Some embodiments do not require verbatim similarly, so long as the documents are substantially similar. Often, duplicate documents come about due to a press release (i.e., from a company) or a newswire story (e.g., from Associated Press or Reuters).

When the document is a duplicate, the process flags (at 235) the document as such by indicating a document group of which it is a part. Some embodiments store a group identifier in a database entry for the document that matches a group identifier for other documents of which the current document is a duplicate. Other embodiments store a reference to the first such document evaluated (which would not be flagged as a duplicate at the time). Some embodiments do not count duplicate documents towards a total number of documents determining whether an event has occurred, but nevertheless store the document. Some users of the system may wish to know how many times a document appears, and all the locations at which it appears. For instance, a marketing executive working for a particular company might want to be able to use the system to identify all instances of a press release about the particular company on the web. After flagging the document as a duplicate, the process 200 proceeds to 275, described below.

When the document is neither junk nor a duplicate, the process selects (at 240) a tagged category for the document (i.e., one of the categories for which the document was tagged as potentially relevant at operation 217). The process may select the categories in a random order or may select them in a systematic order (e.g., alphabetical, selecting certain types of categories first, etc.).

The process computes (at 245) the relevancy of the selected document to the selected category. In order to compute a relevancy score for a category, some embodiments use a model for the category that looks for patterns of document elements (e.g., words) in a document and assigns a score for the document based on the presence of the patterns of document elements. For instance, some embodiments use a model that assigns scores for particular keywords relevant to the category as well as the location in the document of the keyword (e.g., title, summary paragraph, body, etc.). Some embodiments use a model that looks for particular pairs of keywords and words within a context (e.g., a particular number of consecutive words, the same sentence, the same paragraph, etc.) of the keyword, and assigns positive or negative scores to the document based on keyword pairs found in the documents. The classification of documents to various categories using such models is described in further detail in U.S. patent application Ser. No. 12/772,166, filed Apr. 30, 2010 and entitled "Classification of Documents" (referred to hereinafter as "the '166 application"), which is incorporated herein by reference.

Based on the computed relevancy score for the category, the process tags (at 255) the document with a relevancy level for the category. Some embodiments define relevancy levels (e.g., low, medium, high) for each category as ranges of relevancy scores. The process determines which level the selected document falls into based on the computed relevancy score. The levels may be the same range of scores for all categories or may be varied across categories. Some embodiments enable an administrator of the system to manually set the scores. The ranges for at least some of the categories are set based on a volume breakdown of the documents, in some embodiments (i.e., a particular percentage of documents tagged to a particular category should be in the high, medium, and low relevancy levels).

Figure 3:
FIG. 3 conceptually illustrates a portion of a document database that stores relevancy information for a number of documents.

In some embodiments, the tagging entails modifying a database entry for the document to include fields for the category, the score, and/or the level. Some embodiments do not store the relevancy level, but instead only store the document's score for each of its categories. The system can easily ascertain the relevancy level, for instance by using a look-up table. FIG. 3 conceptually illustrates a portion of a document database 300 that stores relevancy information for a number of documents. As shown, the document database 300 includes, for each document, a number of categories and the relevancy score for the category. For instance, Document 2 is relevant to Category B and Category D, while Document 3 is relevant to at least Category A, Category B, and Category C. One of ordinary skill will recognize that the relevancy information for a set of documents can be stored in a wide variety of data structures, and need not be stored in a database such as illustrated in FIG. 3.

The process 200 next determines (at 260) whether there are any more categories for which the selected document's relevancy should be evaluated. When the document is initially tagged with potentially relevant categories at operation 217, the process evaluates the document for relevancy to each of these categories. When more categories remain, the process returns to 240 to select a new category.

When a document has been evaluated for all categories, the process determines (at 265) whether to filter the document for event detection purposes. Some embodiments will filter out content for the purpose of determining a document volume (and thereby detecting events) as described in further detail in Section II, but will keep the document in the system as tagged with relevant categories. Thus, the document will still be presented to a user who is researching a particular category. Some embodiments filter out specific types of sources and content, such as message boards, job postings, research reports, product reviews, market updates, obituaries, e-commerce and coupon sources, etc. Some embodiments will also filter out very short or very long documents, documents classified as relevant to many companies (indicating that the document is likely an overview document), or other types of documents not indicative of an event.

When the process determines that the document should be filtered, the process flags (at 270) the document as such. Some embodiments store a binary value in a database entry for the document (i.e., 0 for not filtered or 1 for filtered). Some embodiments do not store any value unless a document is filtered and store a flag in the database indicating that a document is filtered and should not be counted.

After the evaluation of the document is complete, the process determines (at 275) whether any more documents remain to be evaluated. As mentioned, some embodiments process many documents at a time, while other embodiments run process 200 (or a similar process) whenever a new document is identified.

Figure 4:
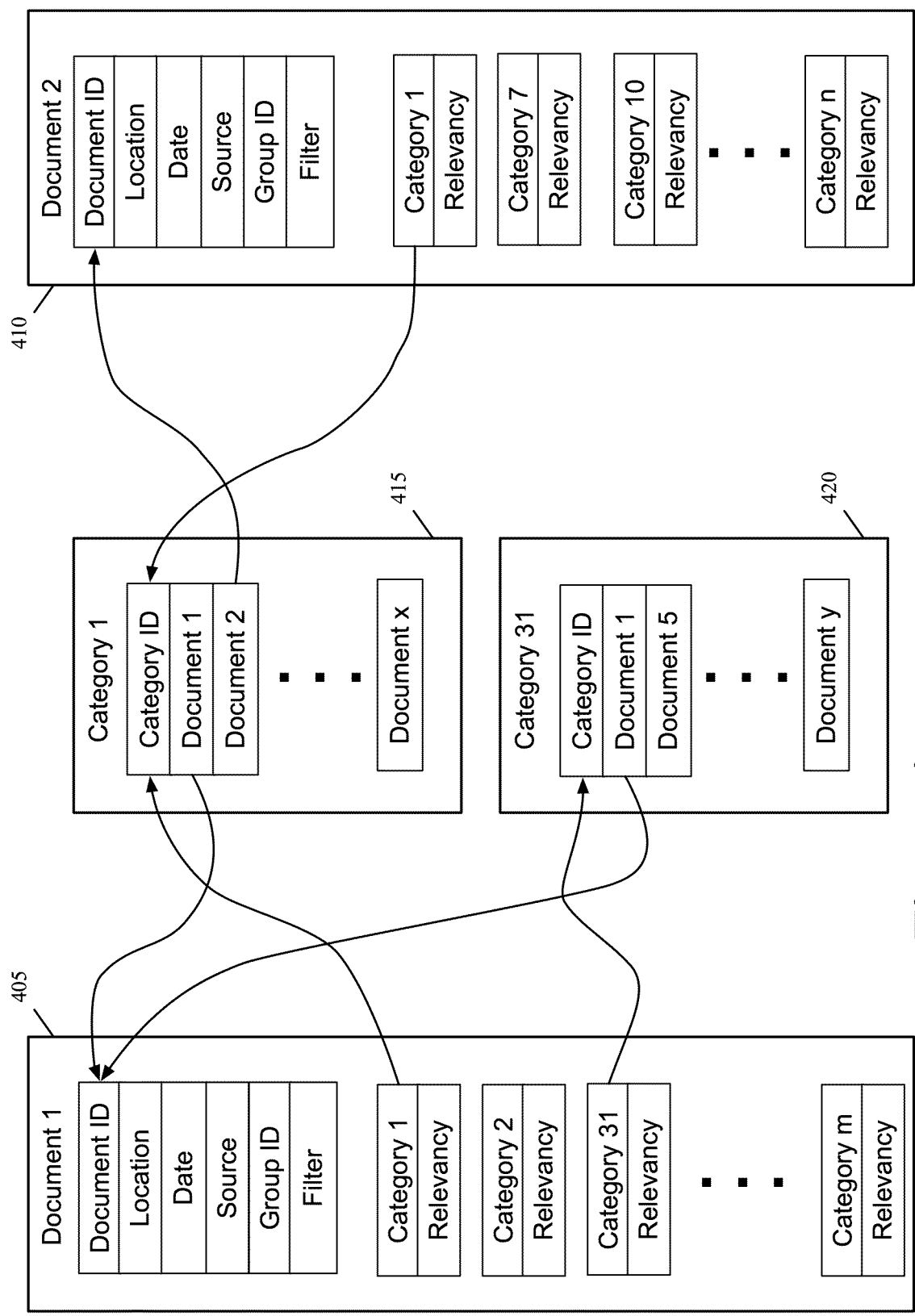
FIG. 4 illustrates an example of data structures for documents (e.g., entries in a document database) as well as corresponding data structures for categories.

As mentioned, some embodiments store information about the relevancy of documents to various categories, along with other information about the document, in a document database or other data structure. FIG. 4 illustrates an example of data structures for documents (e.g., entries in a document database) as well as corresponding data structures for categories. Some embodiments include a category database and store a list of documents relevant to the category, as illustrated in FIG. 4. Other embodiments do not store a list of documents (i.e., do not store the document-category association in two directions), but do include data structures for categories.

FIG. 4 illustrates data structures 405 for Document 1 and 410 for Document 2. The data structures 405 and 410 each include a document identifier, a location, a date, a source, a group identifier, and a filtering flag. The document identifier of some embodiments is a unique identifier (e.g., a number or combination of numbers and letters) that uniquely identifies the document in the system. The location field identifies a location on the web (e.g., a Uniform Resource Locator) at which the document can be found. In the date field, some embodiments store the date on which a webcrawler found the document, while other embodiments extract a date from the document (e.g., via a dateline on an article) and store the extracted date when possible. The source field identifies the source of a document (e.g., the New York Times, Huffington Post, etc.). Some embodiments store the name of the source in the field, while other embodiments store a number that refers to a list of sources. The group identifier field identifies a group of duplicate documents. Rather than store a group identifier, some embodiments instead store a reference to a primary document (e.g., the first document found of a set of duplicate documents). The filtering flag is a binary field in some embodiments that identifies whether the document should be counted for event detection.

In addition, the document data structures 405 and 410 include a list of categories to which the document is relevant and the relevancy scores for those categories. Document 1, for example, is relevant to Category 1, Category 2, Category 31, etc. In some embodiments, the categories are listed as references (e.g., pointers) to a category data structure. These references are illustrated in FIG. 4 by arrows from the category references to category data structures 415 and 420.

The category data structures 415 and 420 include a category identifier and a list of documents that are relevant to the category. As mentioned, in some embodiments the category data structures do not include such a list of documents, and the relevancy information is only stored in the document data structure. As will be described further below, some embodiments include other information in the category data structures.

Figure 5:
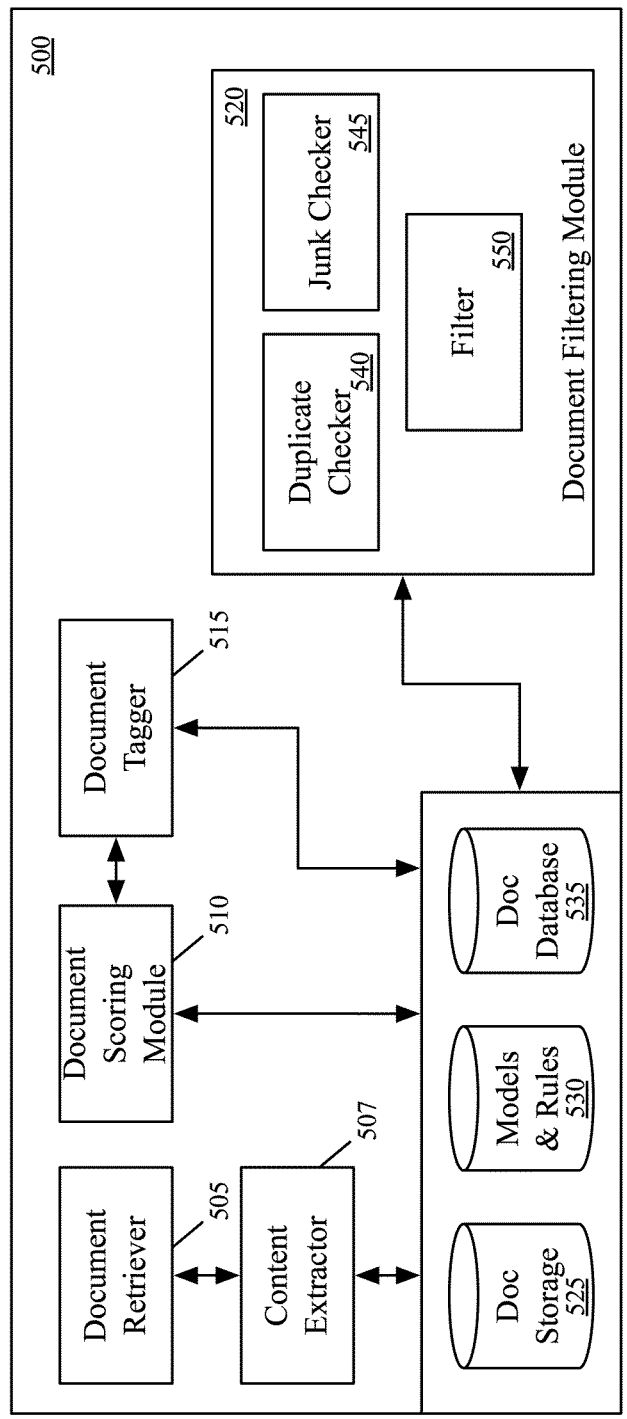
FIG. 5 conceptually illustrates the software architecture of a document classification module of some embodiments.

In some embodiments, the process 200 (or a similar process) is performed by a set of modules that retrieve documents and classify the documents as relevant to a variety of categories. FIG. 5 conceptually illustrates the software architecture of a document classification module 500 of some embodiments. In some embodiments, the document classification module 500 is part of a system that uses the document relevancy information to detect events for various categories and presents the events and relevancy information to a user.

The document classification module 500 includes a document retriever 505, a content extractor 507, a document scoring module 510, a document tagger 515, and a document filtering module 520. FIG. 5 also illustrates a document storage 525, a models and rules storage 530, and a document database 535. The document storage 525 stores documents (e.g., copies of web pages or extracted title and body content). The models and rules storage 530 stores models for each category for which document relevancy is tested, as well as filtering and junking rules. Examples of such models are described in the '166 application. The document database 535 is a database that includes information such as illustrated in FIG. 3 or 4 for the documents stored in document storage 525.

In some embodiments, storages 525-535 are one physical storage. In other embodiments, all three may be in different physical storages, or may be split between two storages. For instance, some embodiments store the models and rules information 530 and the document database 535 together. Furthermore, some embodiments may split one of the illustrated storages across numerous physical storages (e.g., there may be so many documents that numerous storages are required to store copies of all of them).

The document retriever 505 retrieves documents from an external source (e.g., third party databases available via the Internet). The document retriever, in some embodiments, is a webcrawler module that is separate from the document classification module 500. In some embodiments, the document retriever 505 is module that receives documents from a separate webcrawler.

The content extractor 507 extracts relevant content from a retrieved document. In some embodiments, the content extractor 507 identifies title, summary, and body content, removes ancillary content such as advertisements, removes markup language, etc. The content extractor then stores the relevant content into document storage 525.

The document scoring module 510 uses category models 530 to determine relevancy scores for documents for a set of categories. In some embodiments, the relevancy scores are calculated as described in the '166 application, by searching for word pairs in a document that are indicative of either relevancy or non-relevancy to a category. Other embodiments use other methods to score a document's relevancy to a category. In some embodiments, the document scoring module 510 makes an initial determination as to whether a document should be scored for a particular category. When the document passes (e.g., has enough keywords for the category), the module 510 computes the relevancy score.

The document tagger 515 receives a relevancy score from the document scoring module and determines whether the level of relevancy of the document to the category. In some embodiments, the document tagger 515 uses a look-up table of categories and relevancy score threshold ranges for relevancy levels. The document tagger 515 then enters the category and relevancy information into the document database 535.

The document filtering module 520 includes a duplicate checker 540, a junk checker 545, and a filter 550. The duplicate checker 540 determines whether a document is a duplicate of another document already scored and tagged. When the document is a duplicate, some embodiments populate the document database entry for the current document with the relevancy information already determined for the earlier document. The junk checker 545 determines whether a document is a junk document that should be discarded or flagged as junk. Examples of junk documents of some embodiments are described above. When a document is considered junk, the junk checker 545 removes the document from the document database or sets a junk flag in the document database in different embodiments. The filter 550 determines, based on the source of a document, type of document, etc., whether the document should not be counted for event detection purposes, even if it is not a junk or duplicate document.

One of ordinary skill will recognize that FIG. 5 illustrates only one example of a document classification module. Other, similar, modules may be used by different embodiments. For instance, some embodiments will have different sub-modules or use a different flow of data (e.g., the three sub-modules of the document filtering module 520 could be separate, independent modules).

II. Detecting an Event

The previous section described the classification of documents based on the relevancy of the documents to various categories. Some embodiments use the document relevancy information to determine when an event has occurred for a particular category (e.g., a company, topic, person, product, or other entity). Some embodiments limit event detection to companies, while other embodiments detect events for other (or all) categories. The system of some embodiments determines that an event has occurred when there is a significant increase for a period of time (e.g., a day) in the volume of documents classified as relevant to the category. For instance, when a company releases a new product, the number of documents present on the web relating to that company will tend to increase.

Figure 6:
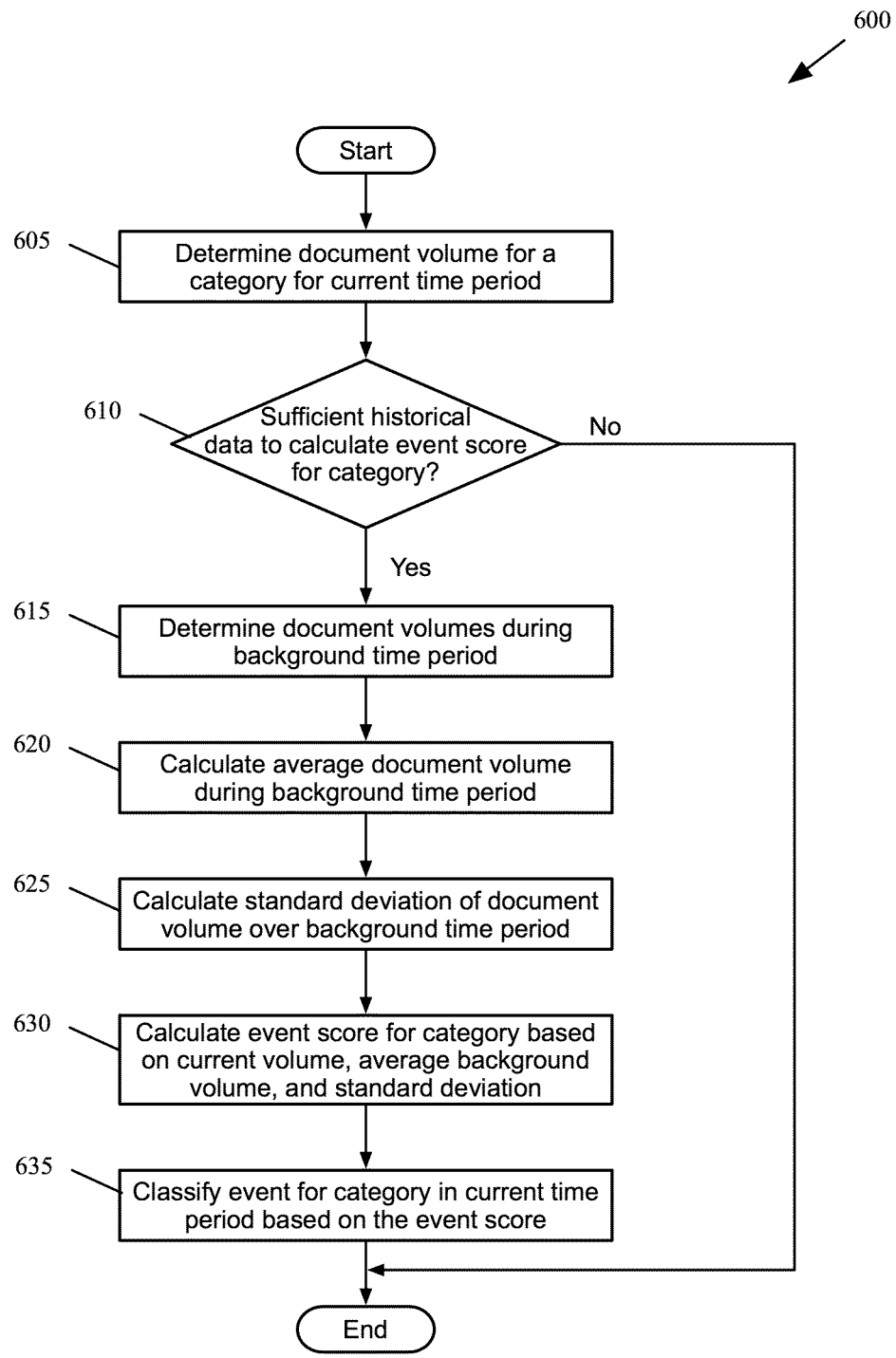
FIG. 6 conceptually illustrates a process of some embodiments for detecting an event for a particular category in a particular time period (e.g., a particular day).

FIG. 6 conceptually illustrates a process 600 of some embodiments for detecting an event for a particular category in a particular time period (e.g., a particular day). In some embodiments, process 600 is performed by one or more modules of a research system that crawls the web for new documents on a regular basis. Each day, hour, etc., the system determines whether an event has occurred for any of the categories in the system. Thus, some embodiments perform process 600 on a daily basis for each category in the system.

As shown, the process 600 begins by identifying (at 605) a document volume for a category for a current time period. In some embodiments, the current time period is the current day, a previous day, or any other specified time period. The document volume is the number of documents with dates in the current time period that have been classified as relevant to the category. As mentioned above, documents flagged as duplicates or filtered based on source (or other attributes) are not included when determining the document volume in some embodiments. The above section also described that some embodiments classify documents into relevance levels (e.g., high, medium, or low). Some embodiments include in the document volume only documents that have been classified as highly relevant to the category, while other embodiments also include documents classified as medium and/or low relevancy.

Figure 7:
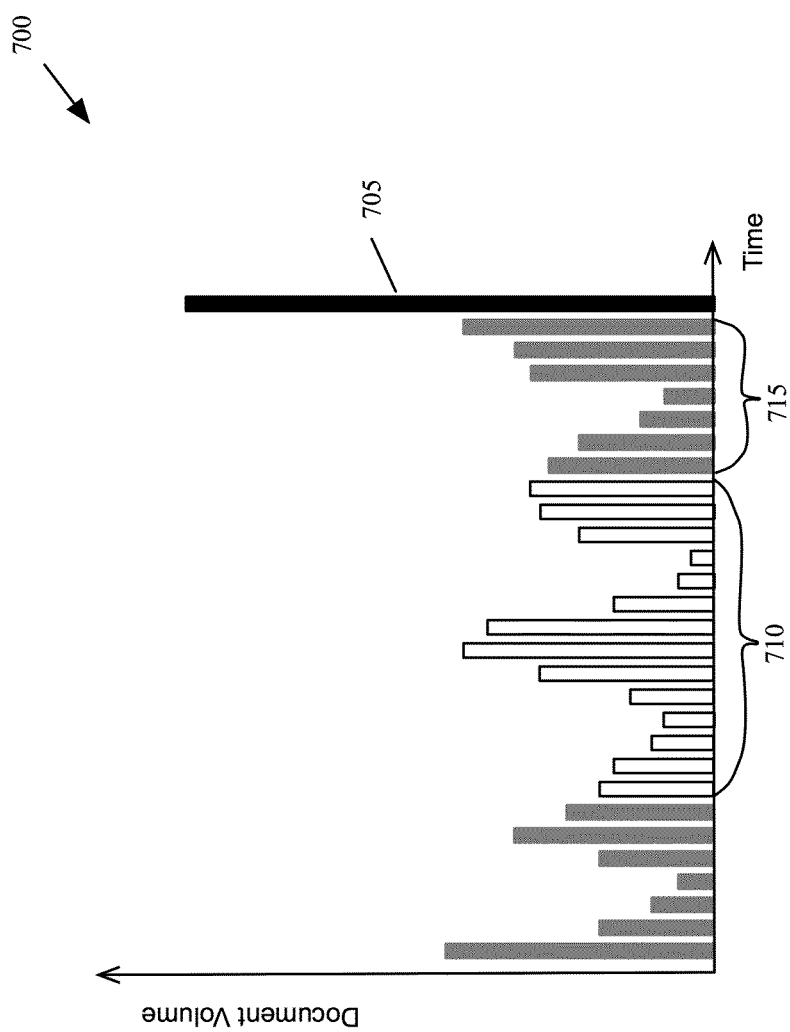
FIG. 7 illustrates a histogram showing document volume for a particular category vs. time.

FIG. 7 illustrates a histogram 700 showing document volume for a particular category vs. time. The document volume for the current time period is illustrated by solid black bar 705. In this example, the current time period is the most recent day, which also has the highest document volume for the days illustrated in the histogram.

The process 600 then determines (at 610) whether sufficient historical data exists to calculate an event score for the category. As the event score is based on a comparison of the document volume for the category in the current time period with a document volume for a category over a historical time period, sufficient historical data about the document volume should exist in order for the process to compute an event score. Thus, when sufficient historical data does not exist, the process ends. Some embodiments, however, will attempt to generate such historical data by searching for documents with the desired past dates.

When sufficient historical data exists, the process identifies (at 615) document volumes during the background time period. The background time period may be a span of days, such as two weeks, thirty days, ninety days, etc. In some embodiments, a buffer time period is used between the current time period and the background time period. This is because often web chatter about a topic will increase in the days leading up to an event relating to that topic. For instance, prior to the release of a product, there will often be speculation about the product. Using a buffer time period decreases the likelihood that the event will be lost or minimized in importance due to the pre-event chatter.

The histogram 700 illustrates background time period document volumes 710 as white bars. The background time period in this example is two weeks, with a buffer time period of one week. The buffer time period document volumes 715 are illustrated as gray bars (as are document volumes prior to the background time period). Just as the background time period may vary, so may the buffer time period. For instance, some embodiments use a buffer time period of thirty days and a background time period of ninety days.

As shown by the histogram 700, the document volume will often vary based on the day of the week. Often the weekend days (Saturday and Sunday) will have significantly fewer documents than the weekdays Monday-Friday. During the work week, document volume tends to increase up to a peak on Wednesday or Thursday, and then fall on Friday. Based on this cyclical nature, some embodiments use a background of only days that are the same as the current day. For instance, as the current document volume 705 is the volume for a Thursday, such embodiments would use only previous Thursdays as the background time period (e.g., the previous ten Thursdays). Some embodiments use a continuous time period (e.g., thirty days), but weigh the days the same as the current day more heavily when calculating the mean (as described below).

The process 600 next calculates (at 620) the average document volume during the background time period. In some embodiments, this is the mean document volume, though other embodiments may use a median or other average. The process also calculates (at 625) the standard deviation of the document volume during the background time period. These calculations are used to determine an event score for the category in some embodiments.

Next, the process 600 calculates (at 630) an event score for the category based on the current document volume, the average background document volume, and the standard deviation of the average background document volume. Some embodiments use the following equation to compute the event score for a category:

$$Z = M * \left( \frac{N_{Current} - N_{Avg}}{\sigma} \right)$$

In this equation, Z is the event score (sometimes referred to as a z-score), M is a multiplier used for easier interpretation of the scores (e.g., 1, 10, etc.), $N_{Current}$ is the current document volume, $N_{Avg}$ is the average background document volume, and σ is the standard deviation of the background document volume. One of ordinary skill will recognize that different embodiments will use different formulas to calculate event scores, including formulas that use different variables for the calculation.

With the event score calculated, the process 600 classifies (at 635) the event for the category and the current time period based on the event score. Some embodiments classify events as either non-events (e.g., Z≤0), low (e.g., 0<Z≤4), medium (e.g., 4<Z≤9), or high (e.g., Z≥9). Various other embodiments use other event classification schemes. The event classification may be stored in a data structure for the event and used for the display of events to a user in the user interface described in Section VI below. For instance, a user might be able to only choose to view medium and high events. Some embodiments allow a user to set up for automatic notification (e.g., by e-mail, SMS, etc.) when an event is detected about a particular topic. The automatic notification can also use the event classification (e.g., to only send notification of high-scoring events).

Some embodiments additionally store data about low volume events. In some cases, there will be a significance when the volume of documents related to a particular category is unusually low, and a user may be interested in knowing about the low volume. Thus, some embodiments also allow a user to select an option to view events in the user interface with event scores below a particular threshold (e.g., Z<−5).

Figure 8:
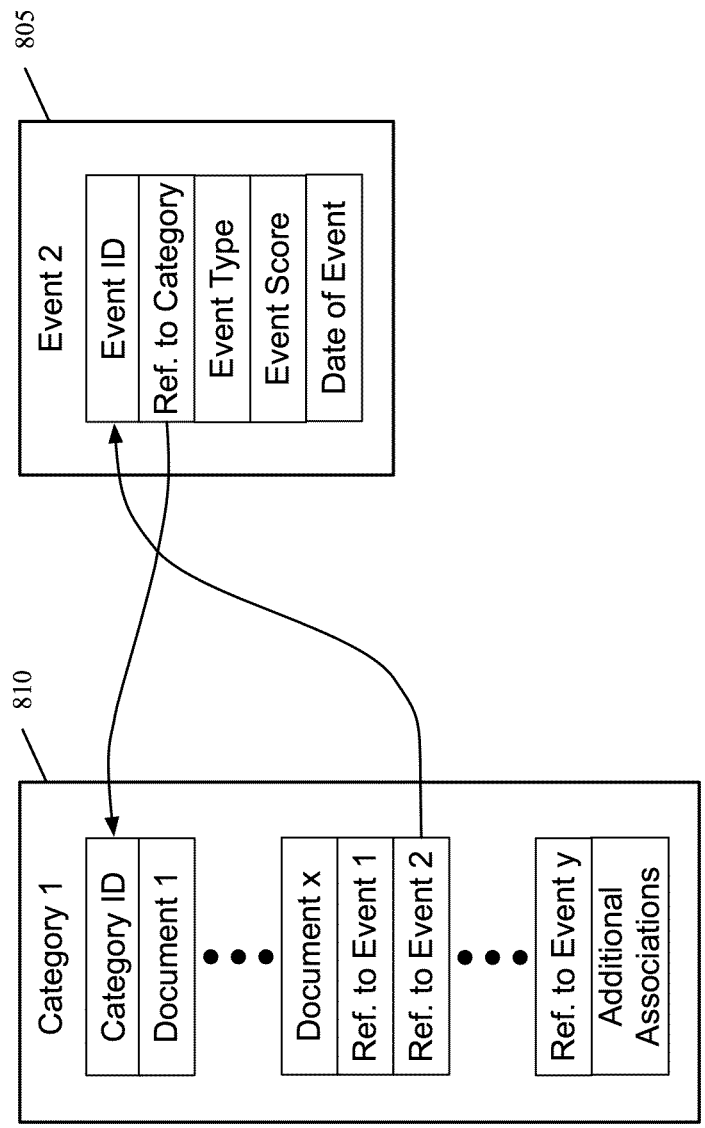
FIG. 8 conceptually illustrates associated event and category data structures.

As mentioned, some embodiments store data structures with information about each event. For example, some embodiments store a database with entries for all events detected by the system. In addition, some embodiments store events for each category in data structures for the category. FIG. 8 conceptually illustrates associated event and category data structures 805 and 810. In some embodiments, the event data structure 805 is a database entry in a database of all events detected by the system. Some embodiments store an entry for each category for each day, whether or not an event is detected for the particular category and day (i.e., even negative scores are stored).

The event data structure 805 includes an event identifier, a reference to a category, an event type, an event score, and a date for the event. The event identifier is a unique identifier that identifies the event. The reference to a category indicates a category with which the event is associated. As described above, in some embodiments the event is based on a volume of documents for a category, and this is the referenced category in the data structure 805. As illustrated, the reference points to a category identifier in data structure 810 for the referenced category.

The event type indicates the type of event. As described above, in some embodiments, this may be non-event, low, medium, or high. Some embodiments also include additional types of events that are not based on web volume. For instance, some embodiments include listings for various types of management turnover, notable stock price changes, or SEC filings. Some embodiments detect management turnover, or other facts about a category, using methods discussed in detail in U.S. patent application Ser. No. 12/791,839, entitled "Iterative Fact Extraction" and filed Jun. 1, 2010, which is incorporated herein by reference (hereinafter, "the '839 application". Some embodiments store a number that indicates an event type.

The event score is the score calculated by process 600 or a similar process. When the event is one of the types mentioned above that is not based on a score (e.g., a stock price change or management turnover), no score is stored in the data structure in some embodiments. The date of event field stores the date or date range for which the event was determined (e.g., the current time period used in process 600). In addition, some embodiments store the document volume for the date or other fields in the event data structure.

The category data structure 810, which may represent a company, topic, person, product, or other entity, includes a category identifier and list of documents as described above in Section I. The data structure 810 also includes a list of references to events associated with the category. As with the documents, some embodiments do not include such references, and only store the association in the data structure for the event. In addition, the category data structure includes additional associations that are used for displaying further information about the category. For instance, when the category is a company, the additional associations may include business lines of the company, competitors of the company, etc. The derivation of such information about a company according to some embodiments is described in further detail in the U.S. patent application Ser. No. 12/831,237, entitled "Business Lines" and filed Jul. 6, 2010, which is incorporated herein by reference (hereinafter referred to as "the '237 application"). In some embodiments, the category data structures may include other information, such as search strings that a user can input in order to bring up information about the category.

Figure 9:
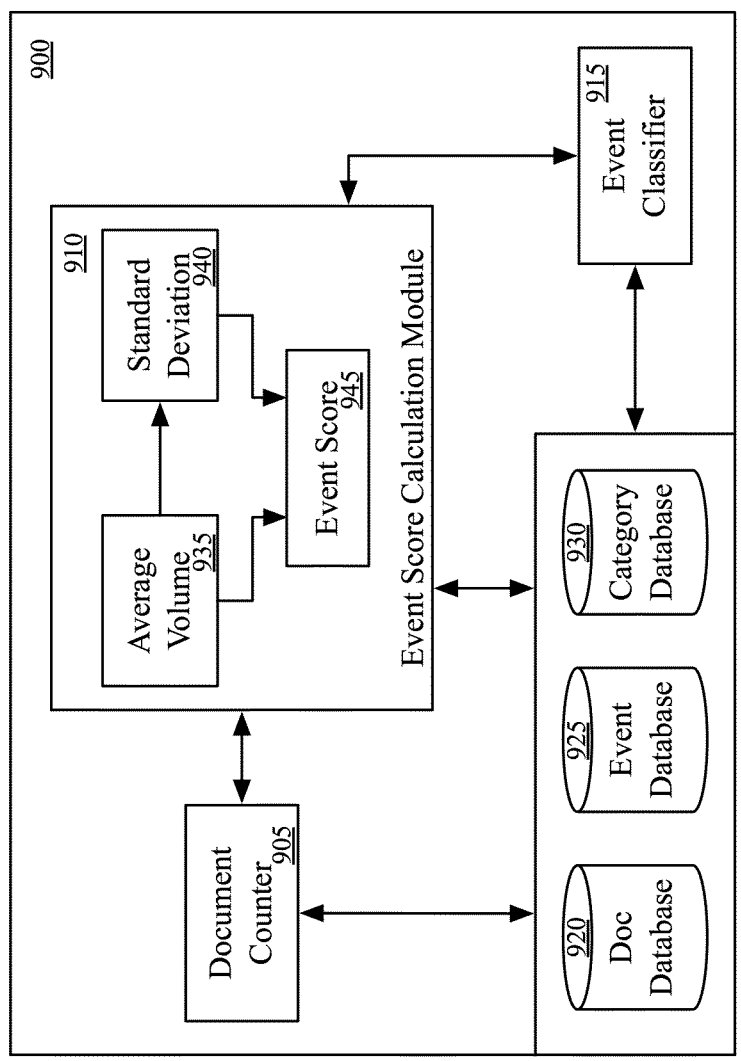
FIG. 9 conceptually illustrates the software architecture of an event detection module of some embodiments.

In some embodiments, the process 600 (or a similar process) is performed by a set of modules that count documents relevant to various categories for particular time periods and calculate event scores for the categories. FIG. 9 conceptually illustrates the software architecture of an event detection module 900 of some embodiments. In some embodiments, the event detection module 900 is part of a system that also includes a module such as document classification module 500 for classifying documents as relevant to the various categories, and that presents the events and relevancy information to a user.

The event detection module 900 includes a document counter 905, an event score calculation module 910, and an event classifier 915. FIG. 9 also illustrates a document database 920, an events database 925, and a category database 930. The document database 920 stores information about retrieved documents (e.g., the information illustrated in data structure 405 of FIG. 4), the events database 925 stores information about events (e.g., the information illustrated in data structure 805 of FIG. 8, as well as other information described below), and the category database stores information about the different categories of the system (e.g., the information illustrated in data structure 810). In some embodiments, storages 920-930 are one physical storage. In other embodiments, all three may be in different physical storages, or may be split between two storages. For instance, some embodiments store all three databases together on one storage. Furthermore, some embodiments may split one of the illustrated storages across numerous physical storages (e.g., there may be so many documents that numerous storages are required to store the entire document database).

The document counter 905 determines a document volume for a given category and time period. In order to enable the event detection module 900 to calculate an event score for a category, the document counter 905 of some embodiments counts the number of documents related to the category for a current time period (e.g., the current day) and a historical time period (e.g., a ninety day period separated from the current time period by a thirty day buffer). The document counter 905, in some embodiments, searches through the document database for documents tagged with a specific date and a specific category (and, in some cases, a specific relevancy level). Some embodiments store the document count for a particular date in the events database 925—this information is retrieved later by some embodiments to avoid re-counting for the same category and date. For instance, the document count for the category "Microsoft" on Jun. 8, 2010 might be used as part of the background document volume for the category "Microsoft" on Aug. 10, 2010.

The event score calculation module 910 receives the document volumes for a category for the current time period and historical time period from the document counter 905 and/or the event database 925, and calculates an event score for the category and current time period. The event score calculation module 910 includes three sub-modules: the average volume module 935, the standard deviation module 940, and the event score module 945.

The average volume module 935 calculates the average document volume for the background time period and passes this information to the standard deviation module 940 and the event score module 945. The standard deviation module 940 calculates the standard deviation of the document volume for the background time period. The event score module 945 calculates the event score using the current document volume, the average background document volume, and the standard deviation. Some embodiments implement the equation described above by reference to operation 630 of process 600. With the event score calculated, the event score calculation module stores the score in an entry in the events database 925 for the current time period and category.

The event classifier 915 receives the event score for the time period and category from the event score calculation module 910 and/or the events database and determines how to classify the event (e.g., as non-event, low, medium, or high). The event classifier 915 stores the classification in the entry for the event in events database 925 with the event score. In some embodiments, the event classifier 915 also stores references to any events of significance (e.g., medium and high events) in the entry for the particular category in category database 930.

One of ordinary skill will recognize that FIG. 9 illustrates only one example of an event calculation module. Other, similar, modules may be used by different embodiments. For instance, some embodiments will have different sub-modules or use a different flow of data (e.g., the three sub-modules of the event score calculation module 910 could be separate, independent modules).

III. Normalization of Events

Often a user of the system of some embodiments will want to know how various events across a set of categories (e.g., software companies, automakers, etc.) compare in importance. However, because in some embodiments the numerator in the equation is the current document volume minus an average document volume and the denominator is the standard deviation, categories with very little document volume may register huge event scores. For example, a small software company may regularly have zero relevant documents with occasionally one or two documents, thereby having an average of less than one document per day with a standard deviation close to zero. When this company releases a product and twenty new documents appear on the web about the company, a huge event score will be calculated. When a much larger company (e.g., Microsoft) releases a product, even though this is a more important event in the software industry, the event score may be lower because there are so many documents about Microsoft that appear on a daily basis.

Accordingly, some embodiments normalize event scores across a set of categories in such a way that tends to give higher scores to categories with larger average document volume. As some categories will belong to multiple different sets, each event for such a category may have multiple different normalized event scores. Some embodiments group all categories in the system together and normalize each event score only once using metrics for the entire system.

Figure 10:
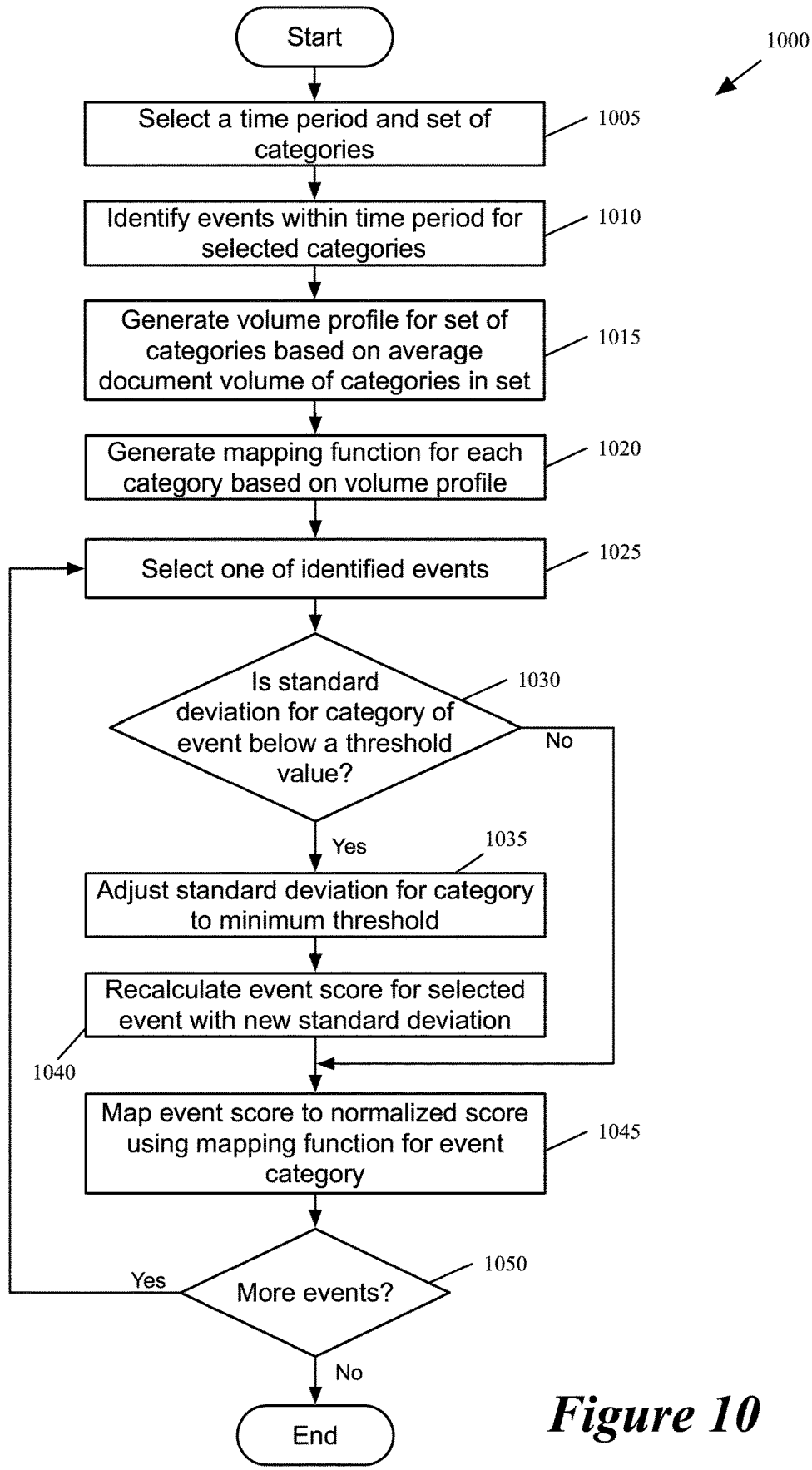
FIG. 10 conceptually illustrates a process of some embodiments for calculating normalized event scores for a class of categories.

FIG. 10 conceptually illustrates a process 1000 of some embodiments for calculating such normalized event scores for a class of categories. In some embodiments, process 1000 is performed by one or more modules of a research system that crawls the web for documents on a regular basis and determines each day whether an event has occurred for each of the categories in the system. Some embodiments perform process 1000 (or a similar process) immediately after performing process 500 (or a similar process).

As shown, process 1000 begins by selecting (at 1005) a time period and a set of categories. The time period may be a single day, one week, two weeks, one month, etc., over which the process compares events. The set of categories, in some embodiments, is a related set of categories that make up a class. For instance, the set of categories might be a group of companies that all compete in a particular industry (e.g., automotive) or business line (e.g., four-door sedans). Another example of a set of categories is a set of competing products in a particular business line (e.g., Xbox, PlayStation, etc.).

With the set of categories and time period determined, the process identifies (at 1010) events within the selected time period for the selected categories. Thus, some embodiments generate and store (e.g., temporarily in RAM) a list of all events over the time period for the categories. These are the events that will be normalized for comparison to each other.

Next, the process generates (at 1015) a volume profile for the set of categories based on the average document volumes of the categories in the set. Even if there are categories in the set that do not have any events in the specified time period, these categories are included in the volume profile. FIG. 11 illustrates an example of a volume profile 1100 of some embodiments for a set of 11,397 categories. The volume profile 1100 sorts the categories by the average number of documents per day, and identifies the number of categories in pre-specified groups based on the number of documents per day. As shown, the volume profile sorts categories into nine groups: less than 0.5 documents per day, one document per day, two documents per day, three-four documents per day, etc. One of ordinary skill will recognize that different embodiments will sort the categories into different groups. The volume profile indicates the number of categories in each of the groups and the percentage of the set of categories that are in each group. As shown, 58.43% of the categories average less than 0.5 documents per day, while only 0.13% of the categories average 65 or more documents per day.

The process 1000 then generates (at 1020) a mapping function for each category based on the volume profile. The mapping function of some embodiments maps an event score (e.g., as calculated by process 500 above) to a normalized event score that is useful for comparing events across a set of categories. Some embodiments use a mapping function of $Z_N=Z(1-P)$, in which $Z_N$ is the normalized event score, Z is the event score for the event (which, as described below, may be recalculated with a larger standard deviation), and P is the category group percentage (i.e., the third column in the volume profile 1100). Thus, using the example of FIG. 11's volume profile, a company with an average of 3.5 documents per day will multiply its event scores by 1−0.0562, or 0.9438. The goal of the mapping functions, in some embodiments, is to create similar event score probability curves for different category groups. Thus, the probability of a category with an average volume of 0.2 documents per day should have an equal likelihood of having an event with a normalized score of 12 as a category with an average volume of 102 documents per day.

Some embodiments generate the mapping functions beforehand rather than during the event normalization process. During the event normalization process, the mapping function to be used for each event (based on the category with which the event is associated) is simply retrieved and used to normalized each of the event scores, as described below.

With the mapping functions generated, the process 1000 selects (at 1025) one of the identified events for the set of categories in the selected time period. The process may select the events randomly or in an organized fashion (e.g., by date order, by category, etc.). The process determines (at 1030) whether the standard deviation for the document volume of the event's category is below a threshold level. In some embodiments, this is the standard deviation of the background event volume used to calculate the event score. Different embodiments will use different thresholds, but a standard deviation of 1 is one example of such a threshold.

When the standard deviation is equal to or above the threshold, the process proceeds to 1045, described below. Otherwise, when the standard deviation is too low, the process adjusts (at 1035) the standard deviation for the category to equal the minimum threshold. That is, when the threshold is a value of 1, if the standard deviation used to calculate the event score for the event is less than 1, the process adjusts this to equal 1.

The process then recalculates (at 1040) the event score for the selected event using the adjusted standard deviation. In some embodiments, the process uses the same equation for calculating the event score as was described above in Section II (based on the current document volume, average background document volume, and standard deviation of background document volume, only with the standard deviation replaced by the threshold value).

Recalculating the event scores for events of categories that have very small standard deviations provides a first level of adjustment of the event scores. Next, the process maps (at 1045) the event score for the selected event (either the originally calculated event score or the newly adjusted event score from operation 1040) to a normalized event score using the mapping function for the category with which the event is associated. As mentioned above, in some embodiments this uses the equation $Z_N=Z(1-P)$, in which $Z_N$ is the normalized event score, Z is the event score for the event, and P is the category group percentage.

As a first example, assume a first category with a background average volume of 100 documents and a standard deviation of 12. This is a fairly popular category (e.g., a large company). On a particular date, 196 documents are considered relevant to the category. Thus, the event score using the formula above is (196−100)/12=8. For a second example, assume a second category with a background average volume of 0.2 documents and a standard deviation of 0.3. This is a category that has many days with zero document volume (e.g., a small company). On the same particular date, 17 documents are considered relevant to the company. Thus, the event score using the formula above is (17−0.2)/0.3=56. By these numbers, the second event is seven times more noteworthy than the first event, despite the fact that the first event had 96 documents more than normal and the second only 17 more than normal.

However, when the normalization process is used (using the volume profile 1100 from FIG. 11), the first event has a score of 8*(1−0.0013)=7.9896, while the second event has a score of (17−0.2)*(1−0.5843)=6.7343. With the scores normalized, the events are much closer to being equal, and the event for a high document volume category has a higher normalized score than the event for the smaller document volume category, despite the difference in initial event scores.

After normalizing the event score for the selected event, the process 1000 determines (at 1050) whether any more events remain to be normalized for the set of categories and time period. When more events remain, the process returns to 1025 to select another event for normalization. Once all events are analyzed, the process ends and the events can be compared across the set of categories. Some embodiments, as will be described in further detail below, identify a set of top events (or "top topics") for a time period and set of categories. This enables a user of the system to view the top events in an industry over a period of time (e.g., the top events in the software industry over the past week).

The normalized event score for an event is stored in the entry in the events database for the event in some embodiments. FIG. 12 conceptually illustrates an event data structure 1200 that includes a normalized event score for the event. In some embodiments, the event data structure 1200 is a database entry in a database of all events detected by the system. As with the event data structure 805 of FIG. 8, the event data structure 1200 includes an event identifier, a reference to a category, an event type, and event score, and a date for the event. In addition, the event data structure 1200 includes a normalized event score. The normalized event score is the score calculated by process 1000 or a similar process. Some embodiments only store a normalized event score, and do not score the initial event score calculated by process 500 or a similar process.

FIG. 13 conceptually illustrates a data structure 1300 for a related set of categories across which events are normalized and compared. The set of categories, as mentioned above, might be a set of competing companies in an industry (e.g., the automotive industry) or business line (e.g., four-door sedans), a set of competing products (e.g., Toyota Camry, Honda Accord, etc.), or any other logical grouping of categories. The category group data structure 1300 includes fields for a group identifier, references to categories within the group, and references to the top events based on normalized event scores.

The group identifier is a unique identifier that identifies the category group. In some embodiments, category data structures (i.e., entries in a category database) refer to one or more group identifiers to associate the category with one or more groups of categories. For instance, the category "Microsoft" might be associated with industry groups for software, video gaming systems, etc. The references to categories are references to each of the categories in the group.

The references to top events by normalized score are references to a particular number of top events (e.g., 10, 25, etc.) that are presented as top topics for the industry, business line, etc. represented by the group. Some embodiments, after calculating the normalized event scores across a set of categories, identify these top events and store them in the data structure (e.g., database entry) for the set of categories. The events can then be presented to a user that looks up the set of categories (e.g., industry) or a category in the set using the system.

Figure 14:
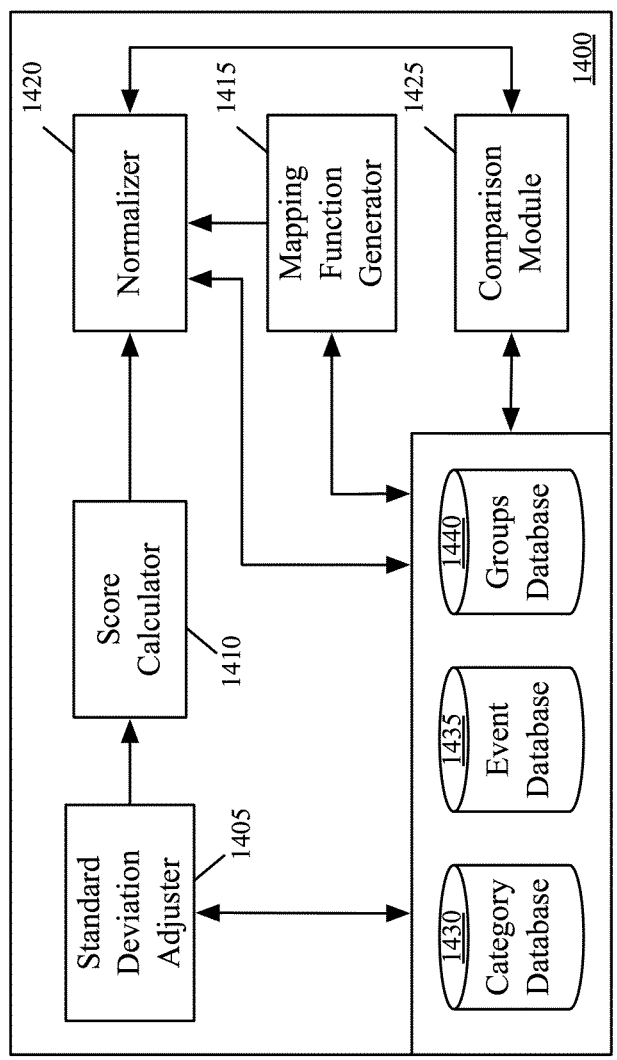
FIG. 14 conceptually illustrates the software architecture of an event score normalization module of some embodiments.

In some embodiments, process 1000 (or a similar process) is performed by a set of modules that normalizes event scores across one or more sets of categories. FIG. 14 conceptually illustrates the software architecture of an event score normalization module 1400 of some embodiments. In some embodiments, the event score normalization module 1400 is part of a system that also includes a module such as event detection module 900 for calculating event scores and detecting events. The system of some embodiments identifies and classifies new documents on a regular basis as relevant to various categories (e.g., with a module such as document classification module 500), identifies events for the categories based on document volume, normalizes the events for comparison across multiple categories, and presents the information about the documents and events to a user.

The event score normalization module 1400 includes a standard deviation adjuster 1405, a score calculator 1410, a mapping function generator 1415, a normalizer 1420, and a comparison module 1425. FIG. 14 also illustrates a category database 1430, an event database 1435, and a groups database 1440. As described above, the category database 1430 stores information about the different categories of the system (e.g., the information in data structure 810 of FIG. 8). The event database 1435 stores information about events (e.g., the information illustrated in data structure 1200 of FIG. 12). The groups database stores information about the various sets of categories across which events are compared. In some embodiments, the category groups are themselves categories as well, and the information illustrated in data structure 1300 of FIG. 13 is actually stored in the category database 1430. For instance, "Sony", "Microsoft", etc. might all be categories, but then "video gaming industry" might also be a category that stores the information in data structure 1300, including references to the "Sony" and "Microsoft" categories.

In some embodiments, storages 1430-1440 are one physical storage. In other embodiments, all three may be in different physical storages, or may be split between two storages. For instance, some embodiments store all three databases together on one storage. Furthermore, some embodiments may split one of the illustrated storages across numerous physical storages (e.g., there may be so many categories that numerous storages are required to store the entire category database).

The standard deviation adjuster 1405 retrieves event information from the event database (or from an external module such as the event detection module 900) and modifies the standard deviation to the minimum threshold value, if necessary. If the standard deviation is too low, the adjuster 1405 passes the event score calculation information to the score calculator 1410.

The score calculator 1410 recalculates the event score using the adjusted standard deviation. In some embodiments, the score calculator 1410 is the same as the event score module 945 of FIG. 9, in that it implements the event score equation described above by reference to FIG. 6. The newly adjusted score is passed to the normalizer 1420.

The mapping function generator 1415 generates mapping functions for normalizing event scores across a set of categories. In some embodiments, the mapping function receives a set of categories and generates a volume profile for the set of categories (e.g., the volume profile 1100 of FIG. 11). Based on the volume profile, the mapping function generator 1415 identifies a mapping function for each category in the set of categories. The mapping function of some embodiments is a multiplier based on the average document volume of the category in some embodiments, as described above by reference to process 1000 of FIG. 10. The mapping functions are passed to the normalizer 1420.

The normalizer 1420 receives a mapping function and an event score from the score calculator 1410, the event database 1435, or an external source such as event detection module 900. The normalizer 1420 uses the mapping function for the category of the event to map the event score to a normalized score, and stores this normalized score in the event database 1435.

The comparison module 1425 receives the normalized scores for events from a set of categories over a particular time period from the normalizer 1420 and/or retrieves the scores from event database 1435. The comparison module 1425 determines a particular number of the highest normalized event scores for events from the set of categories over the particular time period, and stores these as top events for the category set (e.g., in the groups database 1440).

One of ordinary skill will recognize that FIG. 14 illustrates only one example of an event score normalization module. Other, similar, modules may be used by different embodiments. For instance, some embodiments will have different sub-modules or use a different flow of data (e.g., the mapping function generator 1415 might be broken into multiple sub-modules).

IV. Event Naming

As mentioned above and described in further detail below, events about a particular category are presented to a user that searches for information about the particular category in some embodiments. Some embodiments determine a name for the event that is displayed to represent the event in a user interface and provide a link to a representative document for the event. In some embodiments, the title of the representative document is the name used for the event.

Figure 15:
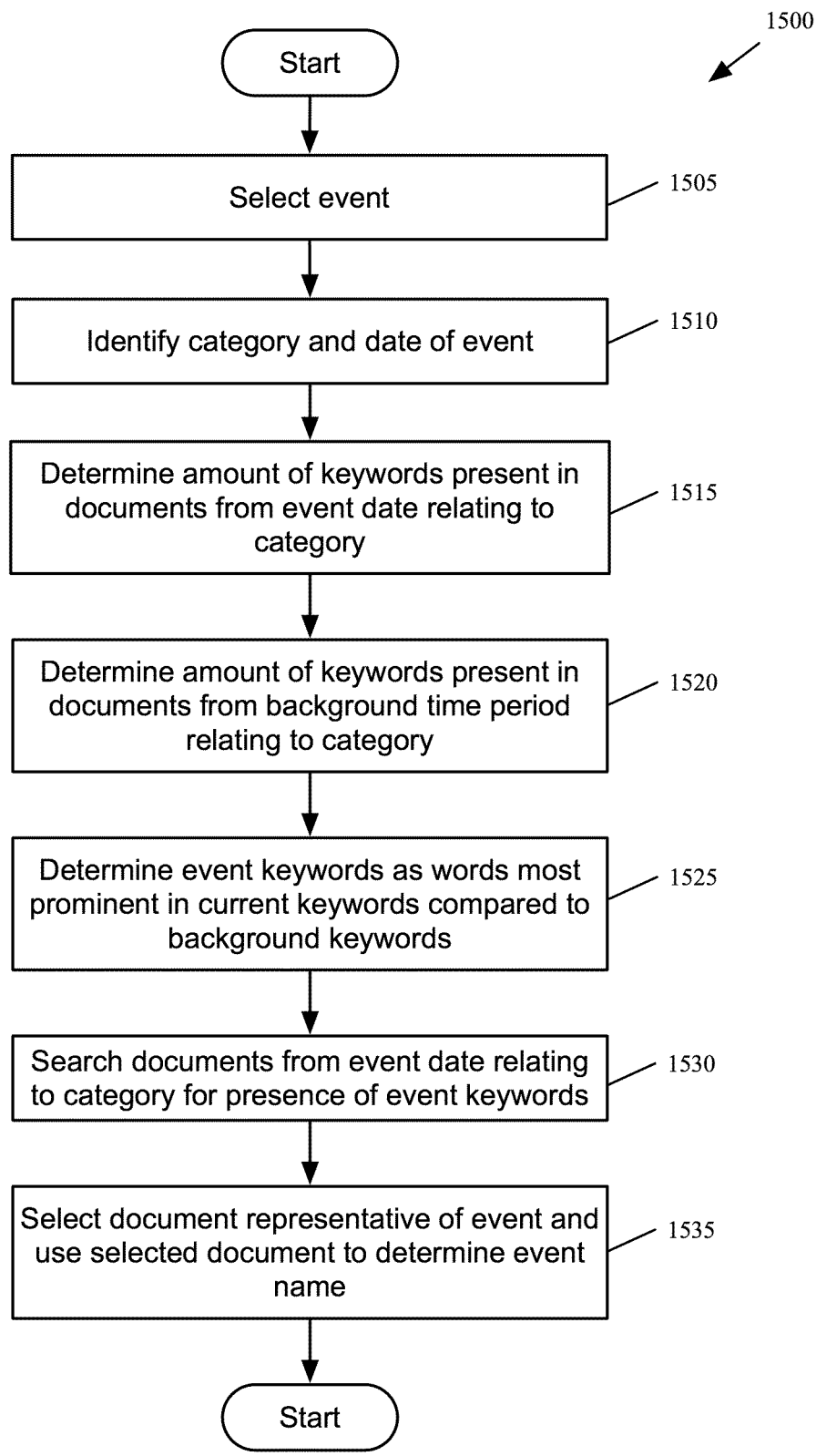
FIG. 15 conceptually illustrates a process of some embodiments for naming an event and selecting a representative document for the event.
Figure 16:
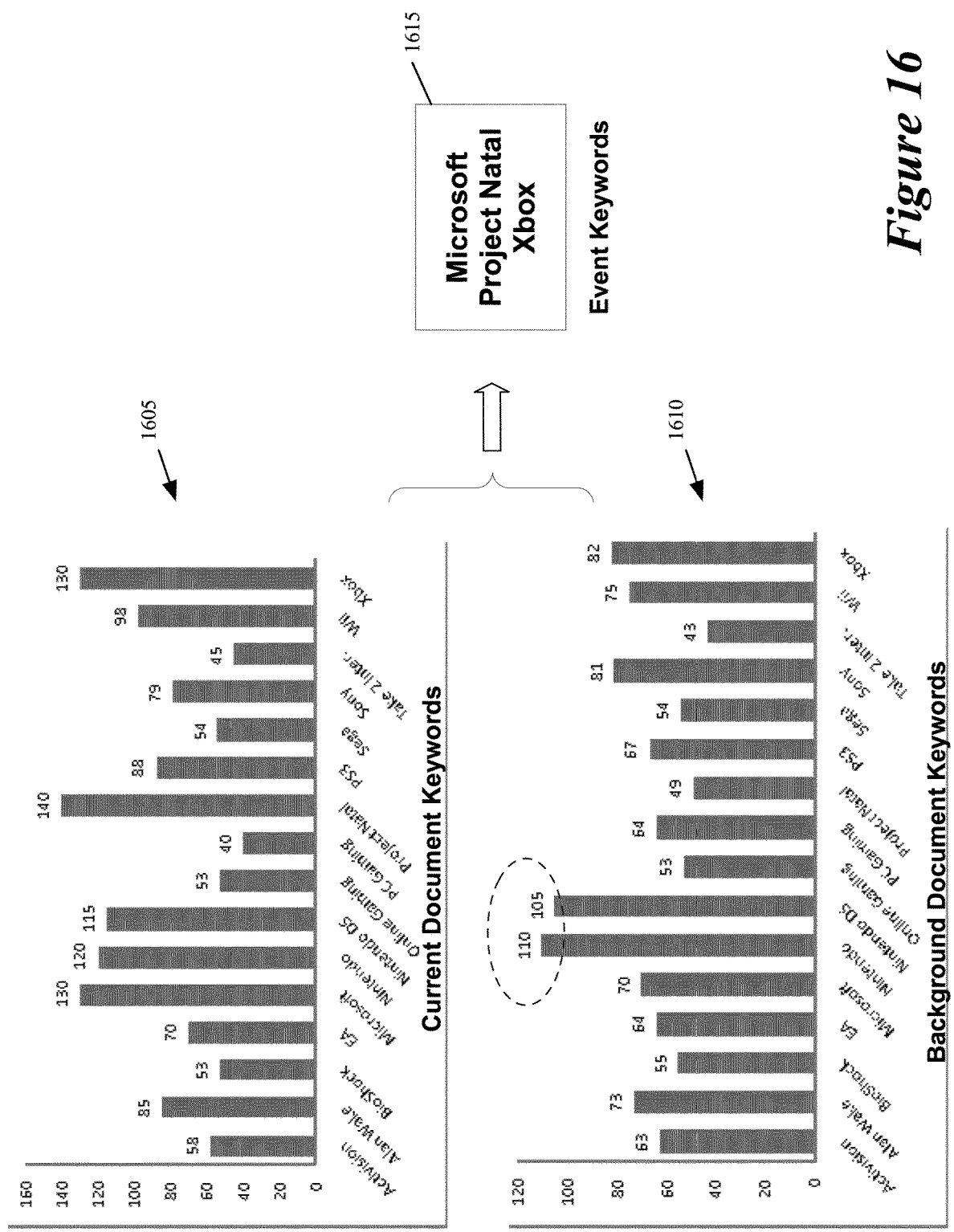
FIG. 16 conceptually illustrates the identification of keywords for an event.

FIG. 15 conceptually illustrates a process 1500 of some embodiments for naming an event and selecting a representative document for the event. In some embodiments, process 1500 (or a similar process) is performed whenever an event is detected (e.g., with process 600 or a similar process). In some embodiments, the process 1500 is performed by one or more modules of a research system that crawls the web for documents on a regular basis and determines each day whether an event has occurred for each of the categories in the system. The process 1500 will be described by reference to FIGS. 16 and 17. FIG. 16 conceptually illustrates the identification of keywords for an event, while FIG. 17 conceptually illustrates the identification of a set of representative documents for an event using the keywords.

As shown, the process 1500 begins by selecting (at 1505) an event. As mentioned, some embodiments receive the event as soon as the event is detected. Some embodiments only perform process 1500 for displayable events (i.e., events that have high enough scores to be displayed to a user of the system), while events that are not going to be displayed are not named.

The process then identifies (at 1510) a category and date of the event. In some embodiments, this information is stored in a data structure for the event. The date of the event may be a single day in some embodiments or a range of days (e.g., a week) in other embodiments. As described above, each event is associated with a category of the system, to which documents are classified as relevant.

Next, process 1500 determines (at 1515) an amount of various different keywords present in documents relating to the category from the event date. Some embodiments examine each document relating to the event category from the event date to pick out keywords from the document. Some embodiments identify all of the words and pick out the most commonly used words in the documents (excluding common words such as articles and prepositions). Some embodiments store a list of keywords for each category (which may be used to classify documents as relevant to the category) and identify the number of instances of each of the keywords in the documents for the particular date.

FIG. 16 illustrates a histogram 1605 of keywords present in current documents for an event in the category of the video gaming industry. The bars represent the frequency of the various keywords in documents for a particular date that are relevant to the video gaming industry. As shown, the most common words are "Microsoft", "Nintendo", "Nintendo DS", Project Natal", and "Xbox", which range in number from 115 to 140.

The process 1500 then determines (at 1520) an amount of various different keywords present in documents relating to the category from the event date. Some embodiments count the same keywords in the background documents as with the current documents, so as to compare the keywords in the background documents to those in the current documents. As mentioned above, these may be a stored list of keywords for the category, or those commonly used in the current set of documents.

FIG. 16 also illustrates a histogram 1610 of keywords present in background documents for the same event in the video gaming industry category. As with the histogram 1605, the bars represent the frequency of the various keywords in documents within the background time period. Some embodiments calculate an average number per day for each keyword, so as to compare the background document keyword volumes to the current document keyword volumes.

The process 1500 then determines (at 1525) event keywords as words most prominent in the current keywords as compared to the background keywords. Various embodiments use different algorithms to determine the event keywords. Some embodiments use the relative volume of each keyword in the current document histogram and the background document histogram to compare the current keyword levels to background keyword levels, while other embodiments compare the absolute volume of the keywords. In FIG. 16, the relative difference between current and background volume for the keyword "Microsoft" is 130/70=1.857, while the absolute difference is 130−70=60. Some embodiments use the relative comparison, but require a minimum number of the keyword in the current documents (e.g., 40). This prevents a keyword whose presence has increased from one incidence in the background documents to two or three incidences in the current documents from having a very high event keyword value. Some embodiments identify a particular number of keywords (e.g., 5) with the highest frequency in the current documents and use one or another comparison to the background document keyword frequencies to identify the event keywords. Other embodiments use a minimum threshold comparison value (e.g., a relative value of 1.5) and use all keywords with comparison values above this threshold as event keywords.

In the histograms 1605 and 1610 of FIG. 16, the most common keywords in the current documents are "Microsoft", "Nintendo", "Nintendo DS", Project Natal", and "Xbox", which range in number from 115 to 140. "Nintendo" and "Nintendo DS" have small increases from the background keywords, while the three words "Microsoft", "Project Natal", and "Xbox" all have much larger increases in frequency (both relative increases and absolute increases). Accordingly, the process of some embodiments identifies these three words as event keywords 1615 for the video gaming industry event. There may be more regular conversation about Nintendo and Nintendo DS than about Microsoft, Project Natal, and Xbox, so the latter three keywords are picked out as being unusual.

Some embodiments compare the event keywords for a particular day's event to the event keywords for surrounding days (i.e., within three or four days of the currently evaluated event). When events are detected for a particular category for two or more consecutive days having the same keywords, some embodiments discard all but the highest-scored event. This may occur, for example, when there is an especially important product release, and discussion of the new product lasts for multiple days.

Returning to FIG. 15, the process 1500 searches (at 1530) documents from the event date that relate to the event category for the presence of event keywords. Some embodiments score each document based on the presence of the event keywords in the document. The documents may be scored based on the number of event keywords in the document. Some embodiments give higher scores to documents with event keywords in the title or summary (e.g., a keyword in the title is five points, a keyword in the summary is three points, and a keyword in the body is one point). Some embodiments weight the different keywords based on the relative frequency of the keywords in the current documents versus the background documents (e.g., in the example of FIG. 16, "Microsoft" would have a weight of 130/70=1.857, while "Project Natal" would have a weight of 140/49=2.857 and "Xbox" would have a weight of 130/82=1.585).

The process then selects (at 1535) a document representative of the event and uses the selected document to determine the event name, then ends. The process, in some embodiments, identifies the document with the highest score and designates this document as the representative document for the event. Some embodiments additionally select a set of backup documents (e.g., 5-10 documents) for use in case the selected representative document is removed from its location on the world wide web. In addition, some embodiments use the title of the document as a name for the event. This name is displayed to the user through a user interface in some embodiments, as will be described in further detail below. In addition, some embodiments use the relevancy score of the documents for the category of the event as a factor in determining score for the document.

Some embodiments do not automatically use the documents with the highest scores, and may instead apply certain filters to the documents. For instance, some embodiments filter documents that are too long or too short, or mention numerous categories, on the assumption that such documents will not be good representatives for the event. Some embodiments also filter to ensure that documents with certain words in the title are not selected (e.g., words indicating that the article is a market overview).

In addition, some embodiments have preferences for particular sources. Well-known sources such as the Wall Street Journal, New York Times, etc., may be preferred over more local or less trustworthy sources. The sources may be used as a tiebreaker among duplicate documents, among different documents with equal scores, or as a factor in the scoring in different embodiments.

Figure 17:
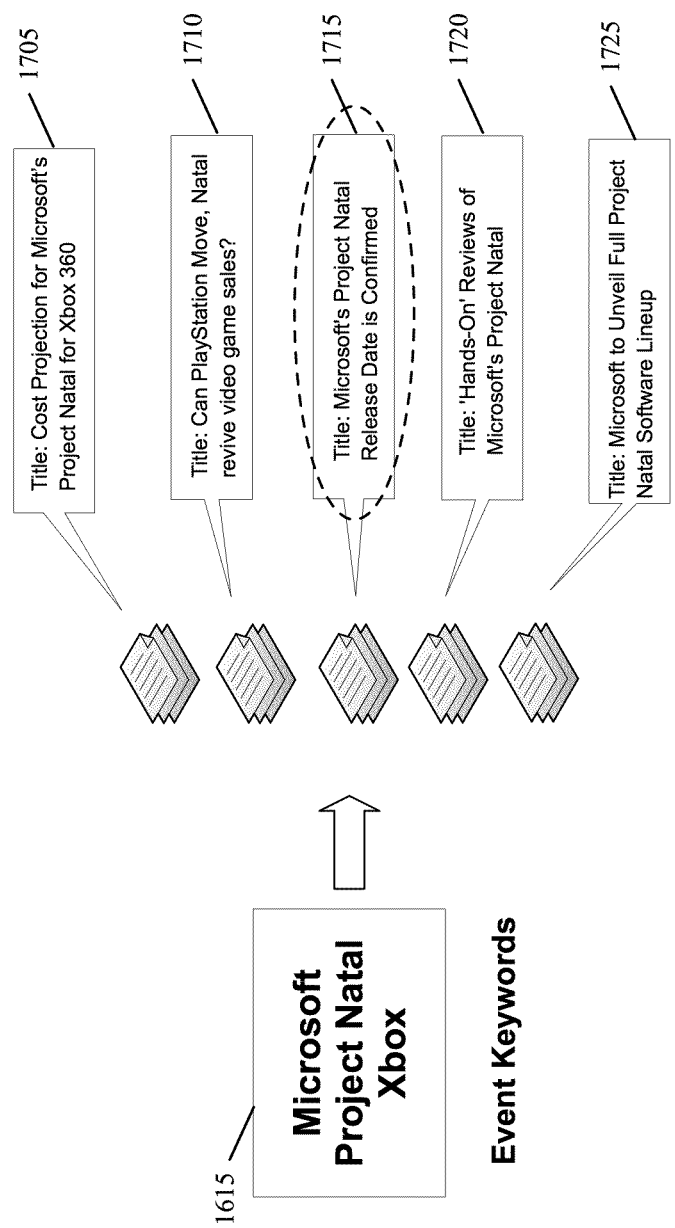
FIG. 17 conceptually illustrates the identification of a set of representative documents for an event using the keywords.

FIG. 17 continues the example of FIG. 16. As shown, based on the three event keywords 1615 "Microsoft", "Project Natal", and "Xbox", five possible representative documents 1705-1725 are identified. These may be the five documents with the highest scores using the three event keywords 1615. In addition, the highest scoring document 1715, with a title of "Microsoft's Project Natal Release Date is Confirmed" is selected to represent the event. Thus, this title is the name of the event that is presented to a user. In some embodiments, when a user selects the event in a user interface, the user interface links the user to the document 1715 through the Internet.

Figure 18:
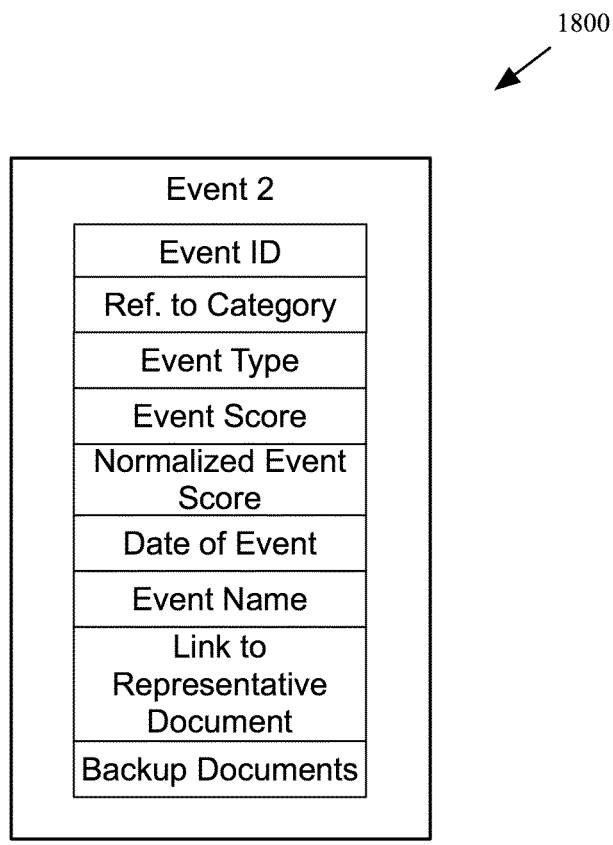
FIG. 18 conceptually illustrates a data structure for an event after the completion of the process of FIG. 15 (or a similar process) for the event.

Some embodiments store the event name and representative document information in an entry for the event in the events database. FIG. 18 conceptually illustrates a data structure 1800 (e.g., an entry in the events database) for an event (Event 2) after the completion of process 1500 (or a similar process) for the event. Much like the data structure 1200 of FIG. 12, the data structure 1800 includes an event identifier to uniquely identify the event, a reference to a category with which the event is associated, an event type, an event score and normalized score, and a date of the event. In addition, the data structure 1800 includes an event name, a link to a representative document, and a list of backup documents. Referring to FIG. 17, some embodiments would store the title of document 1715 as the event name, and a URL at which a web browser can locate document 1715 as the link to the representative document. In addition, links to documents 1705, 1710, 1720, and 1725 are stored as the backup documents. Rather than store the URL and other information about a document, some embodiments simply include a link to an entry for the document in the document database.

V. Link Maintenance

As described in the section above, some embodiments store a link to a representative document for an event. In many cases, the system will store these events for an extended amount of time. As will be described in Section VII, some embodiments allow a user to view events from a particular period of time through a user interface (e.g., from nine to six months prior to the day on which the user is using the system). However, web sites will often remove their content after a period of time to save space or archive the content such that it is unavailable without paying a fee. In such a situation, the link is broken and a user cannot access the representative document easily (or at all, if the document is removed).

Figure 19:
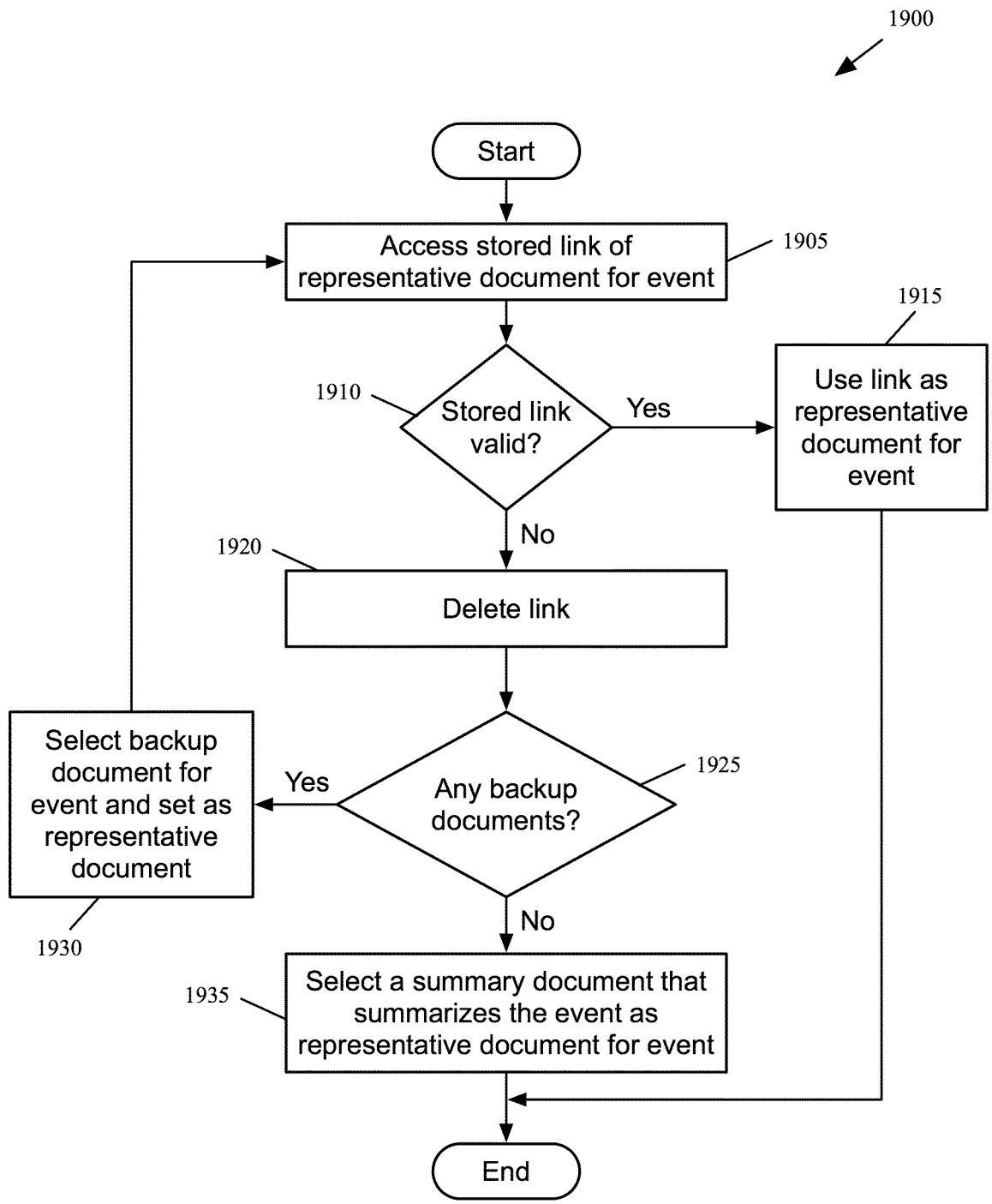
FIG. 19 conceptually illustrates a process 1900 for performing such link maintenance in the document classification, event detection, and information presentation system of some embodiments.

To remedy this problem, some embodiments perform link maintenance on a regular basis by checking the link for the representative document and, when the link is broken, substituting a replacement representative document. FIG. 19 conceptually illustrates a process 1900 for performing such link maintenance in the document classification, event detection, and information presentation system of some embodiments. In some embodiments, the process 1900 is performed by one or modules of such a research system on a regular basis (e.g., once a week for each event, once a month for each event, etc.). The process 1900 will be described by reference to FIGS. 20 and 21, which illustrate the identification of representative documents for an event, continuing the example from FIGS. 17 and 18.

As shown, the process 1900 begins by accessing (at 1905) a stored link for a representative document for an event. As described above, some embodiments store a URL for a representative document as a field in a database entry for the event. On a regular basis, process 1900 attempts to access this link to determine its continued validity.

The process determines (at 1910) whether the stored link is still valid. That is, the process directs a browser to the URL of the stored link and determines whether a document is retrieved. When no document is retrieved (e.g., an error message is sent to the browser), then the link is not valid. When a document is retrieved at the URL, some embodiments extract content from the document and determine whether the content matches stored content for the document. Some embodiments only extract and compare titles, while other embodiments extract the body of the document as well. Additionally, some embodiments do not extract content and just determine whether the link is valid.

Some embodiments search for duplicate documents when a link is not valid. As discussed above, some embodiments store document database entries for duplicate documents. Thus, when one instance of a document is invalid, some embodiments substitute a new version of the same content. Thus, only the URL (or a reference to a document database entry) is modified, and none of the backup representative documents are modified.

When the link is valid, the process uses (at 1915) the link (or a link to a duplicate document) as the representative document for the event, and ends. That is, the process does not modify the data for the event at all. However, when the link is invalid (either because there is nothing at the URL or because the information at the URL has changed), the process deletes (at 1920) the link. This may include deleting the URL from the database entry for the event. Some embodiments also delete the document from the document database so that no other aspect of the system links to the document. Some embodiments maintain the title of the now-unavailable document as the title for the event (if the current representative document is the original representative document).

The process then determines (at 1925) whether any backup documents are available. As described in the previous section, some embodiments store a set of backup representative documents in case the initial representative document is no longer valid. However, in some cases all of the possible representative documents may have invalid links, in which case there would be no remaining backup links.

When a backup document is available, the process selects (at 1930) one of the backup documents for the event and sets it as the representative document. Some embodiments order the backup documents based on their representative document score and select the backup document with the highest score that has not been determined to have an invalid link. Various ways of computing these scores based on the presence of event keywords in the document are described in the previous section. The process then returns to 1905 to determine whether the link for the newly selected document is still valid. The process will cycle through the backup documents until all of them are exhausted or a valid document is found.

FIG. 20 conceptually illustrates the documents 1705-1725 from FIG. 17. As described above, the document 1715 was previously selected as the representative document for a particular event in the video gaming industry. However, in this case, the link to document 1715 is no longer valid, and no duplicate documents are available, as illustrated by the large "X" over document 1715. As a result, the system has selected one of the backup documents 1725 with a valid link. Some embodiments keep the event title as "Microsoft's Project Natal Release Date is Confirmed", while other embodiments change the title to "Microsoft to Unveil Full Project Natal Software Lineup", the title of document 1725.

When the representative document and all backup documents have invalid links, the process 1900 selects (at 1935) a summary document that summarizes the event as a representative document for the event. The process then ends. In some embodiments, the summary document is written by a back-end editor or administrator of the research system to summarize the event after the fact. As the links for the representative document and its backups will generally not all be invalid immediately after the day of the event, the summary document is not generally needed instantaneously. In some embodiments the summary document is a short (e.g., 1-3 paragraphs) description of the most important facts of the event. When a user selects an event in the user interface of the research system, the user is taken to the summary of the event.

In some embodiments, the summary document is generated automatically from the representative document. For instance, some embodiments use the first N (e.g., 25, 50, etc.) characters of the original representative document as the summary document for the event. Other embodiments automatically extract a quote or other fact from the representative document, or otherwise automatically generate a summary.

Figure 21:
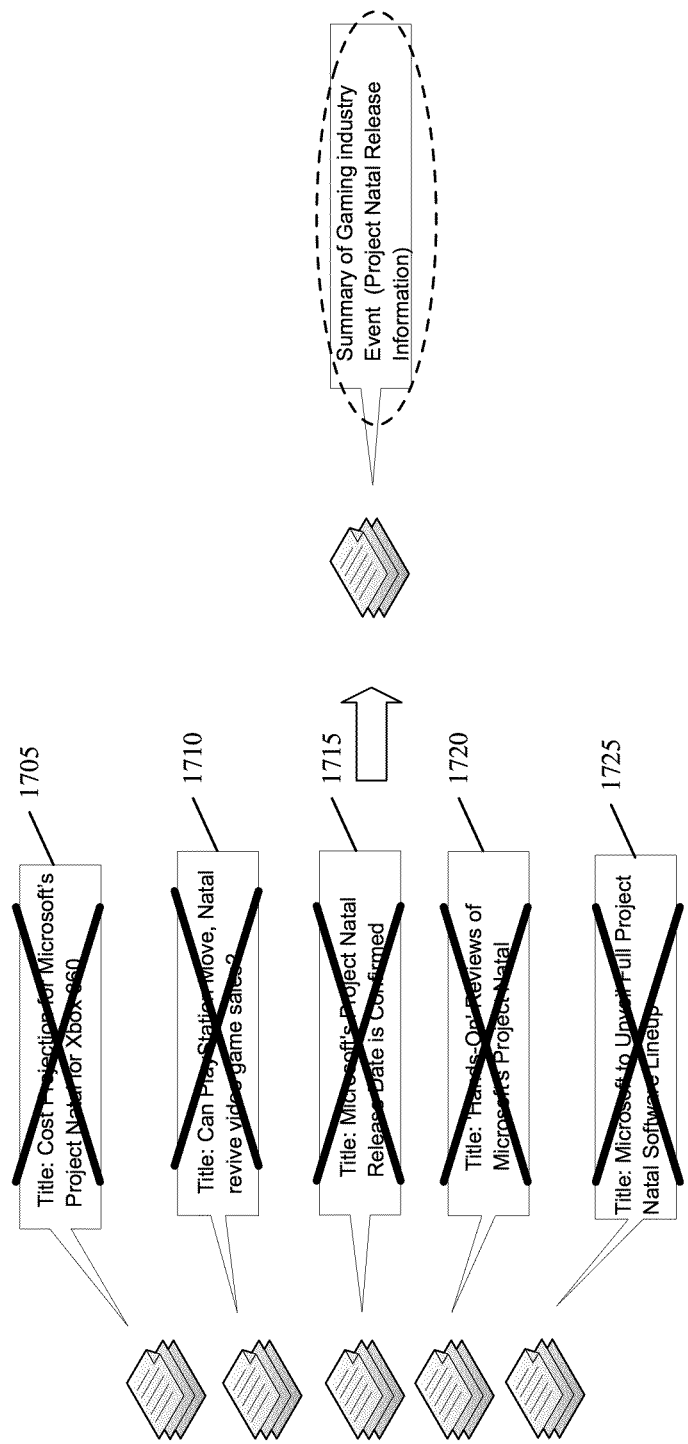

FIG. 21 conceptually illustrates the documents 1705-1725 after all five of the documents have invalid links with no valid duplicate documents available. The invalidity of the links is illustrated by the large "X" over each of the documents. As shown, the system has selected a summary document of the gaming industry event, entitled "Project Natal Release Information".

Figure 22:
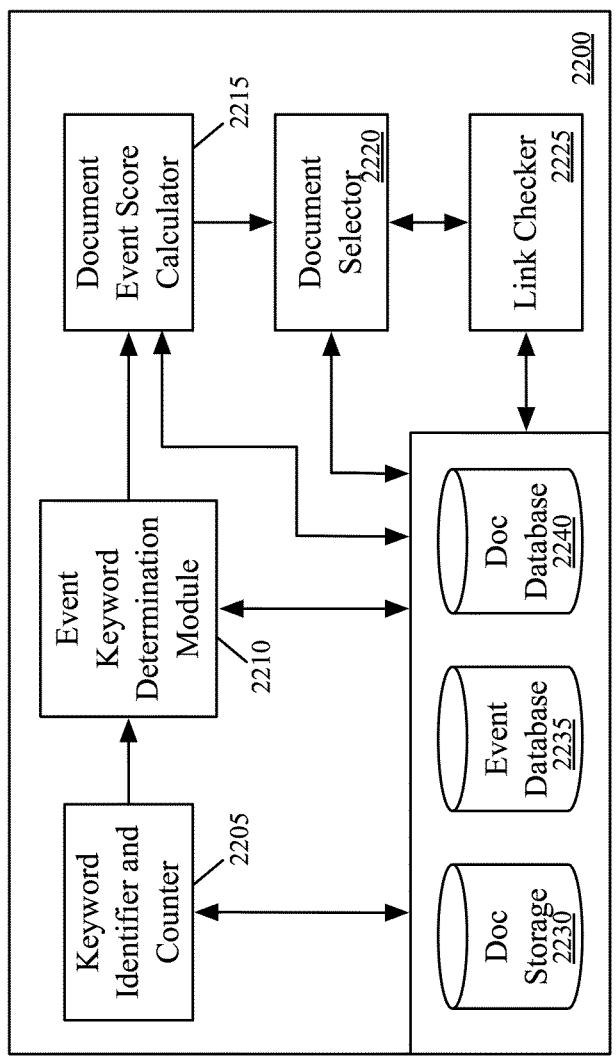
FIG. 22 conceptually illustrates the software architecture of an event naming module.

In some embodiments, the processes 1500 and 1900 (or similar processes) are performed by a set of modules that identifies representative documents and regularly checks the links to those representative documents to ensure that links presented to a user are valid. FIG. 22 conceptually illustrates the software architecture of an event naming module 2200. In some embodiments, the event naming module 2200 is part of a system that also includes a module such as event detection module 900 for calculating event scores and detecting events. The system of some embodiments identifies and classifies new documents on a regular basis as relevant to various categories (e.g., with a module such as document classification module 500), identifies events for the categories based on document volume, normalizes the events for comparison across multiple categories, identifies representative documents for the events, and presents the information about the documents and events to a user.

The event naming module 2200 includes a keyword identifier and counter 2205, an event keyword determination module 2210, a document event score calculator 2215, a document selector 2220, and a link checker 2225. FIG. 22 also illustrates a document storage 2230, an event database 2235, and a document database 2240. The document storage 2230 stores document content extracted from web documents in some embodiments (e.g., the title and body text of a document, after removing advertisements, markup language, etc.). The event database 2235 stores information about events (e.g., the information illustrated in data structure 1800 of FIG. 18). The document database 2240 stores information about each of the documents in the document storage 2230. This information may include the location of the document on the world wide web.

In some embodiments, storages 2230-2240 are one physical storage. In other embodiments, all three may be in different physical storages, or may be split between two storages. For instance, some embodiments store the event database 2235 and document database 2240 together on one storage. Furthermore, some embodiments may split one of the illustrated storages across numerous physical storages (e.g., there may be so many documents that numerous storages are required to store all of the document content).

The keyword identifier and counter 2205 determines a set of keywords for a category and counts the number of those keywords in documents for the date of the event and the background time period of the event. In some embodiments, the keyword identifier and counter 2205 identifies all documents from the date of the event using an entry for the event in the event database and/or entries in the document database. The keyword identifier and counter 2205 identifies the keywords either by using a model for the category of the event that lists a set of keywords for the category or by searching the identified documents for the most common words (e.g., the 20 most common words) other than articles, prepositions, etc.

With the keywords identified, the keyword identifier and counter 2205 determines a count for each keyword in documents related to the event category from (i) the date of the event and (ii) the background time period of the event, by analyzing the content of the identified documents from these time periods. These counts are passed to the event keyword determination module 2210.

The event keyword determination module 2210 performs a comparison of the background document keyword counts to the current document keyword counts. Based on this comparison, the module 2210 selects a set of one or more event keywords. As discussed above, the comparison may be a relative comparison (e.g., dividing the number of appearances of a particular keyword in the event documents by the number of appearances of the particular keyword in the background documents) or an absolute comparison (e.g., subtracting the number of appearances of a particular keyword in the background documents from the number of appearances of the particular keyword in the event documents), or some combination thereof. The event keyword determination module 2210 stores the event keywords in the event database entry for the event in some embodiments. The module 2210 may also pass the selected keywords to the document event score calculator 2215.

The document event score calculator 2215 receives a set of event keywords for an event from the event keyword determination module 2210 and/or retrieves the event keywords from the event database. The calculator 2215 also retrieves the documents from the event's category having the date of the event, and scores each of the documents using the keywords. As described in the previous section, different embodiments use different scoring algorithms. Some embodiments simply count the number of event keywords in a document, while other embodiments use more complex algorithms such as scoring a document higher for having an event keyword in its title or summary. Some embodiments store the results of the document event score calculator 2215. For instance, some embodiments store the score for each document in the database entry for the document along with a reference to the event in the event database with which the score is linked (as a document may be relevant to multiple categories, and therefore associated with multiple events).

The document selector 2220 receives the document event scores from document event score calculator 2215 and/or retrieves the scores from the document database 2240 (or the event database 2235, if the scores are stored there). The document selector 2220 chooses the document with the highest score and stores this as the representative document for the event in the event database entry for the event. The document selector 2220 also identifies a set of backup documents and stores these in the event database entry as well. In addition, when the link checker 2225 identifies that a link to a representative document is invalid, the document selector 2220 chooses a new representative document from the backup documents (or a summary document).

The link checker 2225 periodically checks the links for representative documents for events stored in the event database 2235. In some embodiments, the link checker validates the links for representative documents of all events at the same time (e.g., on the same day). For instance, the link checker might check all of the events on the first day of each month. Other embodiments check the link for each event at regular intervals (e.g., every two weeks) after the event. Thus, an event having a date of Aug. 15, 2010 might have its document validated on Aug. 29, 2010, while an event with a date of Aug. 12, 2010 would have its document validated on Aug. 26, 2010. To validate the link, some embodiments access a web browser and attempt to navigate the web browser to the link. When the link is valid, the link checker 2225 moves on to the next event, but when the link is not valid the link checker 2225 searches for duplicate documents in some embodiments. When no duplicate documents are available, the link checker 2225 requests the document selector 2220 to select a new representative document from the backup documents, the link for which is checked by the link checker 2225.

One of ordinary skill will recognize that FIG. 22 illustrates only one example of an event naming module. Other, similar, modules may be used by different embodiments. For instance, some embodiments will have different sub-modules or use a different flow of data (e.g., the keyword identifier and counter 2205 might be broken into multiple sub-modules).

VI. Using Events to Predict Future Occurrences

As mentioned above, some embodiments perform automated research using the detected events. For instance, some embodiments will correlate events detected for a publicly traded company to stock price changes in the company. Some embodiments may use not only web volume events, but also detections of management turnover, SEC filings, specific financial transactions (e.g., a merger or acquisition), etc. In certain situations, the changes in stock price are predictable—for instance, after an announcement of an acquisition the stock price of the acquired company will generally increase (unless the company is overvalued) while the stock price of the acquiring company will generally decrease. However, for specific companies, less apparent correlations, and correlations with other future occurrences, may be noticeable via automated comparison.

Figure 23:
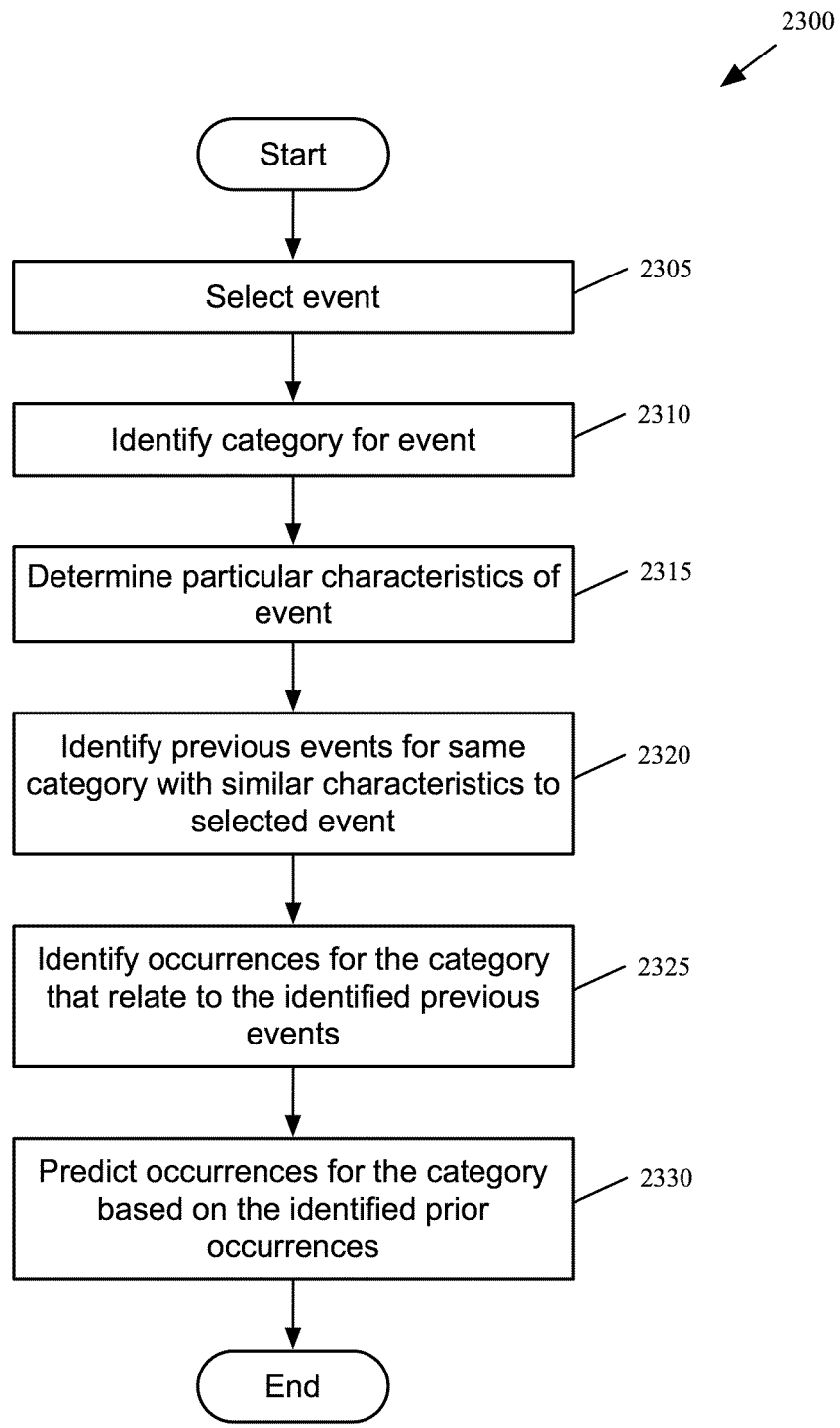
FIG. 23 conceptually illustrates a process of some embodiments for predicting an occurrence for a category based on detected events.

FIG. 23 conceptually illustrates a process 2300 of some embodiments for predicting an occurrence for a category based on detected events. The research system of some embodiments performs process 2300 each time an event is detected. Other embodiments perform research at regularly scheduled times (e.g., once a week, once a month, etc.).

As shown, the process 2300 begins by selecting (at 2305) an event. As mentioned above, in some embodiments this is a newly detected event. The process identifies (at 2310) a category for the event. Some embodiments only perform the correlation process for events associated with a company, while others perform the process for events in other categories as well (e.g., people, products, industries, business lines, etc.).

Next, the process determines (at 2315) particular characteristics of the event. When the event is a web volume event, some embodiments identify characteristics of the event such as the event score, normalized event score, total volume of new documents relating to the category, sources of the documents relating to the category, etc. For management turnover events, the position being changed (i.e., CEO, CFO, etc.) may be noted, along with additional characteristics such as the tenure of the outgoing executive, characteristics about the incoming executive, etc. In a merger or acquisition, the process may identify facts about the acquired and acquiring company. In addition, some embodiments examine the time leading up to the selected event for preceding events. For instance, a management change preceded by an SEC filing and then a spike in web document volume may be noteworthy and indicative of future occurrences. Some embodiments determine characteristics of the environment surrounding the event as well (e.g., the state of the stock market, the time of year, the health of the company, activities of competitors, the health of the industry in which the company operates, etc.).

With the particular characteristics of the event determined, the process 2300 identifies (at 2320) previous events for the same category with similar characteristics to the selected event. An exact match (e.g., exact same event score, normalized score, etc.) is not required in some embodiments. Instead, the characteristics of an event (or sequence of events) must be within a particular threshold (e.g., within a 25% tolerance for the event score and normalized event score, a 20% tolerance for document volume, etc.). Some embodiments identify multiple similar events for the category, and will identify events for similar categories as well (e.g., correlating an event for Toyota with an event for Honda). In addition, some embodiments will note events that are similar in certain characteristics but different in other characteristics (e.g., two document volume events with similar profiles but different preceding histories).

Next, the process identifies (at 2325) occurrences for the category that relate to the identified previous events. For instance, the process may note that the stock price of the company jumped two days after each of four similar past events for the company with which the selected event is associated. Other occurrences may be future events, such as a management change (e.g., after a specific set of events, the CEO of a company resigned). The process may also examine the strength of a relationship between the selected event and the occurrences. For instance, certain types of events and occurrences may have stronger or weaker correlations as a general rule. The strength of the relationship may be a preset value (e.g., a value for a high document volume event correlated with stock price change). Similarly, the process may examine the strength of a relationship between the category of the event and the occurrence—e.g., a change in stock price of the company with which the event is associated is highly correlated with the company, but a change in the price of raw materials used by the company would be less correlated with the company.

Based on the identified prior occurrences that relate to prior similar events, the process predicts (at 2330) future occurrences for the category based on the identified prior occurrences, then ends. For instance, if the stock price of a company has gone down shortly after five similar events to the selected event, the process may predict another decrease in the stock price. Some embodiments determine a likelihood (e.g., 65% likely) of the future event occurring based on the strength of the similarities, the strength of the relationships, etc.

The process may store the prediction information in a database entry for the event or for the category of the event. Some embodiments present this information to a user when the user searches for information on a particular category or selects the event with which the prediction is associated. Some embodiments allow users to set up to receive alerts (e.g., via e-mail or SMS notification) when particular occurrences are predicted based on analysis of events.

Figure 24:
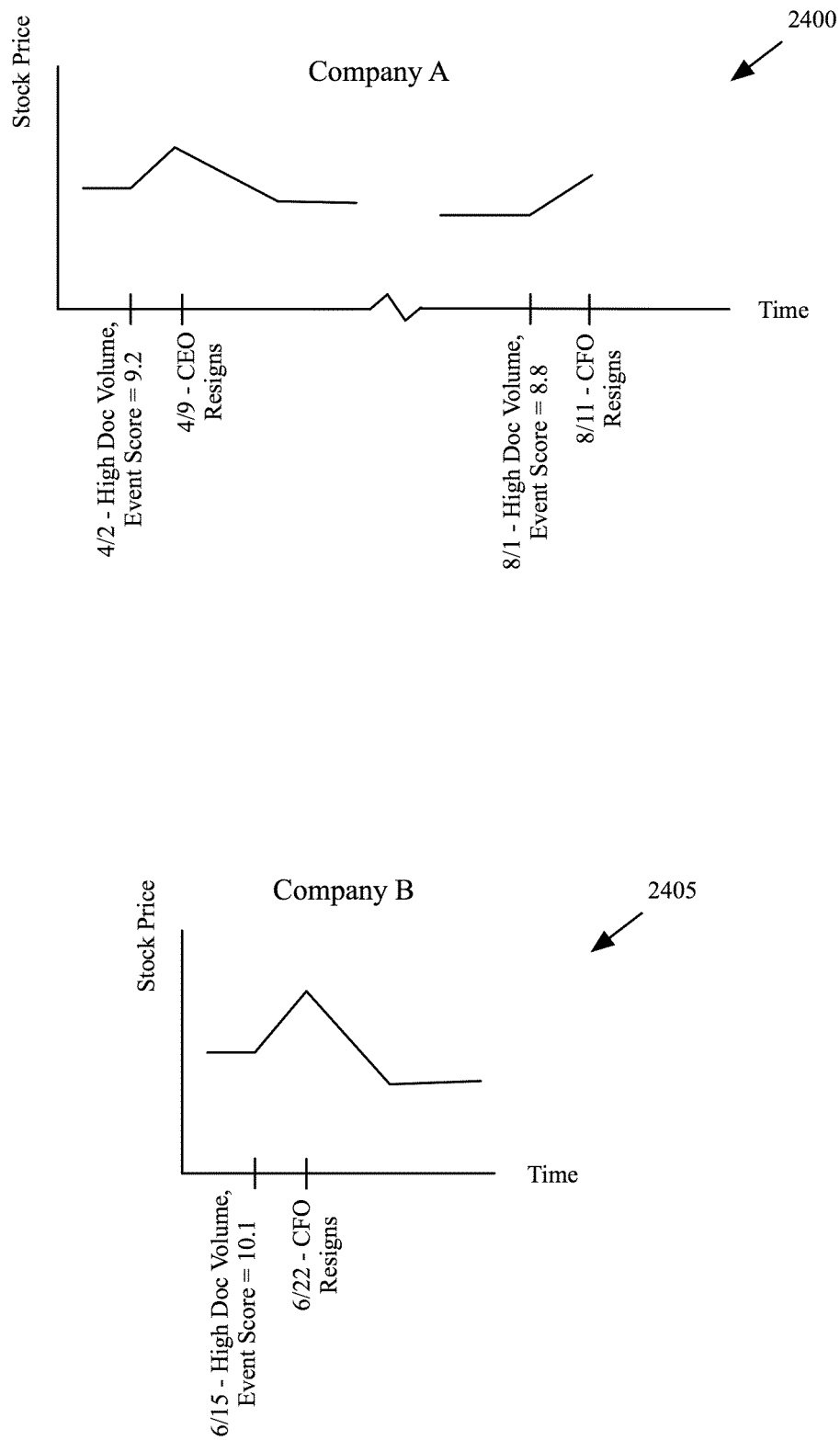
FIG. 24 illustrates an example in which a stock price change might be predicted for a particular company.

FIG. 24 illustrates an example in which a stock price change might be predicted for a particular company. FIG. 24 illustrates a first graph 2400 of stock price versus time for Company A and a second graph 2405 of stock price versus time for Company B. Various events are shown along the time axis for the companies. As illustrated, on April 2 a high document volume event with an event score of 9.2 is detected for Company A, and the stock price begins to increase. However, on April 9, seven days later, the CEO of Company A resigns and Company A's stock price decreases. Similarly, for Company B, a competitor of Company A with a similar profile (e.g., similar size, numerous overlapping business lines, etc.), a high document volume event with an event score of 10.1 is detected on June 15, and the stock price of Company B begins to increase. Seven days later, the CFO of Company B resigns, and the stock price decreases substantially.

Returning to Company A, on August 1 a high document volume event with an event score of 8.8 is detected, followed by an increase in the stock price of Company A. On August 11, the CFO of Company A resigns. Based on the similarities of this event to the CEO resignation on April 9 and the CFO of Company B's resignation on June 22, the system may predict a subsequent decrease in stock price. While the event scores of the three document volume events are not exactly the same, all three led to similar (though not exactly the same) increases in stock price, and in the two situations for which data exists, the subsequent resignation of a high-ranking executive caused the stock price to decrease to a price below the level prior to the document volume event.

VII. Presentation of Events in Graphical User Interface

The above sections describe the collection and creation of substantial amounts of information—the classification of documents as relevant or not relevant to thousands of different categories, the detection of web volume events for the different categories, the naming of those web volume events and the determination of representative documents for the events, the normalization of events for comparison across categories, and other research performed using the events. Some embodiments provide a graphical user interface (GUI) for presenting this and other information about the various categories to a user. In some embodiments, the GUI is presented to a user through a web browser operating on the user's device (e.g., laptop computer, personal desktop computer, smart phone or other handheld device, etc.). The user logs into the system in some embodiments, and is provided with the ability to search for information on a particular category. Drawing on the data structure (e.g., database entry) for the searched category, as well as the other data structures for related events, documents, etc., the system generates a GUI and presents information about the searched category to the user. This may include web document volume history for the category, articles relevant to the category, events for the category, etc.

Figure 25:
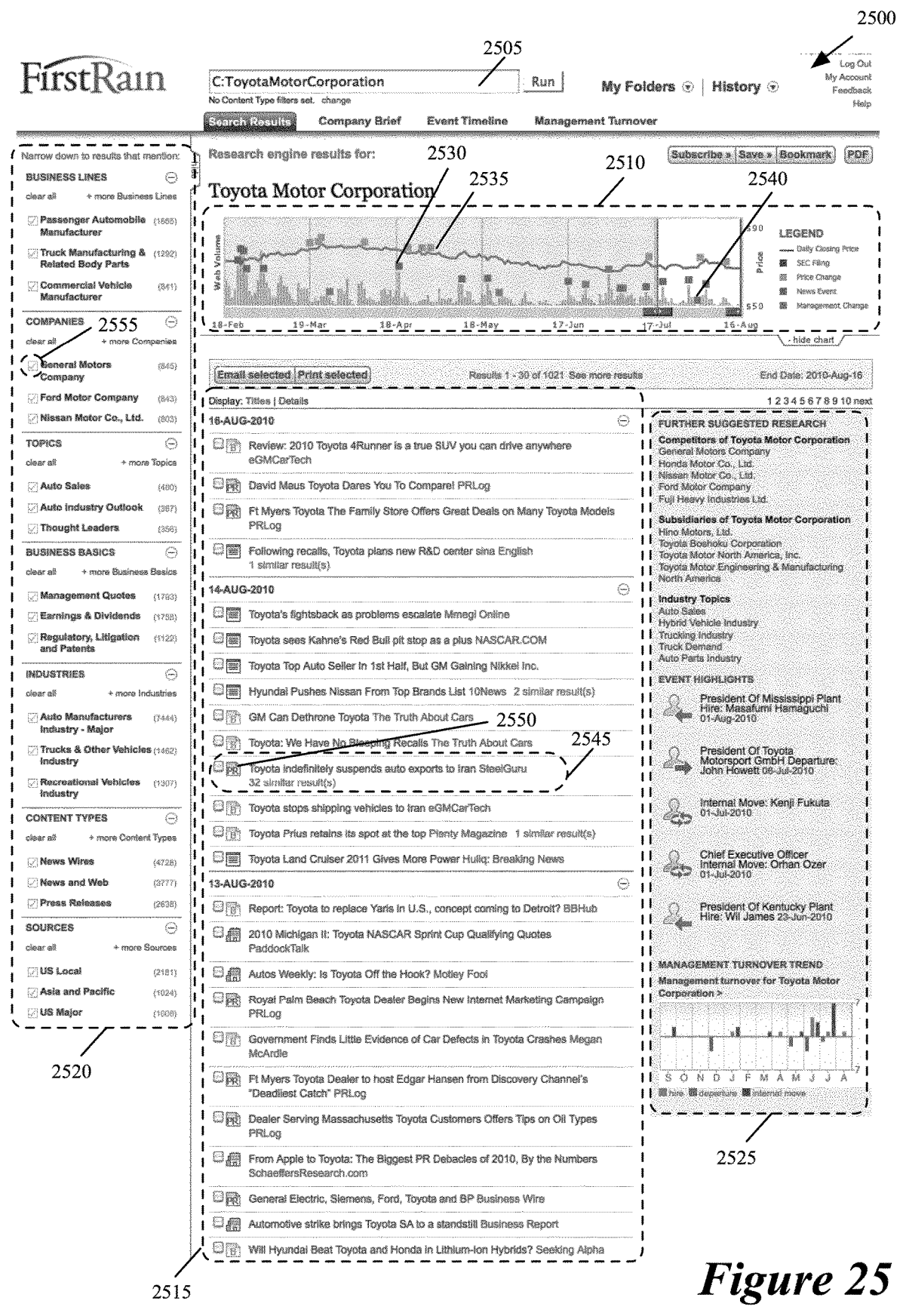

FIG. 25 illustrates such a GUI 2500 that is presented to a user (e.g., via a user's web browser operating on the user's computing device). The user's web browser sends a request for a particular page (e.g., by entering a search term, and the research system of some embodiments generates a graphical user interface populated with information from the system, which is sent (e.g., as an HTML document) to the user's web browser.

The GUI 2500 includes a search bar 2505, a document volume graph (or chart) 2510, a document display area 2515, a filter display area 2520, and an additional information display area 2525. The user enters a category name into the search bar 2505 to search for information about a particular category. In some embodiments, the search bar has an autocomplete function, such that once the user starts typing in a name, various options are presented. For example, in the GUI 2500, the user has searched for "Toyota Motor Corporation". After typing the first few letters "Toy", the GUI presents the user with a list of possible categories, including the company "Toyota Motor Corporation". In addition, as shown, some embodiments indicate the type of category, in this case a company denoted by the "C:". After typing in the letters "Toy", the user is also presented with "Toy and Games Industry", which is denoted by a "T" for topic or an "I" for industry.

The document volume graph 2510 displays a variety of information about the selected category. The graph 2510 displays the volume of new documents that appeared on the world wide web related to the selected category for each day over a particular time period (as described above in Sections I and II). In this case, the time period is approximately six months, though this period is variable by the user in some embodiments. The graph displays a histogram of the document volume over this time period, with the larger bars indicating a higher web volume. In some embodiments, the bars are also selectable items enabling a user to view only documents from the day associated with the bar in document display area 2515, which is described in further detail below.

When the selected category is a publicly traded company, as is the case in FIG. 25, the document volume graph 2510 also displays the stock price of the company. In some embodiments, the user can move a cursor (e.g., with a mouse or other cursor controller) over the graph of the stock price, causing the GUI to display an information box at the cursor location with the date and stock price. On the right side of the graph, a scale is displayed for the stock price—for Toyota, the range is from $50 to $90.

The document volume graph 2510 also serves as an event display. As illustrated in the legend to the right of the graph, four types of events are displayed on the graph: SEC filings, notable stock price changes, news events (i.e., high document volume events), and management changes. Other embodiments will display more, less, or different types of events (e.g., acquisitions, product releases, etc.). Different types of categories will include different events: for instance, the GUI for a person might include only document volume events and position changes, while the GUI for an industry would include only document volume events. The graph 2510 illustrates items for numerous events for Toyota, including a document volume event item 2530, a price change event item 2535, and a management change event item 2540. As described further below, in some embodiments these event items are selectable items the selection of which focuses the GUI on an event, navigates the user's web browser to a representative document for the event, or causes another action in the GUI to occur.

The document display area 2515 displays a list of documents classified as relevant to the searched category. Some embodiments display only documents classified as highly relevant to the searched category, while other embodiments display documents classified in other tiers. Some embodiments allow the user to set the relevancy levels of the displayed documents. In the example GUI of FIG. 25, the documents displayed are all relevant to Toyota. Some embodiments, as shown, display the documents chronologically starting from the most recent. The date range of the documents listed in document display area 2515 is determined based on a selection window in the document volume graph 2510. As shown, the current window runs from approximately Jul. 17, 2010 to Aug. 16, 2010. This window is user-selectable, as described in further detail below.

Some embodiments provide user-selectable options for both a titles-only view (as shown in FIG. 25) for the document list and a detailed view for the document list. As shown, the titles lists the title of a document and its source, as well as the number of duplicate documents. For instance, the document 2545 from August 14, with a title of "Toyota indefinitely suspends auto exports to Iran" has 32 duplicate documents. Selecting the title (e.g., by clicking on the title) causes the listed document to open in a browser window or tab—in this case, the article from SteelGuru. When a user selects the "32 similar result(s)" option, some embodiments display a list of the other sources at which the document can be found, allowing a user to select one of the other sources in order to open a browser window or tab with the document at the selected source.

The detailed view of some embodiments displays, for each article in document display area 2515, a list of all of the categories to which the document is considered relevant, as well as information from the document (e.g., any category tags in the document, the first sentence of the document, etc.). In some embodiments, this information is also presented to the user in the titles view when requested by the user. When a user selects a document icon (e.g., the document icon 2550), the GUI 2500 displays the information from the document (e.g., underneath the title). When a user hovers the cursor over the document list item (e.g., over the selectable title without selecting the title), the information in the additional info display area 2525 is temporarily removed and replaced with a list of the categories to which the document is considered relevant as well as, in some embodiments, any quotes or other facts extracted from the article. The extraction of such quotes or other facts is detailed in the '839 application, referred to and incorporated by reference above.

The filter display area 2520 displays a set of document filters customized to the particular searched category. As shown, some embodiments group the filters (for a company) into business lines, companies, topics, business basics, industries, content types, and sources. By default, all filters are selected (i.e., all of the documents from a chosen date range are displayed in the document display area 2515. However, when a user selects a filter (e.g., the item 2555 for General Motors), then only documents that also are relevant to the selected category (General Motors) are selected. That is, the only documents displayed in the document display area 2510 are documents that have been classified as relevant to both Toyota and General Motors. If a second filter is selected (e.g., US Local from the sources group), then only documents classified as relevant to both Toyota and GM, from US Local sources, will be displayed in the document display area 2510.

The additional information display area 2525 displays various additional information related to the searched category. For instance, as Toyota is a company, the display area 2525 includes a list of top competitors with links to similar pages for those competitors (the determination of top competitors is described in detail in the '237 application, mentioned and incorporated by reference above), subsidiaries of Toyota, and industries in which Toyota operates. Additionally, information about recent management changes is displayed in the display area 2525. Some embodiments allow a user to customize this section of the display area to display different information.

One of ordinary skill in the art will recognize that the information illustrated in GUI 2500 may be presented in many different ways, and that the arrangement of information shown in FIG. 25 is only one possible GUI to present research results to a user. For instance, the display areas could be arranged differently than shown, could present different information than shown, etc. The following subsections illustrate in further detail certain aspects of the GUI 2500 of some embodiments.

A. Document Volume Graph

As described above, the document volume graph 2510 displays (i) a histogram of web document volume for a category, (ii) the stock price of the category when the category is a publicly traded company, and (iii) various types of events associated with the category. As mentioned, the document volume graph includes a user-selectable window that enables the user to select a date range for documents displayed in the document display area 2515.

FIG. 26 illustrates the document volume graph 2510 in three stages 2610-2630 as a user modifies the date window. Stage 2610 illustrates the document volume graph 2510 as shown in FIG. 25, with the date selection window ranging from July 17 to August 16. As illustrated, the user has placed cursor 2605 over the selection item 2615 for the left side of the date selection window and is moving the cursor leftwards with the selection item selected (e.g., by pressing down a mouse button and moving the mouse to the left with the button held down).

At stage 2620, the left side of the date selection window has been moved from July 17 to April 17. At this point, the document display area 2515 would display documents from August 16 back to April 17. As shown in FIG. 25, this would not affect the first page displayed in GUI 2500, as the display area 2515 only had room for document titles from August 16, August 14, and August 13. However, for a category with fewer documents, new documents would now be displayed. Furthermore, more pages of document listings would now be available for Toyota, going back to April 17. In addition, at stage 2620, the user has placed cursor 2605 over the selection item 2625 for the right side of the date selection window and is moving the cursor leftwards with the selection item selected.

Figure 27:
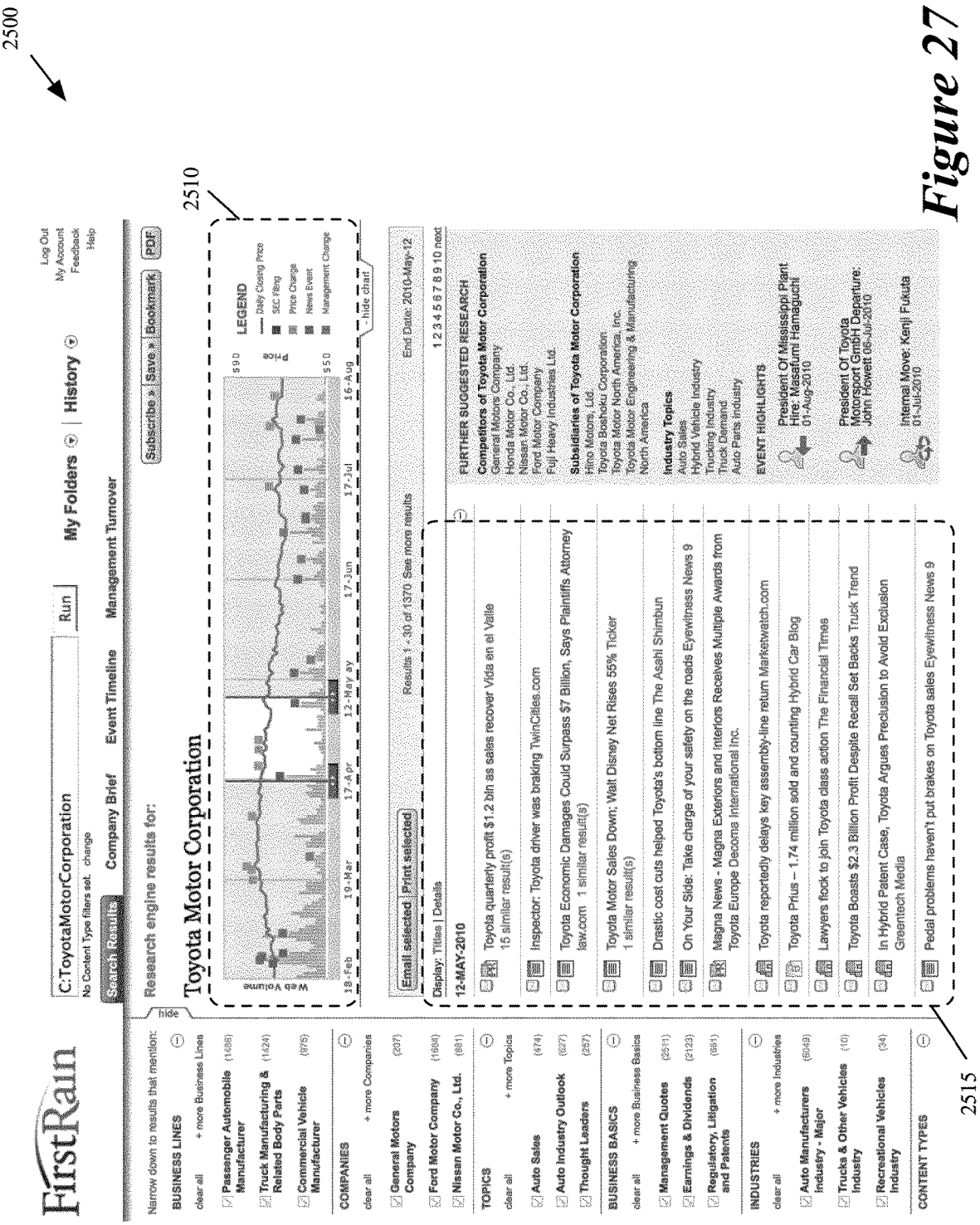
FIG. 27 illustrates the GUI of FIG. 25 with the document volume graph as modified in FIG. 26.

At stage 2630, the date range of the selection window has been modified to span from April 17 to May 12. FIG. 27 illustrates the GUI 2500 with the document volume graph 2510 as modified in FIG. 26, such that the date range runs from April 17 to May 12. As shown in document selection display area 2515, the document display area only displays documents from the chosen date range. In this case, because the system classified many documents from May 12 as relevant to Toyota, only documents from this date are presently displayed.

As mentioned, the document volume graph 2510 also displays items to represent various events identified by the research system of some embodiments. In some embodiments, these event items are selectable items. Selection of an item may open a browser window or tab with the representative document for the event, or may populate the document display area with a set of articles related to the event. Furthermore, some embodiments display an event summary (e.g., the title of the representative document) when a user places a cursor over the event item.

Figure 28:
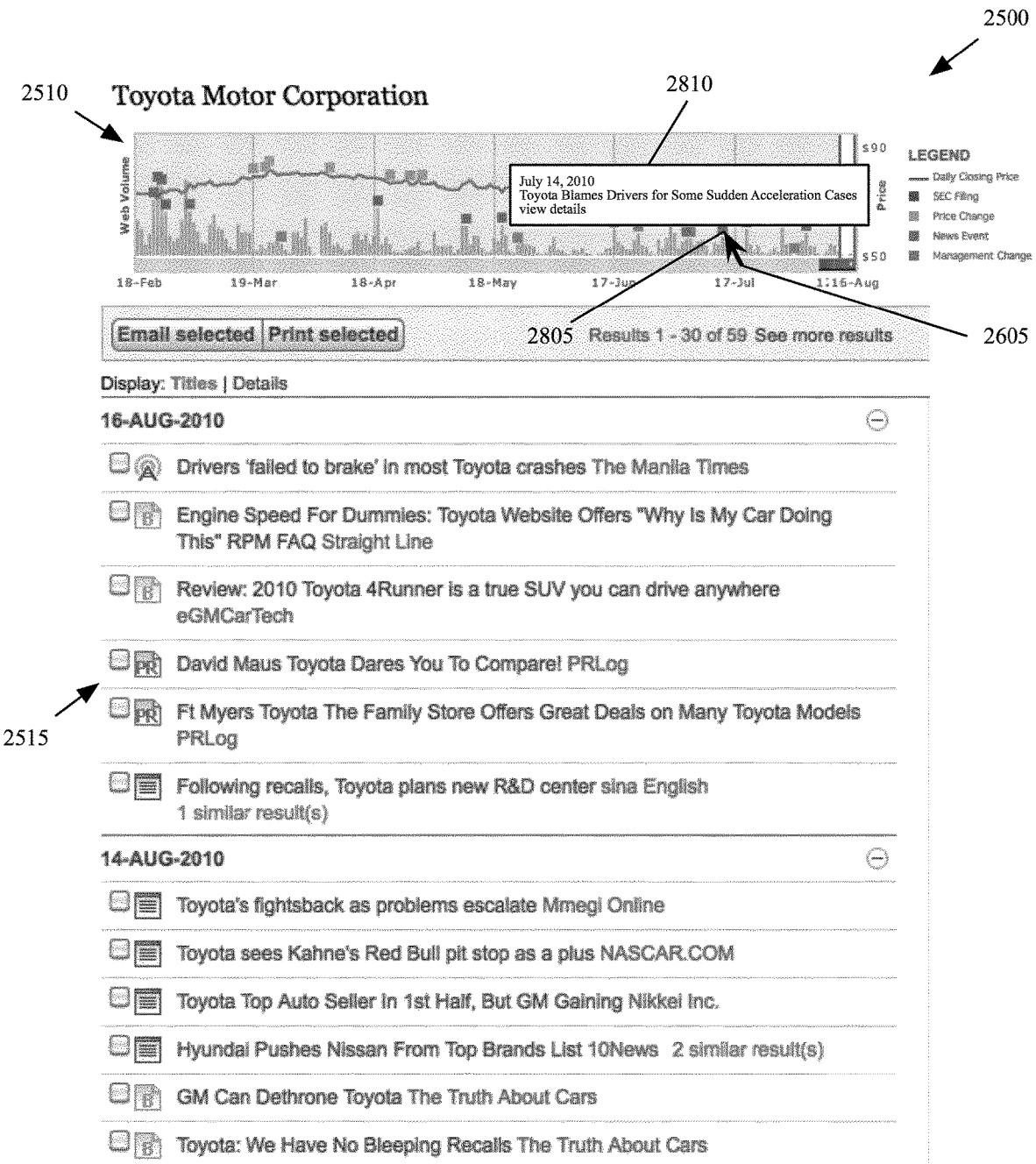
FIG. 28 illustrates a portion of the GUI of FIG. 25 with a user having placed the cursor over an event item for a document volume event.

FIG. 28 illustrates a portion of the GUI 2500 with a user having placed the cursor over the event item for a document volume event of Jul. 14, 2010. Specifically, FIG. 28 (and the subsequent FIG. 29) illustrate only the document volume graph 2510 and a portion of the document display area 2515. As shown, the document display area 2515 currently displays documents from August 16 and August 14.

The user has moved cursor 2605 over an event item 2805 in the document volume graph 2510. As a result, the GUI displays an event summary box 2810 above the event item 2805. The event summary box 2810 indicates the date of the event (Jul. 14, 2010) and the name assigned to the event, which in some embodiments is the title of the representative document for the event ("Toyota Blames Drivers for Some Sudden Acceleration Cases"). When the event is a management change, some embodiments display a summary of the change (e.g., "President Hire: Wil James"). When the event is a price change, a summary of the noteworthy change is displayed (e.g., "TM—Toyota Motor Corporation Stock closing price ($72.4)). When the event is an SEC filing, some embodiments display the title of the document filed with the SEC (e.g., "Results of Operations and Financial Condition").

Figure 29:
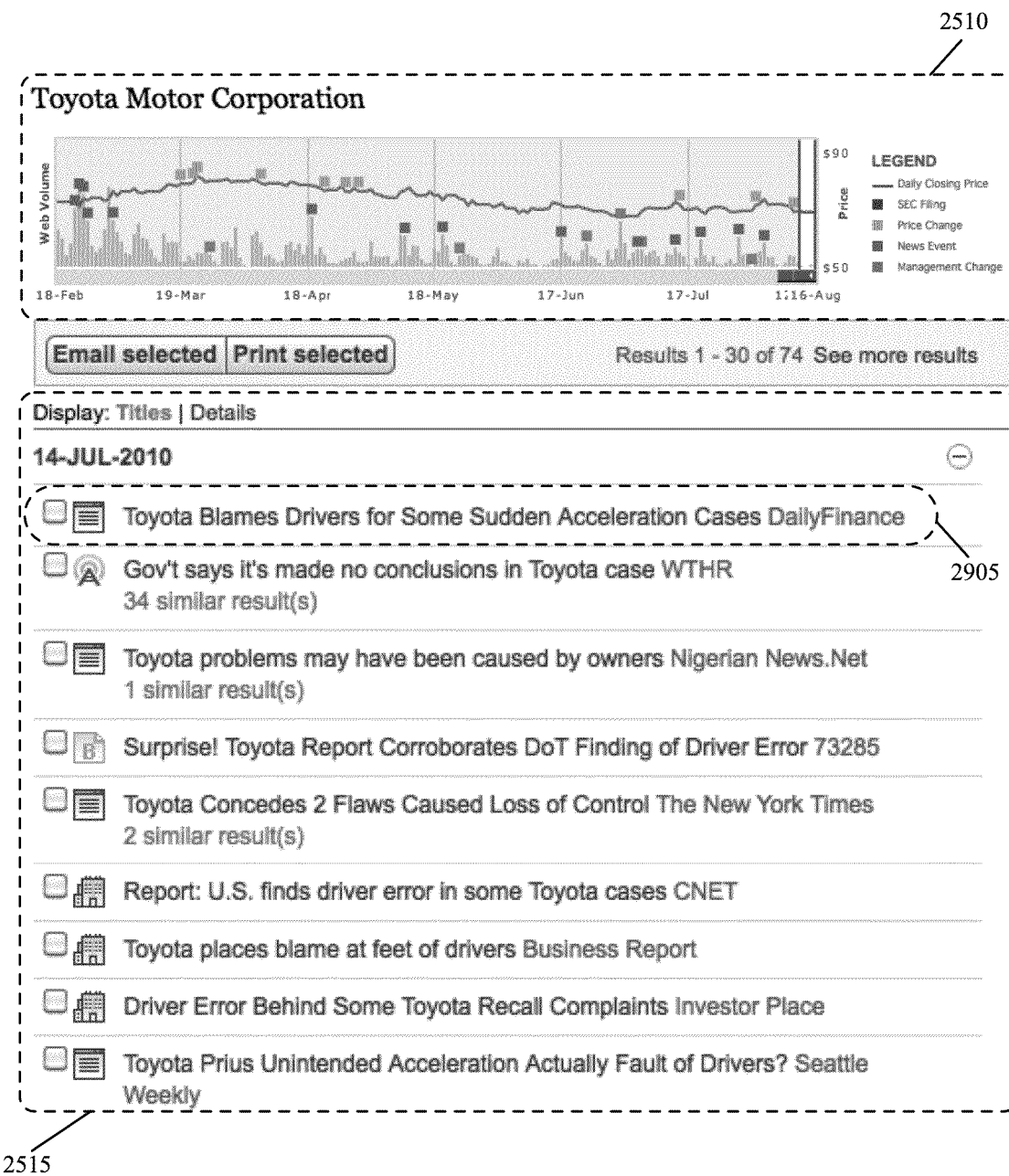
FIG. 29 illustrates the document volume graph and the document display area of the GUI of FIG. 25 after the user has selected the event item according to some embodiments.

FIG. 29 illustrates the document volume graph 2510 and the document display area 2515 of GUI 2500 after the user has selected (e.g., via a mouse click) the event item 2905 for the Jul. 14, 2010 event, according to some embodiments. The document display area 2510 focuses specifically on the documents related to the event. Some embodiments identify the documents with the highest document event scores (e.g., the scores described above in Section IV, based on the presence of event keywords). Thus, all of the documents displayed are related to the subject of the event (fault in the unintended acceleration issues). As shown, the first document title 2905 in the list is the same as the event name in the summary box 2810.

Other embodiments, however, rather than modifying the document listing in the document display area, open a new window or tab in the application with which the user is viewing the GUI (e.g., a web browser). The new window or tab is directed to the representative document for the event (e.g., the document whose title is used in the event summary box). When the event is a management change, some embodiments direct the browser to an article from which the management change information was extracted. When the event is an SEC filing, some embodiments direct the browser to a copy of the publicly available document filed with the SEC. Price change events, in some embodiments, are not selectable.

Figure 30:
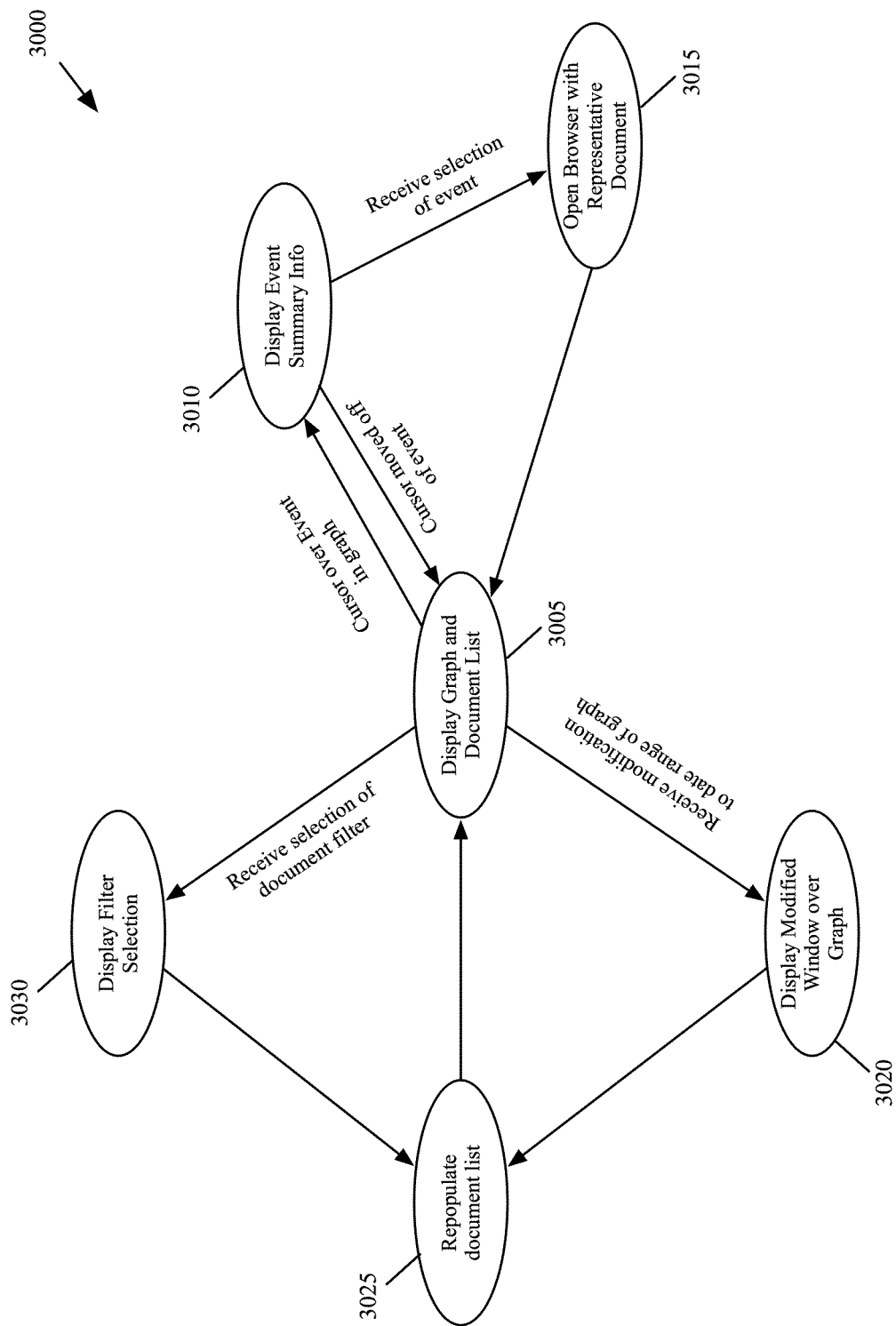
FIG. 30 conceptually illustrates a state diagram for the GUI of some embodiments.

FIG. 30 conceptually illustrates a state diagram 3000 for the GUI of some embodiments. The state diagram 3000 assumes that the GUI is open in a user application (e.g., in a window of the user's web browser). Furthermore, the state diagram 3000 is not meant to include all possible interactions and states of a GUI such as GUI 2500, but rather pertains to a subset of interactions that affect the document volume graph and document display area.

As shown, at state 3005 the GUI displays the document volume graph and document list for a particular selected category. Details of the document volume graph and document display area are described above by reference to GUI 2500 of FIG. 25. The document volume graph displays a histogram of web volume, stock price information, a set of items representing various events for the selected category, and user-selectable tools to form a range of dates. The document display area displays a list of documents that are relevant to the selected category and are from the date range selected through the document volume graph. The document list may also be filtered based on filters selected through a different display area (e.g., document filter display area 2520 of GUI 2500).

When the user moves a cursor over an event item in the document volume graph, the GUI transitions to state 3010 to display event summary information. An example of such information is shown in the event summary box 2810 of FIG. 28. This may include the date of the event, a name automatically selected for the event (e.g., the title of a representative document), etc. When the user moves the cursor off of the event summary information, the GUI transitions to 3005 to continue displaying the document volume graph and document list without the event summary information.

When the user selects the event item, the GUI transitions to state 3015, to open a browser window or tab with the representative document for the event. As described above, this document may be different for different events. For a high document volume event, the representative document is chosen in some embodiments as described in Section IV. If the link to the representative document is dead, some embodiments replace it with a new document or a summary document, as described in Section V. Some event items (e.g., for stock price changes) are not selectable. After the GUI opens a new browser window or tab with the representative document, the GUI transitions to 3005 to continue displaying the same graph and document list. In addition, while the GUI is at stages 3010 and 3015, the graph and document list are still displayed as normal, except that the summary information is displayed over part of the graph at 3010.

When the GUI receives a modification to the date range of the document volume graph (e.g., as illustrated in FIG. 26), the GUI transitions to state 3020 to display a modified window over the graph. That is, as the user selects and moves an edge of the graph (or selects a bar in the histogram to focus on a specific day), the display of the graph changes. From state 3020, the GUI transitions to state 3025 to repopulate the document list of the document display area based on the modification to the date. A request with the new document dates is sent to the research system, which sends back a new list of document information for the GUI. The GUI then transitions to 3005 to continue displaying the updated graph and document list.

When the GUI receives a selection of a document filter (e.g., one of the filters shown in document filter display area 2520 of FIG. 25), the GUI transitions to state 3030 to display the filter selection. The GUI displays a check in a check box next to the title of the filter in some embodiments. The GUI then transitions to state 3025 to repopulate the document list of the document display area based on the newly applied filter (and the currently set date range). The GUI then transitions to 3005 to continue displaying the updated graph and document list.

B. Top Topics Display

As described above in Section III, some embodiments normalize event scores across a set of categories (e.g., all competitors of a particular company). These normalized event scores may be used to identify the top events for a particular group of categories. Some embodiments present the top events to the user in a GUI.

Figure 31:
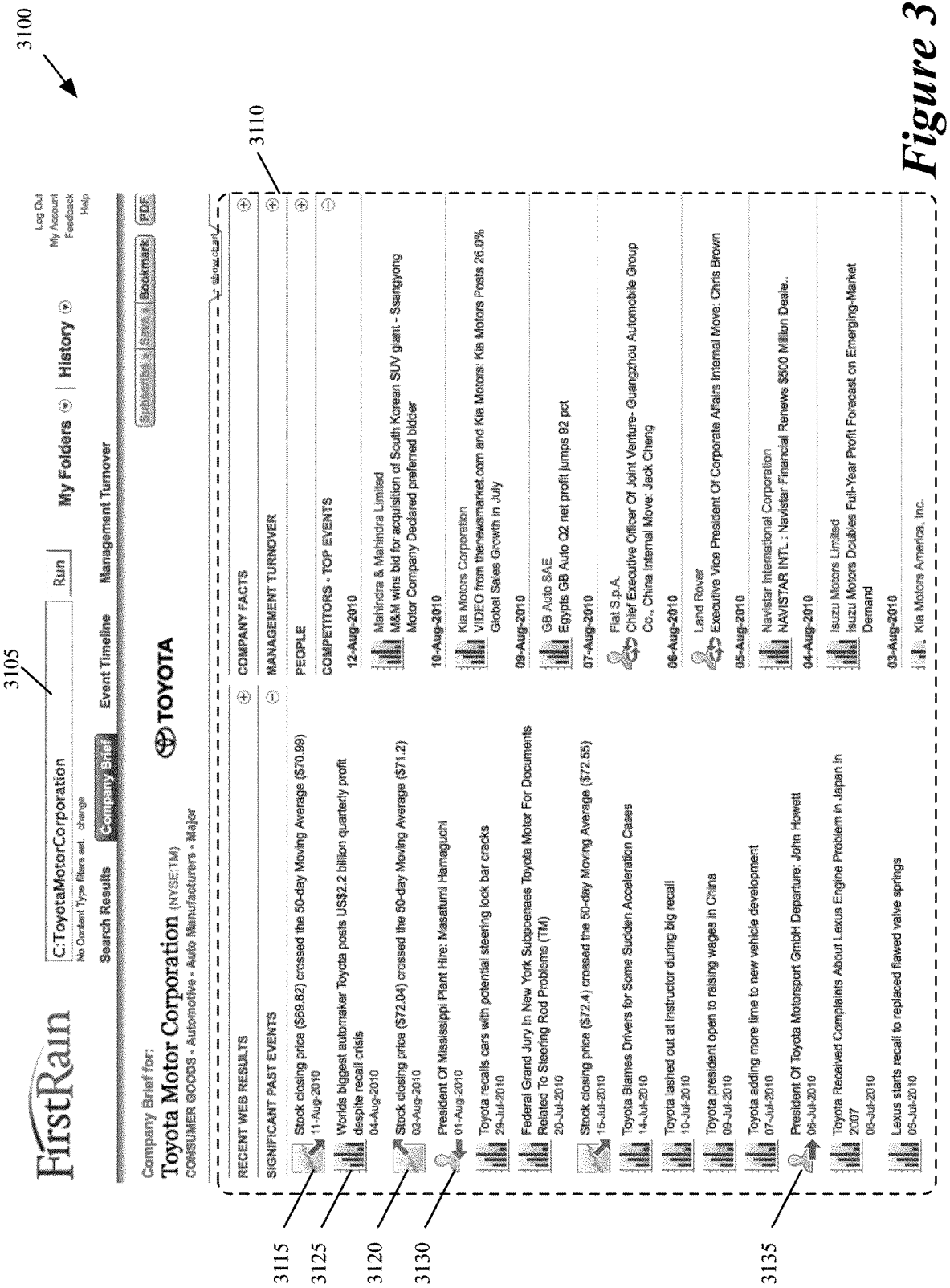
FIG. 31 illustrates a GUI that includes a display of such top events.

FIG. 31 illustrates a GUI 3100 that includes a display of such top events. The GUI 3100 is similar to the GUI 2500 in that much of the same ancillary information (e.g., the information in the search bar 3105) and the surrounding area is the same. In addition, as indicated by the "show chart" tab, the user has the option of having the document volume graph displayed above the primary display area. The GUI 3100 also includes a category information display area 3110 that is broken into several sections for displaying information about the selected category (in this case, Toyota). Some embodiments only provide this particular GUI when the selected category is a company.

The display area 3110 includes a section for recent web results (currently minimized) that displays a document list such as shown in the document display area 2510, a section for company facts (currently minimized) that displays various information such as a short description of the company, stock information, the number of employees, contact information, list of competitors, list of business lines in which the company operates, etc. for the company, a section for management turnover information (currently minimized) that displays recent management changes at the company, and a section for people (currently minimized) that displays information about the current executives, directors, etc. of the company.

The display area 3110 also includes a section for significant events related to the company (i.e., the events displayed in document volume graph 2510). Different types of icons are used in the display for different types of events. For instance, icons 3115 and 3120 indicate stock price changes (down and up, respectively), icon 3125 indicates a document volume event, and icons 3130 and 3135 indicate management change events (hiring and departure, respectively). Next to the icon is the event date and the name of the event (which may be the title of a representative document for the event). In some embodiments, selecting the event name will cause a browser window or tab to open with the representative document.

The display area 3110 also includes a section for top events of competitors. Some embodiments automatedly identify competitors of a company by first identifying the company's business lines (e.g., as described in the '237 application, incorporated by reference above). The competitors' top events section identifies the events with the highest normalized score across the set of companies. In addition, as shown in FIG. 31, recent management changes at the competitors are included—SEC filings and stock price changes, however, are not generally treated as top events.

Figure 32:
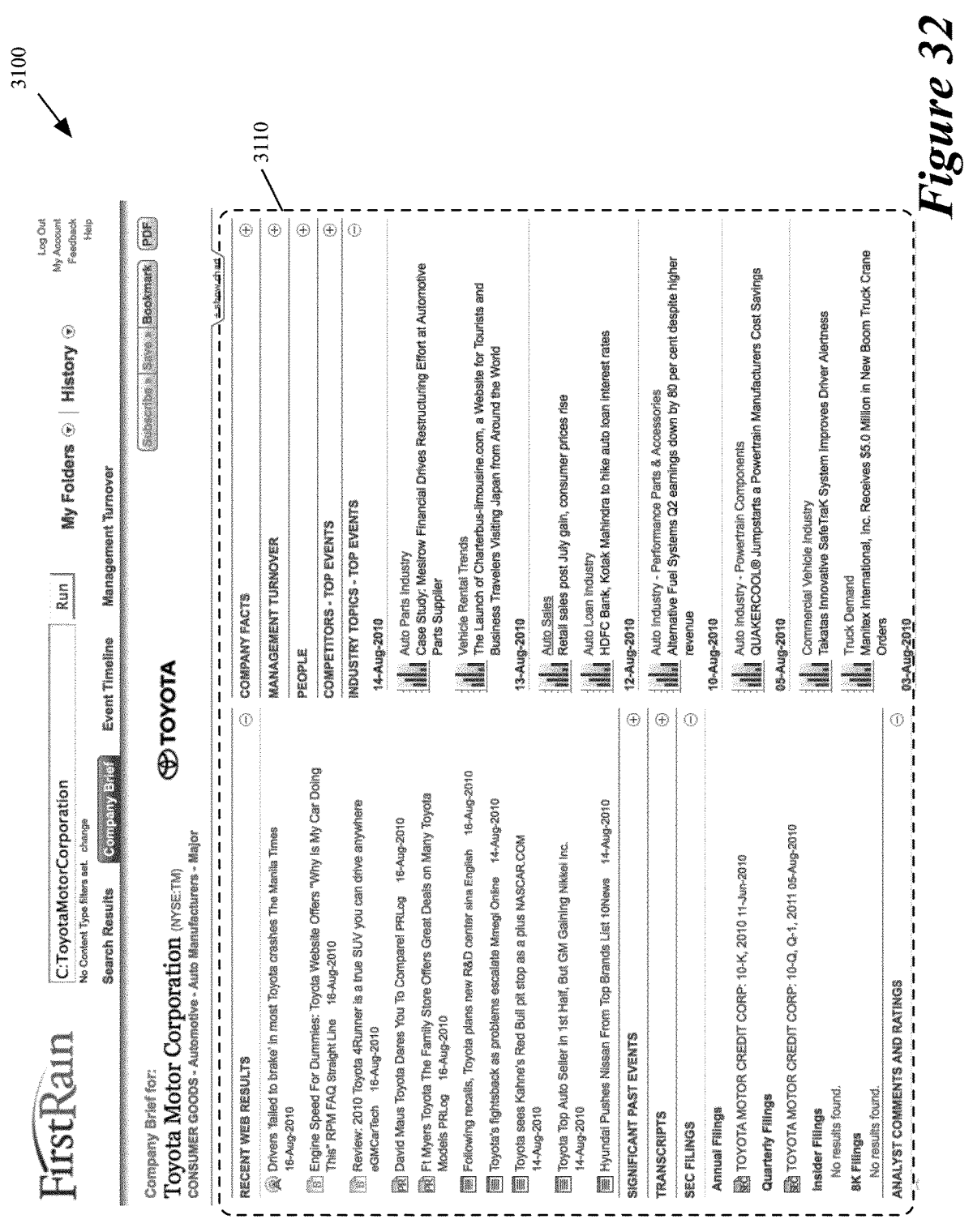

FIG. 32 illustrates another view of GUI 3100 that includes additional sections in display area 3110. The display area 3110 also includes a transcripts section (currently minimized) for transcripts of public speeches, conference calls, etc. related to the company and a section for analyst comments and ratings (currently minimized) for documents about analyst ratings or comments, or documents from the analysts themselves. In addition, the display area includes a section for SEC filings. This section includes links to SEC documents in the categories of annual filings, quarterly filings, insider filings, and 8K filings.

The display area 3110 also includes a section for top events in the industry or industries of which the company is a part. Some embodiments automatedly determine the company's industries or business lines (e.g., as described in the '237 application, incorporated by reference above). The industry topics top events section identifies the events with the highest normalized score across the set of industries. As these are not companies, stock price changes, SEC filings, and management changes are not included.

C. Event Zones

The GUI 2500 of some embodiments is displayed using data structures such as those described above. Some embodiments also generate a similar GUI for a particular selected event that includes information related to the event. For instance, each event is designated with a particular category in some embodiments. This category is related to other categories, other events, etc. Based on these relationships (e.g., through a series of database entries or other data structures), the system of some embodiments can identify additional categories related to the event, people related to the event, etc. Quotes related to the event can be derived in some embodiments from documents deemed particularly relevant to the event (e.g., the event's representative document and its backups). In addition, some embodiments can search for and identify informal opinions such as those found on Twitter (e.g., by searching for tweets tagged with #toyota on the date of a Toyota event). This information may also be presented or linked to in the GUI of some embodiments.

Figure 33:
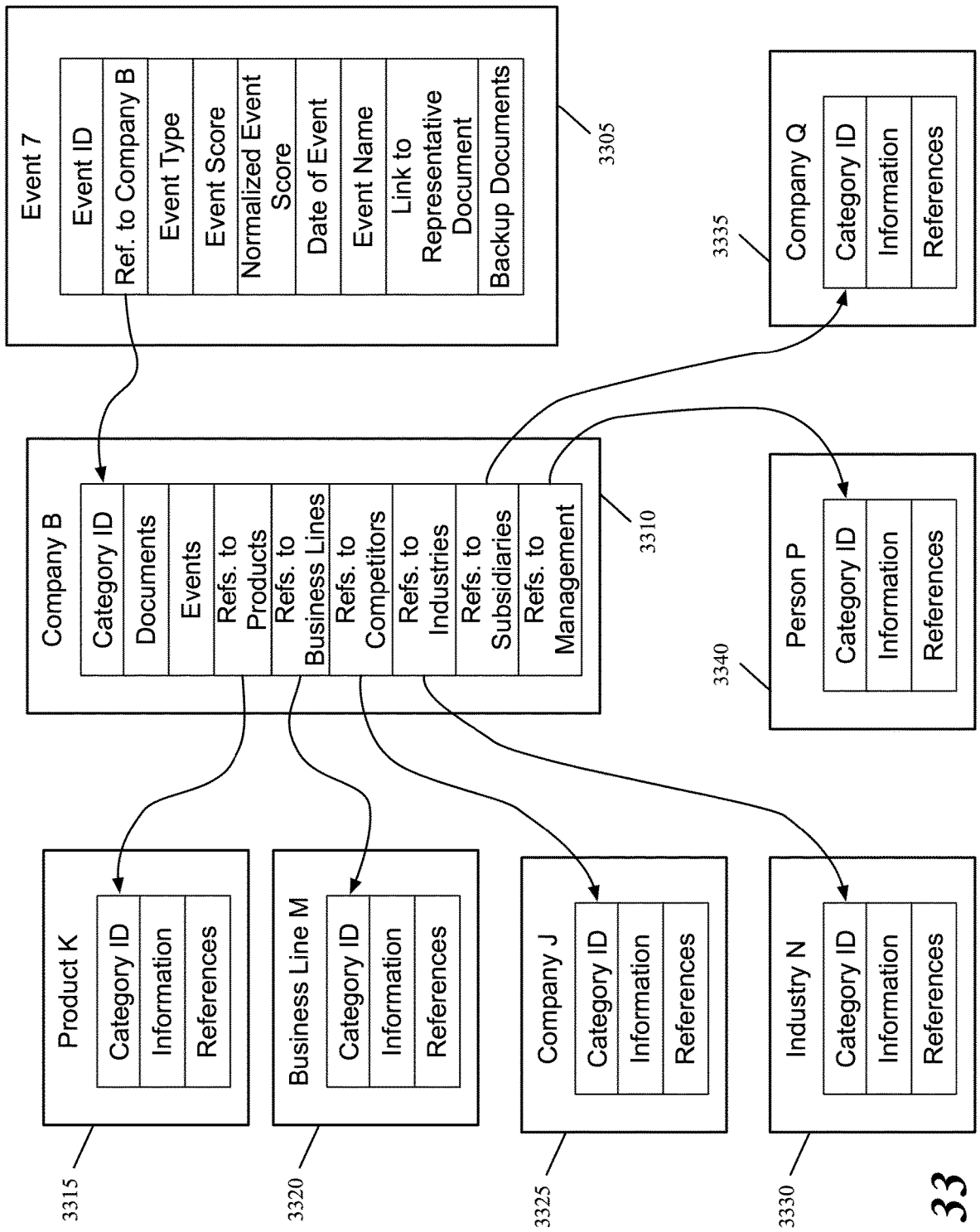
FIG. 33 conceptually illustrates a network of linked data structures for a particular event.

FIG. 33 conceptually illustrates a network of linked data structures for a particular event (Event 7). This event is represented by an event data structure, which includes the same fields as those illustrated in FIG. 18. These fields include a reference to a category, which refers to the category of Company B.

Company B is represented by data structure 3310, which includes fields for the unique category ID, a list of documents relevant to the category, references to events for the category, references to products produced by the company, references to business lines and industries in which the company operates, references to competitors and subsidiaries of the company, and references to company management.

The references to products include a reference to Product K, represented by a data structure 3315, which itself includes further information and references to additional data structures (e.g., competing products, a reference to Company B, a reference to a business line, etc.). The references to business lines include a reference to Business Line M, represented by a data structure 3320, which itself includes further information and references to additional data structures (e.g., other companies operating in the business line, a reference to Company B, etc.). The references to competitors include a reference to Company J, represented by a data structure 3325, which itself includes further information and references to additional data structures (e.g., similar references to those found in the data structure 3310).

The references to industries include a reference to Industry N, represented by a data structure 3330, which itself includes further information and references to additional data structures (e.g., other companies operating in the industry, a reference to Company B, etc.). The references to subsidiaries include a reference to Company Q, represented by a data structure 3335, which itself includes further information and references to additional data structures (e.g., similar references to those found in the data structure 3310). The references to management include a reference to Person P, represented by data structure 3340, which itself includes further information and references to additional data structures (e.g., references to Company B and past companies for which the person has been an executive or director).

Based on this interrelated information, a "zone" of information around an event can be generated. For instance, the representative document and its backups may also be tagged as relevant to competitors or industries of a company with which the event is associated. Thus, these other companies and/or industries are likely to be related to the event. Similar associations can be generated through the network of interrelated data structures, and the most related information presented in the GUI for an event.

VIII. Overall System Architecture

As discussed above, in some embodiments the event detection and analysis described in this application is used within a system which is accessed by users performing research (e.g., financial analysts, attorneys, etc.). The back-end of the system categorizes new documents from the world wide web on a regular basis for thousands of different categories (e.g., companies, people, products, business lines, etc.), identifies events based on relative increases in the volume of new documents pertaining to a category, analyzes and normalizes the events, and performs other automated research regarding the events. The researchers access the data created by the back-end of the system through a front-end user interface.

Figure 34:
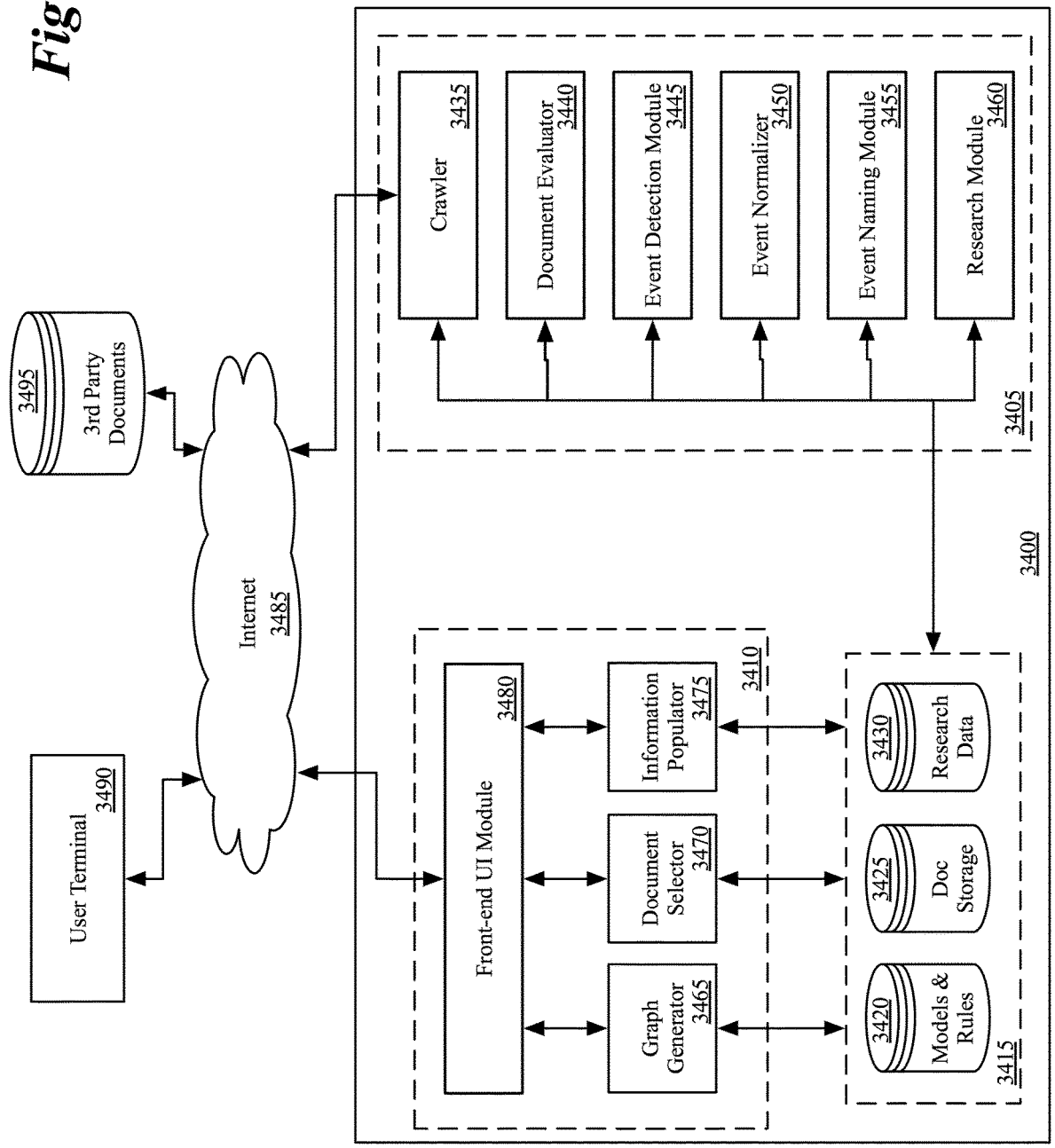
FIG. 34 conceptually illustrates the overall software architecture of a research system of some embodiments.

FIG. 34 conceptually illustrates the overall software architecture of such a research system 3400 of some embodiments. One of ordinary skill will recognize that the various modules shown in this figure may all operate on a single electronic device (e.g., a server) or may be spread among numerous such devices. The system 3400 includes a document retrieval and research system 3405, a user interface (UI) generation system 3410, and storages 3415.

The storages 3415 include a models and rules storage 3420, a document storage 3425, and a research data storage 3430. The models and rules storage 3420 stores models for evaluating documents for relevancy to various categories, along with other classification rules (e.g., junking and filtering rules described above in Section I). The document storage 3425 stores documents or content extracted from documents for use by the document retrieval and research system 3405 (e.g., to classify the documents, name events, etc.). The research data storage 3430 stores the various data structures created by the research system 3405 and used by the UI generation system 3410 to populate a user interface. This includes the data about document relevancy, events, category associations, etc. discussed in the sections above. The storages 3415 may be entirely contained on one physical storage or may be spread across multiple physical storages (e.g., the models and rules may be stored with the research data while the documents are stored on a separate storage, the document information may be spread across multiple storages, etc.).

The document retrieval and research system 3405 retrieves documents from the web, classifies the documents as relevant to various categories, and performs additional research (e.g., event detection) based on the document information. The document retrieval and research system 3405 includes a crawler 3435, a document evaluator 3440, an event detection module 3445, an event normalizer 3450, an event naming module 3455, and a research module 3460. The crawler 3435 is connected to the Internet 3485 and crawls the Internet on a regular basis in order to identify new documents stored on third party storages 3495 (e.g., web servers). Some embodiments download copies of these new documents or extract content from the documents and store the content in the document storage 3425.

The document evaluator 3440 evaluates each of the new documents identified and retrieved by crawler 3435 using the models stored in storage 3420 for a wide variety of categories to determine which documents are relevant to which categories. The document evaluator 3440 of some embodiments also determines whether the document qualifies as a junk document, whether the document is a duplicate, and whether the document should be filtered from event counting. The document evaluator 3440 stores the relevancy information for the various documents in the research data 3430.

The event detection module 3445 determines, for each category on each day, whether a high document volume event has occurred. As described in detail in Section II, the event detection module 3445 counts the number of documents relevant to a category on a particular day and compares this document volume to the average number of documents relevant to the category over a background time period. Based on this comparison, the event detection module determines whether an anomalously high number of documents are relevant to the category and thus whether a noteworthy event has occurred for the category. The event scores and other event information are stored in research data 3430.

The event normalizer 3450 normalizes events over a particular time period across a set of categories. As described in detail in Section III, the event normalizer 3450 identifies events for a given set of categories, generates a volume profile for the set of categories based on the average document volume for the different categories, and generates a mapping function for event scores for each of the categories based on this volume profile. For each event, the event normalizer 3450 maps the event score for the event to a normalized event score for the event. The normalized event scores are stored in research data 3430.

The event naming module 3455 identifies a name and representative document for each detected event. As described in detail in Section IV, the event naming module 3455 identifies keywords specific to an event by comparing terms present in the documents relevant to the category for the event day with terms present in documents relevant to the category over the background time period. Using these event keywords, the module 3455 identifies a representative document and, in some embodiments, backup documents, for the event. Identifiers referencing the documents are stored in research data 3430 by the event naming module 3455. In some embodiments, the event naming module 3455 also periodically validates the links to the representative documents to ensure that links presented to users in the UI are still valid, as described in detail in Section V.

The research module 3460 performs additional automated research using the documents retrieved by the crawler 3435 and the data created and stored in research data 3430. For instance, the research module may identify the top events over a time period for a set of categories using the normalized event scores, may identify "event zones" (i.e., information surrounding an event), etc. In addition, the document retrieval and research system 3405 may include additional modules for performing other research tasks—identifying business lines and competitors of companies, deriving facts such as management change from documents, etc.

The UI generation system 3410 enables users of the research system to access the various information stored in the document storage 3425 and research data storage 3430 by the document retrieval and research system 3405. The UI generation system 3410 includes a front-end UI module 3480, a graph generator 3465, a document selector 3470, and an information populator 3475. The front-end UI module receives requests from user application 3490 (e.g., a web browser operating on a personal computer, smart phone, or other electronic device) through the Internet 3485 (or other networks, such as a local network). The front-end UI module 3480 generates a user interface that is transmitted (e.g., as an HTML file) to the user application 3490. When the user interacts with the UI, the interactions are transmitted by the user application to the front-end UI module, which re-generates the UI if necessary. In order to generate the UI, the front-end UI module uses the graph generator 3465, document selector 3470, and/or information populator 3475.

The graph generator 3465 generates the document volume graph for a particular category and time period. The graph generator 3465 identifies the requested category and time period and pulls the required information (document volume data, event data, stock price data, etc.) from the research data storage 3430. Using this data, the graph generator 3465 generates the document volume graph which is incorporated into the user interface by the front-end UI module 3480.

The document selector 3470 receives a category, date range, and any filters from the front-end UI module 3480 and retrieves a list of documents fitting these descriptors from the research data 3430. The document information is inserted into the UI by the front-end UI module 3480 in some embodiments. The information populator similarly retrieves any other information from research data 3430 requested for the UI (e.g., competitors, etc. for populating a company information page).

While many of the features of system 3400 have been described as being performed by one module (e.g., the event detection module 3445), one of ordinary skill in the art will recognize that the functions might be split up into multiple modules or sub-modules. Furthermore, the modules shown might be combined into a single module in some embodiments (e.g., the document selector 3470 and information populator 3475 could be a single module).

IX. Computer System

Many of the above-described processes and modules are implemented as software processes that are specified as a set of instructions recorded on a computer readable storage medium (also referred to as "computer readable medium" or "machine readable medium"). These instructions are executed by one or more computational elements, such as one or more processing units of one or more processors or other computational elements like Application-Specific ICs ("ASIC") and Field Programmable Gate Arrays ("FPGA"). The execution of these instructions causes the set of computational elements to perform the actions indicated in the instructions. Computer is meant in its broadest sense, and can include any electronic device with a processor. Examples of machine readable media include, but are not limited to, CD-ROMs, flash drives, RAM chips, hard drives, EPROMs, etc. The machine readable media does not include carrier waves and/or electronic signals passing wirelessly or over wired connection.

In this specification, the term "software" includes firmware residing in read-only memory or applications stored in magnetic storage that can be read into memory for processing by one or more processors. Also, in some embodiments, multiple software inventions can be implemented as parts of a larger program while remaining distinct software inventions. In some embodiments, multiple software inventions can also be implemented as separate programs. Finally, any combination of separate programs that together implement a software invention described herein is within the scope of the invention. In some embodiments, the software programs when installed to operate on one or more computing devices define one or more specific machine implementations that execute and perform the operations of the software programs.

Figure 35:
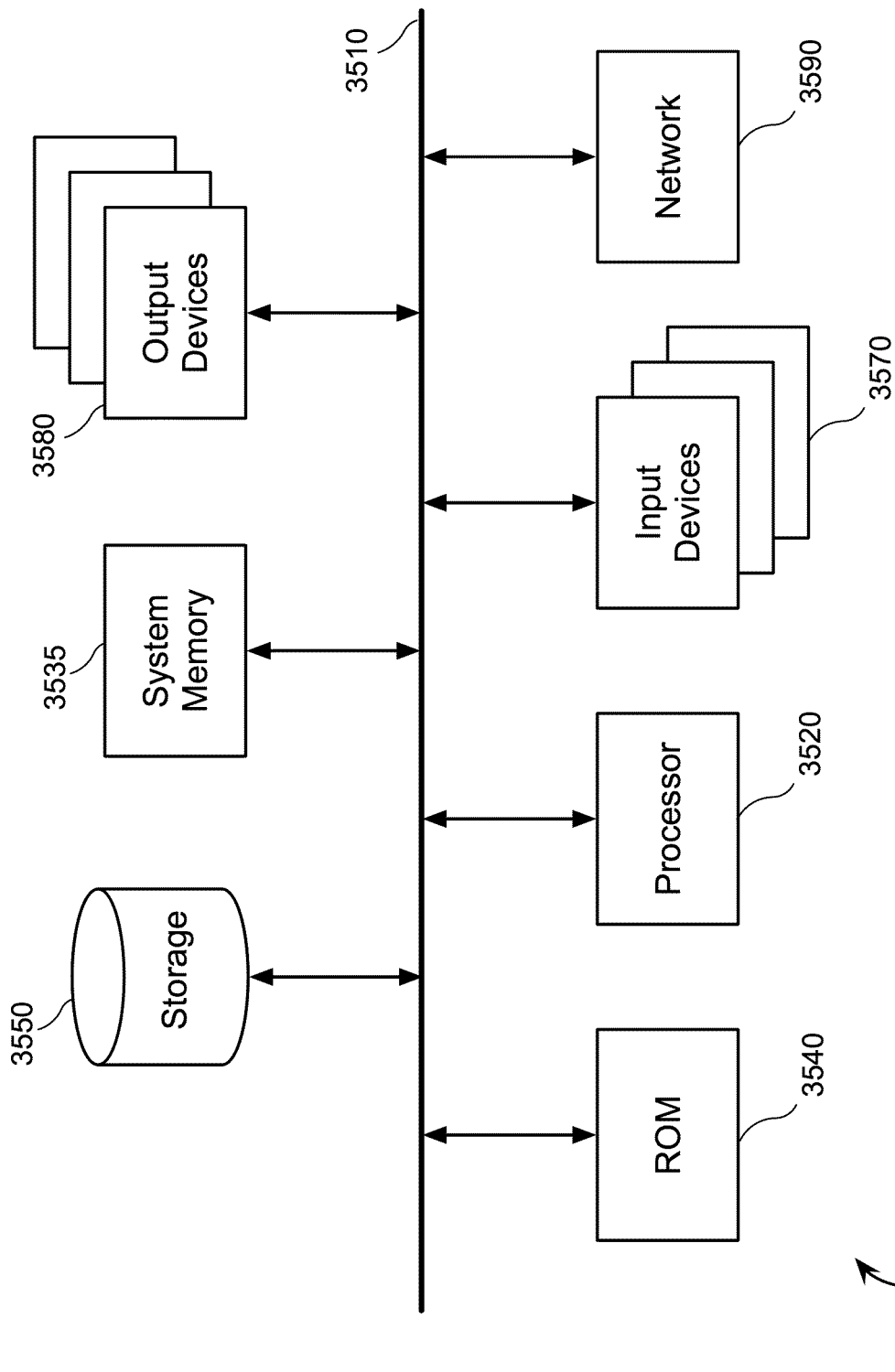
FIG. 35 conceptually illustrates a computing device with which some embodiments of the invention are implemented.

FIG. 35 conceptually illustrates a computing device 3500 with which some embodiments of the invention are implemented. For example, the processes described by reference to FIGS. 2, 6, 10, 15, 19, and 23 may be at least partially implemented using sets of instructions that are run on the computing device 3500.

Such a computing device includes various types of machine readable mediums and interfaces for various other types of machine readable mediums. Computing device 3500 includes a bus 3510, at least one processing unit (e.g., a processor) 3520, a system memory 3535, a read-only memory (ROM) 3540, a permanent storage device 3550, input devices 3570, output devices 3580, and a network connection 3590. The components of the computing device 3500 are electronic devices that automatically perform operations based on digital and/or analog input signals.

One of ordinary skill in the art will recognize that the computing device 3500 may be embodied in other specific forms without deviating from the spirit of the invention. For instance, the computing device may be implemented using various specific devices either alone or in combination. For example, a local PC may include the input devices 3570 and output devices 3580, while a remote PC may include the other devices 3510-3550, with the local PC connected to the remote PC through a network that the local PC accesses through its network connection 3590 (where the remote PC is also connected to the network through a network connection).

The bus 3510 collectively represents all system, peripheral, and chipset buses that communicatively connect the numerous internal devices of the computing device 3500. In some cases, the bus 3510 may include wireless and/or optical communication pathways in addition to or in place of wired connections. For example, the input devices 3570 and/or output devices 3580 may be coupled to the system 3500 using a wireless local area network (W-LAN) connection, Bluetooth®, or some other wireless connection protocol or system.

The bus 3510 communicatively connects, for example, the processor 3520 with the system memory 3535, the ROM 3540, and the permanent storage device 3550. From these various memory units, the processor 3520 retrieves instructions to execute and data to process in order to execute the processes of some embodiments. In some embodiments the processor includes an FPGA, an ASIC, or various other electronic components for execution instructions.

The ROM 3540 stores static data and instructions that are needed by the processor 3520 and other modules of the computing device. The permanent storage device 3550, on the other hand, is a read-and-write memory device. This device is a non-volatile memory unit that stores instructions and data even when the computing device 3500 is off. Some embodiments of the invention use a mass-storage device (such as a magnetic or optical disk and its corresponding disk drive) as the permanent storage device 3550.

Other embodiments use a removable storage device (such as a floppy disk, flash drive, or CD-ROM) as the permanent storage device. Like the permanent storage device 3550, the system memory 3535 is a read-and-write memory device. However, unlike storage device 3550, the system memory 3535 is a volatile read-and-write memory, such as a random access memory (RAM). The system memory stores some of the instructions and data that the processor needs at runtime. In some embodiments, the sets of instructions and/or data used to implement the invention's processes are stored in the system memory 3535, the permanent storage device 3550, and/or the read-only memory 3540. For example, the various memory units include instructions for processing multimedia items in accordance with some embodiments.

The bus 3510 also connects to the input devices 3570 and output devices 3580. The input devices 3570 enable the user to communicate information and select commands to the computing device. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 3580 include printers, electronic display devices that display still or moving images, and electronic audio devices that play audio generated by the computing device. For instance, these display devices may display a GUI. The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computing device.

Finally, as shown in FIG. 35, bus 3510 also couples computer 3500 to a network 3590 through a network adapter (not shown). In this manner, the computer can be a part of a network of computers (such as a local area network ("LAN"), a wide area network ("WAN"), an Intranet, or a network of networks, such as the Internet). For example, the computer 3500 may be coupled to a web server (network 3590) so that a web browser executing on the computer 3500 can interact with the web server as a user interacts with a GUI that operates in the web browser.

As mentioned above, some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by a device such as an electronics device, a microprocessor, a processor, a multi-processor (e.g., an IC with several processing units on it) and includes sets of instructions for performing various operations. The computer program excludes any wireless signals, wired download signals, and/or any other ephemeral signals.

Examples of hardware devices configured to store and execute sets of instructions include, but are not limited to, ASICs, FPGAs, programmable logic devices ("PLDs"), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "computing device", "server", "processor", and "memory" all refer to electronic or other technological devices. These terms exclude people or groups of people. For the purposes of this specification, the terms display or displaying mean displaying on an electronic device. As used in this specification and any claims of this application, the terms "machine readable medium" and "machine readable media" are entirely restricted to tangible, physical objects that store information in a form that is readable by a computer. These terms exclude any wireless signals, wired download signals, and/or any other ephemeral signals.

It should be recognized by one of ordinary skill in the art that any or all of the components of computing device 3500 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. Moreover, while the examples shown illustrate many individual modules as separate blocks, one of ordinary skill in the art would recognize that some embodiments may combine these modules into a single functional block or element. One of ordinary skill in the art would also recognize that some embodiments may divide a particular module into multiple modules.

In addition, a number of the figures (including FIGS. 2, 6, 10, 15, 19, and 23) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

We claim:

1. A machine-implemented method for world-wide web document searching, identification, classification, event scoring, generating a graphical user interface (GUI) for a research system, and implementing a detection system for identifying an increase in a number of documents pertaining to a particular category of multiple categories over a particular period of time, the method comprising:
- executing world wide web searches with a webcrawler on a regular, automated basis to
  - (i) detect new documents and automatically retrieve the documents, (ii) to enable detection of when events have occurred for categories in the detection system, and
  - (iii) to enable classification of content in the documents as relevant to the categories wherein the documents include content elements and structural elements;
- automatically analyzing the documents using category models that score the documents for relevancy to a particular category to classify the documents, wherein each model represents a specific entity and includes data that is used to identify documents related to the entity that the model represents, each model includes word association patterns of document elements associated with the score of the documents and includes parameters used in the analysis of documents by the model, wherein automatically analyzing the document using the category models comprises:
  - applying the models of each of the documents by identifying the word association patterns of document elements in the document;
  - for each document, calculating a relevance score for each document's relation to each of the categories represented by the models by applying the word association patterns identified in the document and associated scores of the documents; and
  - for each document, classifying the document by assigning the relevance score to each document for one or more of the categories over a particular period of time;
- based on the classification of the documents, for each particular category, identifying a first volume of documents relevant to the particular category over the particular period of time;
- removing duplicate documents from the first volume of documents;
- determining if the first volume of documents exceeds an average number of documents relevant to the category for a background time period;
- assigning an event score to the first volume of documents when the first volume of documents exceeds the average number of documents relevant to the category for a background time period;
- normalizing the event scores across a plurality of the categories;
- comparing the normalized event scores across the plurality of the categories;
- determining that an event has occurred when the normalized event score exceeds a particular threshold;
- receiving a request from a user of the research system for information about at least one of the particular categories;
- generating a chart that displays a set of events associated with the particular category over the particular period of time and displays a normalized comparison of events across the plurality of the categories, wherein the set of events comprises events appearing on the world wide web relevant to the particular category that have an assigned normalized event score that exceeds the particular threshold, and wherein the chart comprises a selectable item for a particular event; and
- incorporating the chart into a GUI for the particular category for transmission to a computer system, wherein the GUI displays the selectable item and upon selection of the selectable item by a user of the computer system causes the GUI to display a set of documents appearing on the world wide web at a range of time corresponding to the particular event.

2. The method of claim 1, wherein the particular category is a company.

3. The method of claim 2, wherein the set of events further comprises stock price changes for the company that exceed a predetermined threshold.

4. The method of claim 2, wherein the set of events further comprises management changes in the company.

5. The method of claim 2, wherein the chart further displays a stock price of the company over the particular period of time.

6. The method of claim 1, further comprising displaying in the chart a histogram of a number of documents appearing on the world wide web relevant to the particular category over the particular period of time.

7. The method of claim 1, wherein the chart further comprises one or more selectable items for defining a portion of the particular period of time.

8. The method of claim 7, further comprising generating a list of documents relevant to the particular category that appeared on the world wide web during the portion of the particular period of time.

9. The method of claim 8, wherein the GUI comprises a display area for displaying the list of documents, wherein the GUI displays the set of documents in the display area upon selection of the selectable item.

10. The method of claim 1, wherein when the user moves a cursor over the selectable item representing the particular event, the GUI displays a name of the event.

11. A non-transitory, machine readable medium storing a program which when executed by at least one processing unit generates a graphical user interface (GUI) for a research system and implements a detection system for identifying an increase in a number of documents pertaining to a particular category of multiple categories over a particular period of time, the program comprising sets of instructions to perform operations comprising:
- executing world wide web searches with a webcrawler on a regular, automated basis to
  - (i) detect new documents and automatically retrieve the documents, (ii) to enable detection of when events have occurred for categories in the detection system, and
  - (iii) to enable classification of content in the documents as relevant to the categories wherein the documents include content elements and structural elements;
- automatically analyzing the documents using category models that score the documents for relevancy to a particular category to classify the documents, wherein each model represents a specific entity and includes data that is used to identify documents related to the entity that the model represents, each model includes word association patterns of document elements associated with the score of the documents and includes parameters used in the analysis of documents by the model, wherein automatically analyzing the document using the category models comprises:

applying the models of each of the documents by identifying the word association patterns of document elements in the document;

for each document, calculating a relevance score for each document's relation to each of the categories represented by the models by applying the word association patterns identified in the document and associated scores of the documents; and for each document, classifying the document by assigning the relevance score to each document for one or more of the categories over a particular period of time;

based on the classification of the documents, for each particular category, identifying a first volume of documents relevant to the particular category over the particular period of time;

removing duplicate documents from the first volume of documents;

determining if the first volume of documents exceeds an average number of documents relevant to the category for a background time period;

assigning an event score to the first volume of documents when the first volume of documents exceeds the average number of documents relevant to the category for a background time period;

normalizing the event scores across a plurality of the categories;

comparing the normalized event scores across the plurality of the categories;

determining that an event has occurred when the normalized event score exceeds a particular threshold;

receiving a request from a user of the research system for information about at least one of the particular categories;

generating a list of events associated with the particular category and displays a normalized comparison of events across the plurality of the categories, the list of events comprising a plurality of events that are each associated with a different plurality of documents and have the event score that exceeds the particular threshold, wherein the list comprises a selectable item for a particular event; and generating a GUI that displays the list of the events, each particular event is represented in the list by at least a title of a particular document from its associated plurality of documents, the particular document identified by the research system as representative of the particular event, wherein the GUI displays the selectable item and upon selection of the selectable item by a user of a computer system causes the GUI to display a set of documents appearing on the world wide web at a range of time corresponding to the particular event.

12. The non-transitory, machine readable medium of claim 11, wherein each displayed title is a selectable item the selection of which directs a web browser to the document representative of the event.

13. The non-transitory, medium of claim 11, wherein each event in the list of events is displayed with an icon indicating a type of event.

14. A non-transitory, machine readable medium storing a computer program for world-wide web document searching, identification, classification, and event scoring, and when executed by at least one processing unit, generates a graphical user interface (GUI) for a research system and implementing a detection system for identifying an increase in a number of documents pertaining to a particular category of multiple categories over a particular period of time, the computer program comprising sets of instructions to perform operations comprising:

executing world wide web searches with a webcrawler on a regular, automated basis to
  (i) detect new documents and automatically retrieve the documents, (ii) to enable detection of when events have occurred for categories in the detection system, and
  (iii) to enable classification of content in the documents as relevant to the categories wherein the documents include content elements and structural elements;

automatically analyzing the documents using category models that score the documents for relevancy to a particular category to classify the documents, wherein each model represents a specific entity and includes data that is used to identify documents related to the entity that the model represents, each model includes word association patterns of document elements associated with the score of the documents and includes parameters used in the analysis of documents by the model, wherein automatically analyzing the document using the category models comprises:

applying the models of each of the documents by identifying the word association patterns of document elements in the document;

for each document, calculating a relevance score for each document's relation to each of the categories represented by the models by applying the word association patterns identified in the document and associated scores of the documents; and for each document, classifying the document by assigning the relevance score to each document for one or more of the categories over a particular period of time;

based on the classification of the documents, for each particular category, identifying a first volume of documents relevant to the particular category over the particular period of time;

removing duplicate documents from the first volume of documents;

determining if the first volume of documents exceeds an average number of documents relevant to the category for a background time period;

assigning an event score to the first volume of documents when the first volume of documents exceeds the average number of documents relevant to the category for a background time period;

normalizing the event scores across a plurality of the categories;

comparing the normalized event scores across the plurality of the categories;

determining that an event has occurred when the normalized event score exceeds a particular threshold;

receiving a request from a user of the research system for information about at least one of the particular categories;

generating a chart that displays a set of events associated with the particular category over the particular period of time and displays a normalized comparison of events across the plurality of the categories, wherein at least one event has a corresponding selectable graphical item in the chart and has an assigned event score that exceeds the particular threshold;

incorporating the chart into the GUI for the particular category for transmission to the user; and upon receiving a selection of the graphical item by a user of a computer system, identifying a set of documents related to the event corresponding to the selected graphical item and causing the GUI to display the set of identified documents.

15. The non-transitory, machine readable medium of claim 14, wherein the chart further displays a secondary set of information related to the particular category.

16. The non-transitory, machine readable medium of claim 14, wherein each event in the set of events is represented by a single representative document.

17. The non-transitory, machine readable medium of claim 11, wherein the list of events further comprises at least one event not associated with a plurality of documents.

* * * * *